US010144187B2

(12) United States Patent
Iatan et al.

(10) Patent No.: US 10,144,187 B2
(45) Date of Patent: Dec. 4, 2018

(54) INJECTION MOLDING DEVICE FOR THICK LENSES AND METHOD OF MANUFACTURING

(71) Applicant: DBM REFLEX ENTERPRISES INC., Laval (CA)

(72) Inventors: George Iatan, Saint-Lambert (CA); Jean-Francois Rioux, Laval (CA)

(73) Assignee: DBM REFLEX ENTERPRISES INC., Laval, Quebec (CA)

( * ) Notice: Subject to any disclaimer, the term of this patent is extended or adjusted under 35 U.S.C. 154(b) by 363 days.

(21) Appl. No.: 15/016,766

(22) Filed: Feb. 5, 2016

(65) Prior Publication Data

US 2016/0151985 A1 Jun. 2, 2016

Related U.S. Application Data

(63) Continuation of application No. PCT/CA2014/050734, filed on Aug. 5, 2014.
(Continued)

(51) Int. Cl.
*B29D 11/00* (2006.01)
*B29C 45/72* (2006.01)
(Continued)

(52) U.S. Cl.
CPC ...... *B29D 11/0073* (2013.01); *B29C 45/0003* (2013.01); *B29C 45/1635* (2013.01);
(Continued)

(58) Field of Classification Search
CPC ............ B29D 11/0073; B29D 11/0048; B29D 11/00009; B29C 45/1635; B29C 45/1642;
(Continued)

(56) References Cited

U.S. PATENT DOCUMENTS 4,734,023 A 3/1988 Nesch et al.
4,935,184 A 6/1990 Sorensen
(Continued)

FOREIGN PATENT DOCUMENTS

AT 505321 B1 7/2010
DE 298620 A5 3/1992
(Continued)

OTHER PUBLICATIONS

Written opinion from ISA/CA dated Oct. 23, 2014 for PCT/CA2014/050734.
(Continued)

*Primary Examiner* — Mathieu D Vargot
(74) *Attorney, Agent, or Firm* — IPAXIO S.E.N.C.

(57) ABSTRACT

The multistep injection molding device is for manufacturing thick lenses for use with an illumination apparatus. The injection molding device includes two sets of mold core inserts forming mold cavities when the injection molding device is in a closed position. The lens core part is formed in a first injection shot station. The molded lens core part is then moved to a post-molding cooling station in which it is further cooled inside a corresponding mold cavity. Two outer lens parts are formed sequentially over the lens core part in second and third injection shot stations. A method of manufacturing a thick lens is also disclosed.

18 Claims, 59 Drawing Sheets

Related U.S. Application Data

(60) Provisional application No. 61/899,006, filed on Nov. 1, 2013, provisional application No. 61/862,366, filed on Aug. 5, 2013.

(51) Int. Cl.

| | |
|---|---|
| ***B29C 45/16*** | (2006.01) |
| ***G02B 19/00*** | (2006.01) |
| ***B29C 45/00*** | (2006.01) |
| ***F21V 5/04*** | (2006.01) |
| ***F21V 7/00*** | (2006.01) |
| ***F21V 13/04*** | (2006.01) |
| ***F21K 9/60*** | (2016.01) |
| *B29L 11/00* | (2006.01) |
| *B29K 33/00* | (2006.01) |
| *B29K 69/00* | (2006.01) |

(52) U.S. Cl.

CPC ...... *B29C 45/1642* (2013.01); *B29C 45/7207* (2013.01); *B29D 11/00009* (2013.01); *B29D 11/0048* (2013.01); *F21K 9/60* (2016.08); *F21V 5/048* (2013.01); *F21V 7/0091* (2013.01); *F21V 13/04* (2013.01); *G02B 19/0014* (2013.01); *G02B 19/0028* (2013.01); *G02B 19/0061* (2013.01); *B29C 2045/1637* (2013.01); *B29K 2033/12* (2013.01); *B29K 2069/00* (2013.01); *B29K 2995/003* (2013.01); *B29K 2995/0026* (2013.01); *B29L 2011/0016* (2013.01)

(58) Field of Classification Search

CPC ............ B29C 45/0003; B29C 45/7207; G02B 19/0028

See application file for complete search history.

(56) References Cited

U.S. PATENT DOCUMENTS

| | | | |
|---|---|---|---|
| 5,045,268 | A | 9/1991 | Sorensen |
| 5,413,743 | A | 5/1995 | Prophet |
| 5,922,250 | A | 7/1999 | Ishikawa et al. |
| 6,139,305 | A | 10/2000 | Nesch |
| 6,238,600 | B1 | 5/2001 | Kuo et al. |
| 6,416,690 | B1 | 7/2002 | Soane et al. |
| 7,150,845 | B1 | 12/2006 | Gram |
| 7,314,362 | B2 | 1/2008 | Lichtinger |
| 7,455,516 | B2 | 11/2008 | Glashagen et al. |
| 7,833,008 | B2 | 11/2010 | Wimberger |
| 7,871,260 | B2 | 1/2011 | Boucherie |
| 7,965,445 | B2 | 6/2011 | Chen et al. |
| 8,182,262 | B2 | 5/2012 | Steinebrunner et al. |
| 8,360,764 | B2 | 1/2013 | Armbruster et al. |
| 8,740,607 | B2 | 6/2014 | Pfeifer et al. |
| 8,891,171 | B2 | 11/2014 | Choquet et al. |
| 2004/0195722 | A1 | 10/2004 | Yang |
| 2006/0220268 | A1 | 10/2006 | Chao et al. |
| 2007/0194494 | A1 | 8/2007 | Hartlmeier |
| 2008/0299340 | A1 | 12/2008 | Kamienski et al. |
| 2009/0291206 | A1 | 11/2009 | Jiang |
| 2012/0049408 | A1 | 3/2012 | Okamoto |
| 2012/0250331 | A1 | 10/2012 | De Lamberteire |
| 2013/0265776 | A1 | 10/2013 | Zoellner et al. |
| 2013/0278892 | A1 | 10/2013 | Jiang et al. |
| 2014/0332991 | A1 | 11/2014 | Giessauf et al. |

FOREIGN PATENT DOCUMENTS

| | | | |
|---|---|---|---|
| DE | 10121691 | A1 | 11/2002 |
| DE | 102004058973 | B4 | 10/2007 |
| DE | 102007011338 | A1 | 9/2008 |
| DE | 102007020418 | A1 | 10/2008 |
| DE | 102008034153 | A1 | 1/2010 |
| EP | 671251 | A1 | 9/1995 |
| EP | 2402140 | A1 | 1/2012 |
| EP | 1782936 | B2 | 2/2013 |
| EP | 2578376 | A1 | 4/2013 |
| JP | 2001191365 | A | 7/2001 |
| WO | 9423929 | A1 | 10/1994 |
| WO | 2010064214 | A1 | 6/2010 |
| WO | 2011061638 | A1 | 5/2011 |
| WO | 2011083002 | A1 | 7/2011 |
| WO | 2012157827 | A1 | 11/2012 |
| WO | 2015017929 | A1 | 2/2015 |
| WO | 2015017930 | A1 | 2/2015 |

OTHER PUBLICATIONS

Written opinion from ISA/CA dated Oct. 20, 2014 for PCT/CA2014/050735.
Stricher, Michael et al., Focus on Precision, Kunststoffe international, Apr. 2009.
Machine translation in English of AT-505 321 B1.
Machine translation in English of DE 101 21 691 A1.
Machine translation in English of DE 10 2004 058 973 B4.
Machine translation in English of DE 10 2007 11 338 A1.
Machine translation in English of DE 10 2007 020 418 A1.
Machine translation in English of DE 10 2008 034 153 A1.
Machine translation in English of EP 0 671 251 A1.
Machine translation in English of EP 1 782 936 B2.
Machine translation in English of EP 2 402 140 A1.
Machine translation in English of EP 2 578 376 A1.
Machine translation in English of JP 2001191365 A.
Machine translation in English of WO 2011/083002 A1.
Machine translation in English of WO 2012/157827 A1.

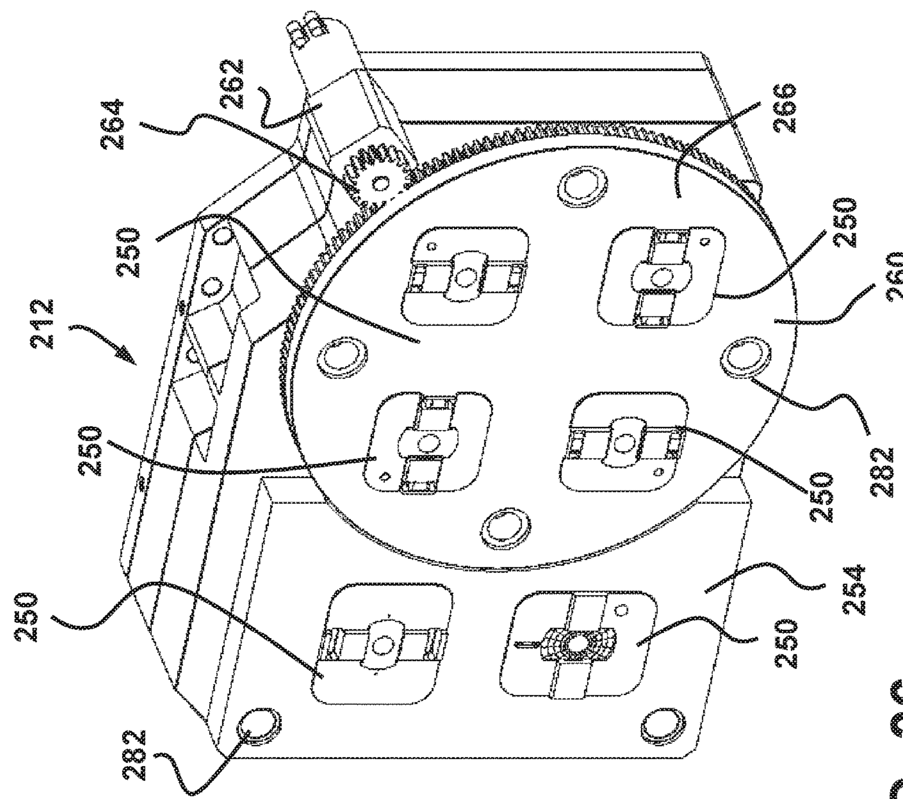
FIG. 36
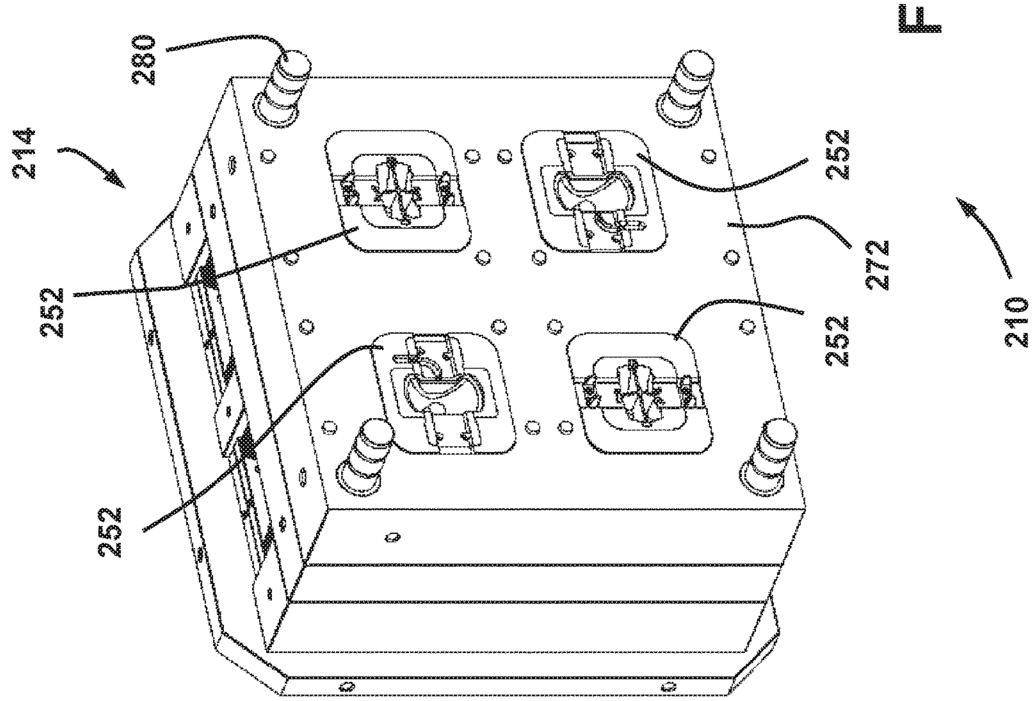

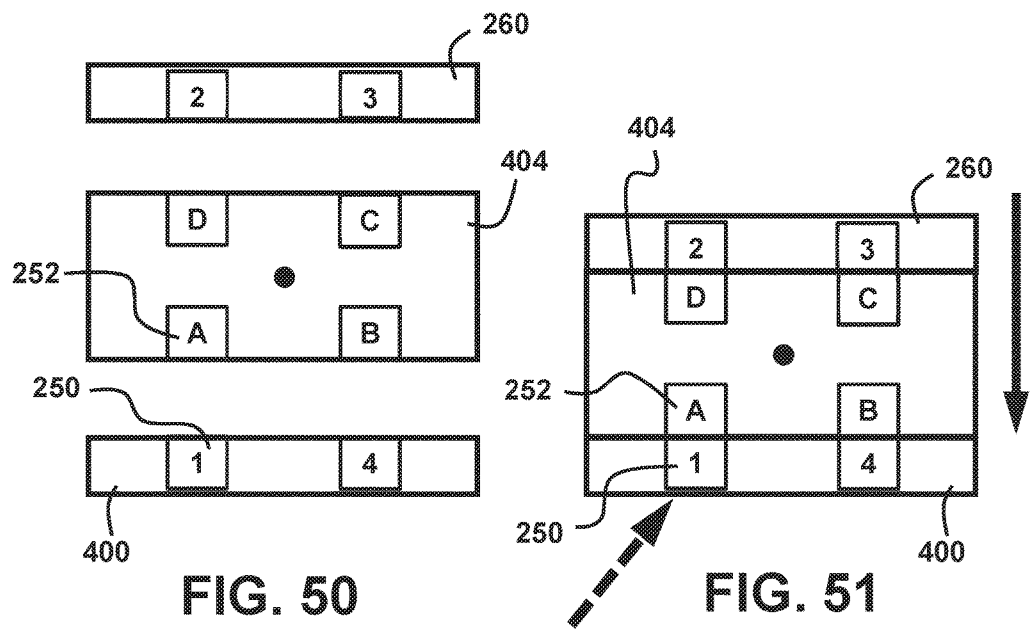
FIG. 50
FIG. 51
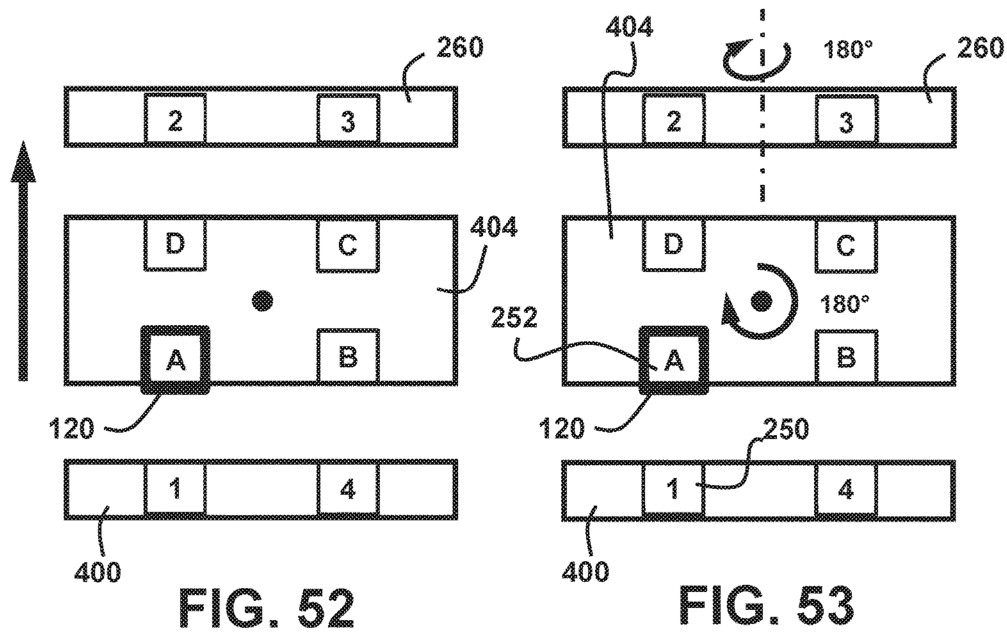
FIG. 52
FIG. 53

INJECTION MOLDING DEVICE FOR THICK LENSES AND METHOD OF MANUFACTURING

CROSS REFERENCE TO PRIOR APPLICATIONS

The present case is a continuation of PCT patent application No. PCT/CA2014/050734 filed on 5 Aug. 2014. PCT patent application No. PCT/CA2014/050734 claims the benefits of U.S. patent applications Nos. 61/862,366 filed on 5 Aug. 2013 and 61/899,006 filed on 1 Nov. 2013. The contents of all these prior applications are hereby incorporated by reference in their entirety.

TECHNICAL FIELD

The technical field relates generally to injection molding devices for thick lenses. It also relates to methods of manufacturing thick lenses.

BACKGROUND

Illumination apparatuses for automotive vehicles often use powerful incandescent light sources that generate an intense heat. These light sources are generally optically coupled to optical glass lenses since glass can withstand the generated heat and will not deform in use. However, the heat from most incandescent light sources is generally too high for optical lenses made of plastic materials.

Solid state light sources generate considerably less heat than incandescent light sources having the same illumination power. White LEDs are increasingly used as light sources in illumination apparatuses for the automotive industry, for example in head lights. Such illumination apparatuses can thus include optical lenses made of plastic materials because heat is not as high as with incandescent light sources.

Illumination apparatuses for automotive vehicles generally use thick lenses to project the light in front of the vehicles. The light beam from the light sources is projected as a magnified image and the lens refracts the light beams accordingly. Thick lenses have a high ratio between the thickness of the lens along the central optical axis and the thickness of the lens at the edges. These optical lenses are thus relatively thicker compare to optical lenses in other applications, as defined by the standard understanding in the industry in terms of the ratio between the key dimensions of optical lenses.

Thick lenses made of plastic materials are not easy to manufacture using usual injection molding methods because the injection molding process itself may cause deformations of the optical active surfaces. For instance, these lenses tend to shrink during cooling in a manner that reduces their accuracy and performances. Ultimately, the quality of thick lenses made of plastic materials can become an issue, particularly when high production volumes are required. One example of such context is the automotive and lighting industries. Using the known injection methods create challenges in terms of costs and complexities. Other injection molding issues can have a negative impact on the quality of thick lenses, particularly in terms of having a stable batch-to-batch consistency and surface accuracy.

Multistep injection methods for manufacturing plastic lenses have been used for several years. For instance, such method can include using rotary molds or shuttle molds to inject two or more layers of the same plastic material over one another with a clear boundary surface between each layer. However, several applications require stringent tolerances of the shape and the curvatures of optical lenses that can be difficult to obtain using these known methods, particularly for manufacturing thick lenses in large volumes.

Clearly, room for improvements always exists in this area of technology.

SUMMARY

There is provided herein a multistep injection molding device for manufacturing a thick lens for use with an illumination apparatus having a light source. There is also provided herein a method for manufacturing a thick lens for use with an illumination apparatus having a light source, the method being as shown, described and/or suggested herein.

In one aspect, there is provided a method of manufacturing a thick optical lens in an injection molding device that is reciprocately moveable with reference to a longitudinal axis between an opened position and a closed position, the lens including a lens core part, a first outer lens part and a second outer lens part, the method including: providing at least four first mold core inserts, two of the first mold core inserts being located adjacent to one another on a stationary platen and the other first mold core inserts being located on a first rotatable carrier platen that is pivotable around a first pivot axis, the first pivot axis being parallel to the longitudinal axis; providing at least four second mold core inserts that are located on at least one second rotatable carrier platen pivotable around a second pivot axis, the second mold core inserts sequentially cooperating with the first mold core inserts and forming at least four mold cavities when the injection molding device is in a closed position, the at least one second rotatable carrier platen being one in number when the second pivot axis is parallel to the longitudinal axis and being at least two in number when the second pivot axis is perpendicular to the longitudinal axis; when the injection molding device is in the closed position, molding the lens core part during a first injection shot where a molten material is injected through one of the first mold core inserts located on the stationary platen and that is then forming a first one of the mold cavities with a corresponding one of the second mold core inserts; opening the injection molding device with the molded lens core part being held by the second mold core insert forming one half of the first mold cavity; pivoting the first rotatable carrier platen around the first pivot axis and the second rotatable carrier platen around the second pivot axis before moving the injection molding device back in the closed position; when the injection molding device is back in the closed position, further cooling the molded lens core part inside a second one of the mold cavities in a post-molding cooling step, the second mold cavity being formed by the corresponding one of the second mold core inserts and one of the first mold core inserts located on the first rotatable carrier platen; opening the injection molding device with the molded lens core part being held by the first mold core insert forming one half of the second mold cavity; pivoting the first rotatable carrier platen around the first pivot axis and the second rotatable carrier platen around the second pivot axis before moving the injection molding device back in the closed position; when the injection molding device is in the closed position, molding the first outer lens part over the lens core part during a second injection shot where the molten material is injected through one of the first mold core inserts located on the first rotatable carrier platen and that is then forming a third one of the mold cavities with another one of the second mold core inserts; opening the injection molding device with the molded lens core part being held by the second mold core insert forming one half of the third mold cavity; pivoting the first rotatable carrier platen around the first pivot axis and the second rotatable carrier platen around the second pivot axis before moving the injection molding device back in the closed position; when the injection molding device is in the closed position, molding the second outer lens part over the lens core part during a third injection shot where the molten material is injected through the other one of the first mold core inserts located on the stationary platen and that is then forming a fourth one of the mold cavities with the second mold core insert forming one half of the fourth mold cavity; and then opening the injection molding device and removing the molded lens from the injection molding device, whereby the lens core part remains continuously inside the injection molding device from the first injection shot until an end of the third injection shot.

In another aspect, there is provided a multistep injection molding device for manufacturing a thick lens for use with an illumination apparatus having a light source, the lens having a lens core part, a first outer lens part and a second outer lens part, the injection molding device including: at least four first mold core inserts, two of the first mold core inserts being located adjacent to one another on a stationary platen and the other first mold core inserts being located on a first rotatable carrier platen that is pivotable around a first pivot axis, the first pivot axis being parallel to a longitudinal axis; at least four second mold core inserts that are located on at least one second rotatable carrier platen pivotable around a second pivot axis, the second mold core inserts sequentially cooperating with the first mold core inserts and forming at least four mold cavities when the injection molding device is in a closed position, the at least one second rotatable carrier platen being one in number when the second pivot axis is parallel to the longitudinal axis and being at least two in number when the second pivot axis is perpendicular to the longitudinal axis; a first injection shot station to mold the lens core part, the first station including a first molten plastic material path passing through a first one among the two first mold core inserts located on the stationary platen; a post-molding cooling station in which the lens core part is further cooled inside a corresponding one of the mold cavities after the first injection shot station; a second injection shot station to mold the first outer lens part, the second station including a second molten plastic material path passing sequentially through each of the first mold core inserts located on the first rotatable carrier platen; and a third injection shot station to mold the second outer lens part, the third station including a third molten plastic material path passaging through a second one among the two first mold core inserts located on the stationary platen.

More details on the various aspects and features of the proposed concept will be apparent from the following detailed description and the appended figures.

BRIEF DESCRIPTION OF THE FIGURES

FIG. 36 is an isometric view of the first and second mold plate halves of a second example of the injection molding device of the proposed concept;

FIGS. 50 to 64 are schematic top views depicting how the parts are positioned during operation of the injection molding device shown in FIG. 45;

DETAILED DESCRIPTION

Figure 1:
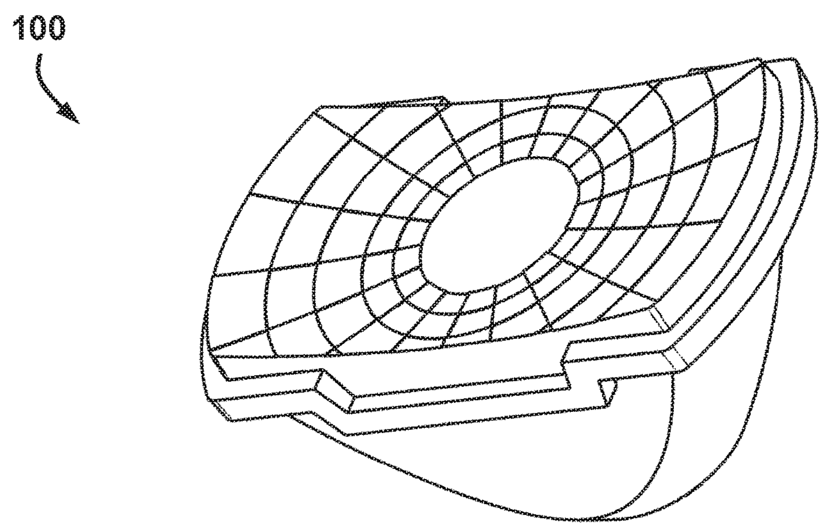
FIG. 1 is an isometric view illustrating an example of a generic thick lens that can be made using an injection molding device and/or a method of manufacturing as suggested herein.

FIG. 1 is an isometric view illustrating an example of a generic thick lens 100 that can be made using an injection molding device and/or a method of manufacturing as suggested herein. The illustrated lens 100 is only for the sake of illustration. Numerous other shapes and configurations are possible as well.

The lens 100 is made of a transparent plastic resin material. Examples of plastic materials include Polymethylmethacrylate (PMMA) and polycarbonate, to name just a few. Other plastic materials can be used, depending on the implementation.

Figure 2:
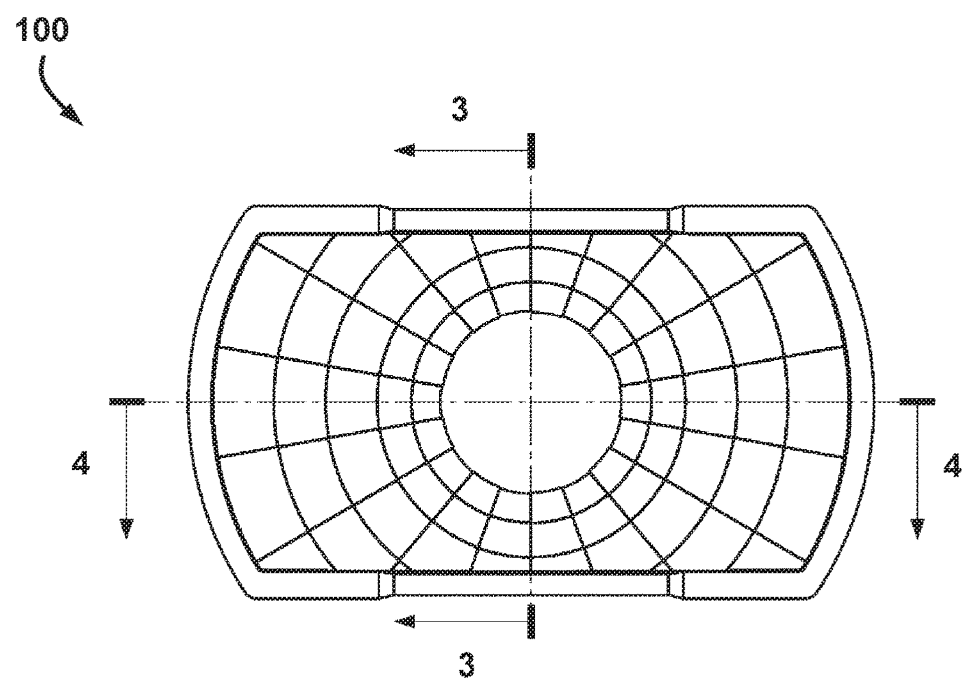
FIG. 2 is a front view of the lens of FIG. 1.

FIG. 2 is a front view of the lens 100 of FIG. 1.

Figure 3:
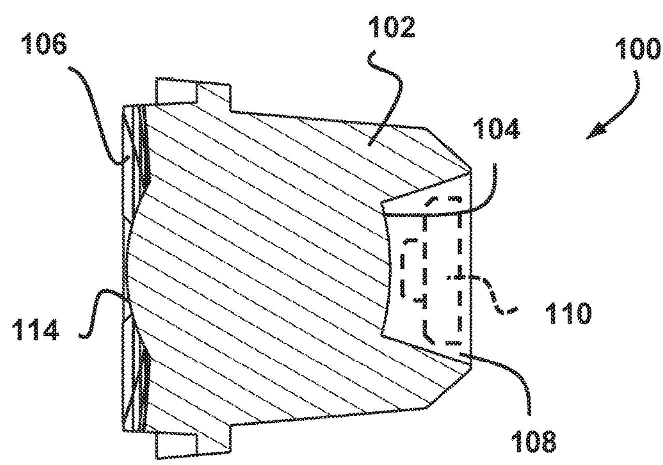
FIG. 3 is a cross-section view of the lens taken along line 3-3 in FIG. 2.
Figure 4:
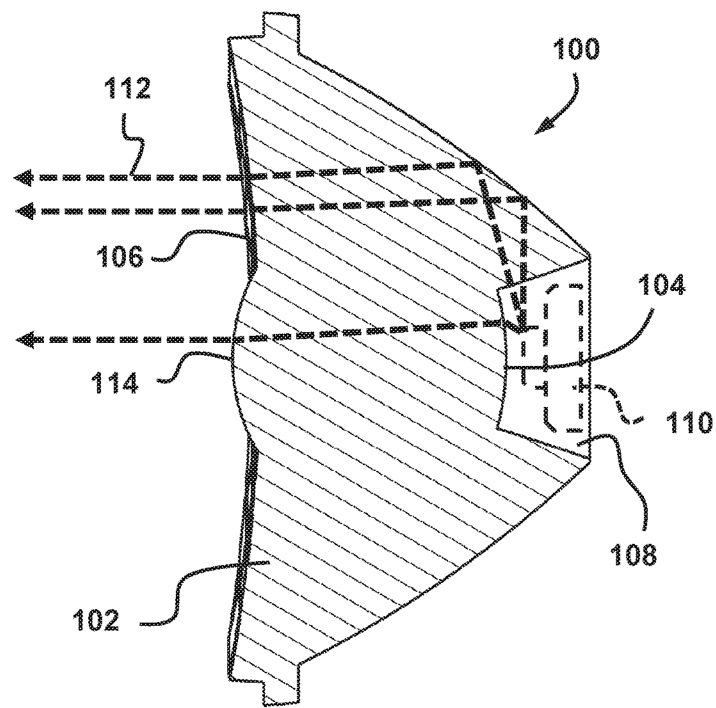
FIG. 4 is a cross-section view of the lens taken along line 4-4 in FIG. 2.

FIG. 3 is a cross-section view of the lens 100 taken along line 3-3 in FIG. 2. FIG. 4 is a cross-section view of the lens 100 taken along line 4-4 in FIG. 2. As can be seen, the lens 100 includes a lens body 102 having a first optical active surface 104 on its rear side and a second optical active surface 106 on its front side. The first optical active surface 104 also includes at least one curved surface. The curved surface portion can be for instance spherical, cylindrical, aspheric, parabolic or free form. Variants are also possible.

The first optical active surface 104 of the illustrated example includes a recessed portion 108 into the lens body 102. The recessed portion 108 can be the location for a light source, for instance a solid state light source having one or more light emitting diodes (LED). A solid state light source is schematically depicted in FIGS. 3 and 4 at 110. This can be an arrangement for an automotive headlamp. Other uses and applications are possible as well, including the ones outside the context of automotive vehicles.

In use, the solid state light source 110 is optically coupled to the lens 100. Light beams emitted by the solid state light source 110 enter the lens body 102 through the first optical active surface 104 and then exit through the second optical active surface 106. A generic example of a set of light beams 112 is shown in FIG. 4.

The second optical active surface 106 of the illustrated example includes a plurality of light diffusing elements to spread and orient the outgoing light in accordance with the requirements. They are shown as being concentrically disposed around a protruding curved portion 114 located at the center of the second optical active surface 106. The area around the protruding curved portion 114 is also shown as being concave. However, the exact shape, configuration and arrangement of all the optical active surfaces 104, 106 of the lens 100 can vary from one implementation to another. The illustrated lens 100 is generic and for this reason, the light diffusing elements on the second optical active surface 106 are only illustrated in a semi-schematic manner. They can also be omitted in some implementations.

As can be seen in FIG. 4, at least some of the light beams inside the lens 100 are reflected through total internal reflection (TIR) on internal TIR surfaces located on what constitutes the lateral sides of the lens 100. Some of the light beams also go through the lens body 102 without reflecting on the TIR surfaces.

Figure 5:
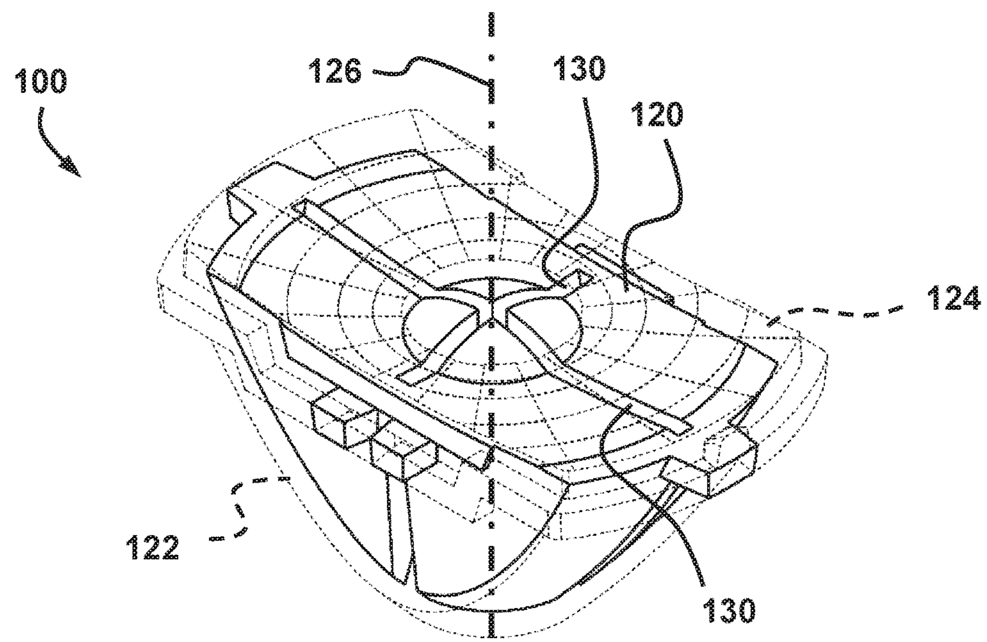
FIG. 5 is a semi-schematic isometric view of the lens of FIG. 1.

FIG. 5 is a semi-schematic isometric view of the lens 100 of FIG. 1. FIG. 5 shows that the lens 100 includes a lens core part 120 embedded between a first outer lens part 122 and a second outer lens part 124. The lens core part 120 is shown in solid lines while the two outer lens parts 122, 124 are shown in stippled lines. The first optical active surface 104 is located on the first outer lens part 122 and the second optical active surface 106 is located on the second outer lens part 124. It should be noted that the lens core part 120 and the two outer lens parts 122, 124 are separately visible in FIG. 5 only for the sake of illustration.

The lens core part 120 and the two outer lens parts 122, 124 are fused together during manufacturing so as to create the resulting lens 100. The term "fused" means securing or bonding the lens layers together using heat coming from the hot molten plastic material during the manufacturing process to form a monolithic piece. The fused lens layers are generally made of the same plastic material but variants could be possible. The two outer lens parts 122, 124 have the same refractive index. The boundary between each of the outer lens parts 122, 124 and the lens core part 120 is not distinguishable or visible with naked eye, for example using the light coming from the solid state light source 110 (FIG. 4) with which the lens 100 will be used. The lens body 102 (FIGS. 3 and 4) is thus transparent to this light. There is thus no refraction of the light beams at the boundaries between the outer lens parts 122, 124 inside the lens 100. However, the boundaries could be viewed using polarized light, phase contrast microscopy or other known visualization devices or instruments.

As can also be seen in FIG. 5, the illustrated lens 100 has a central axis 126 passing through the first and second optical active surfaces. This lens 100 has a plane of symmetry that is coincident with the central axis 126. Variants are possible as well.

Figure 6:
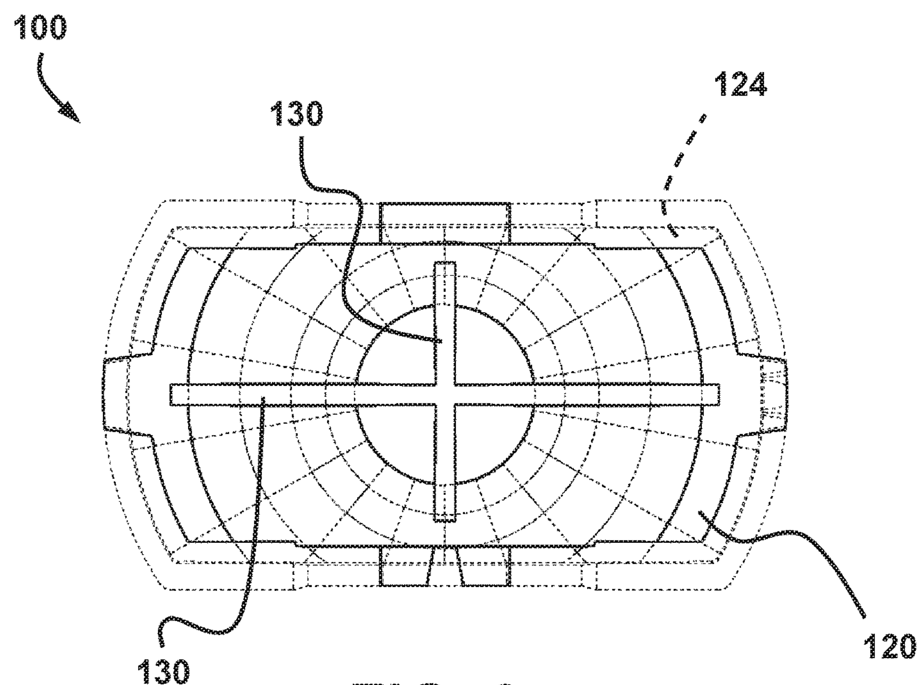
FIG. 6 is a semi-schematic front view of the lens of FIG. 1.
Figure 7:
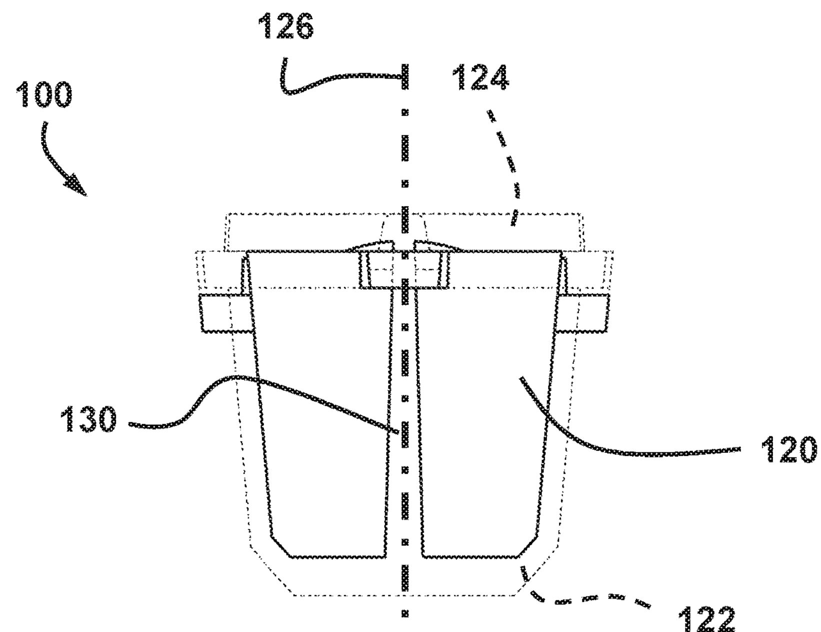
FIG. 7 is a first semi-schematic side view of the lens of FIG. 1.
Figure 8:
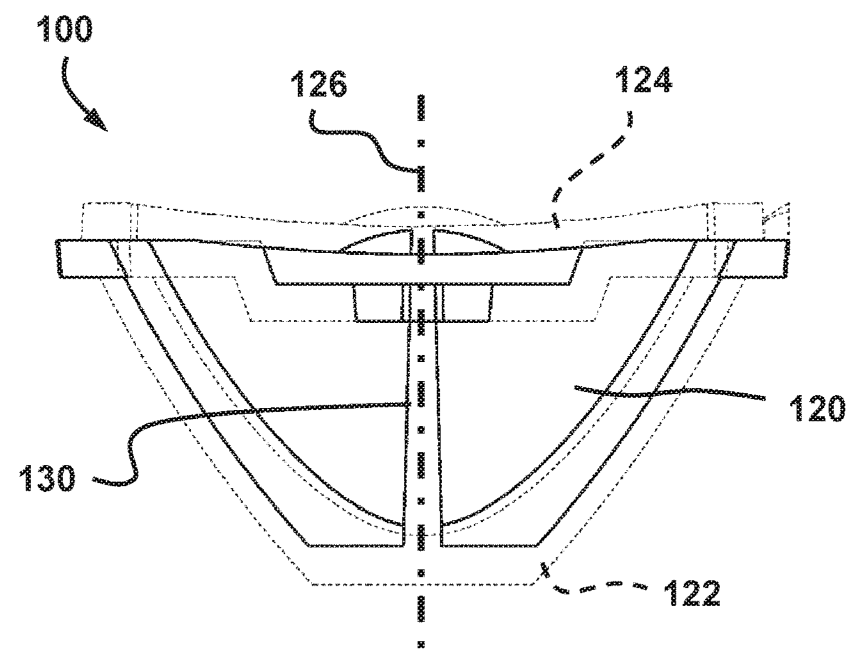
FIG. 8 is a second semi-schematic side view of the lens of FIG. 1
Figure 9:
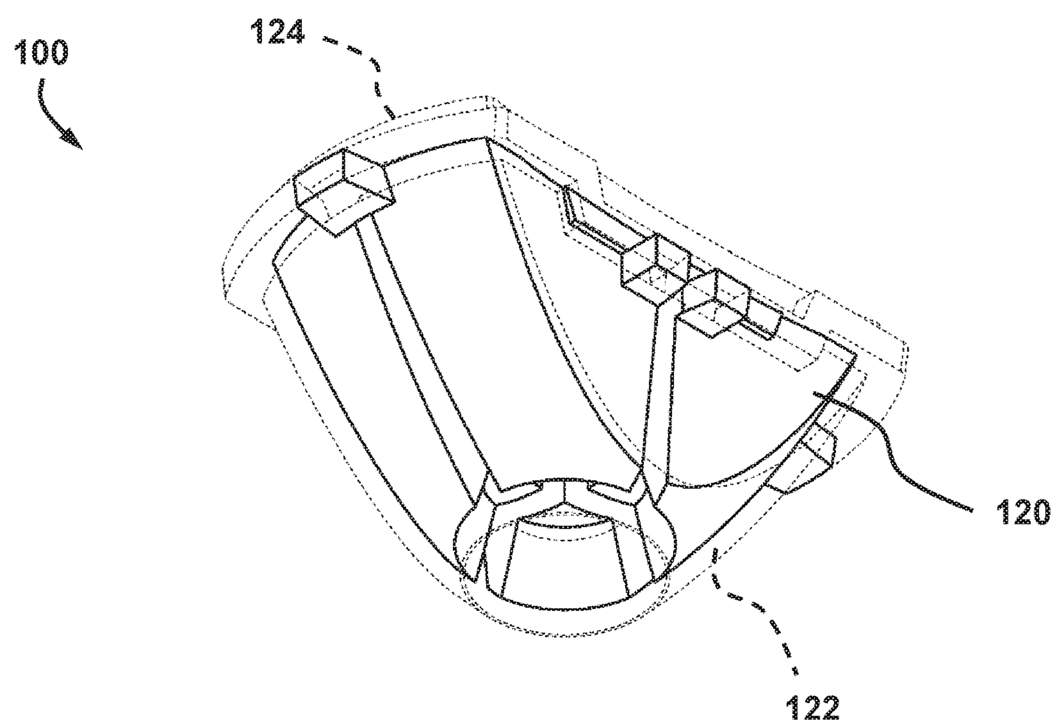
FIG. 9 is a semi-schematic isometric view of the lens of FIG. 1, showing its rear side.

FIG. 6 is a semi-schematic front view of the lens 100. FIG. 7 is a first semi-schematic side view of the lens 100. FIG. 8 is a second semi-schematic side view of the lens 100. FIG. 9 is a semi-schematic isometric view of the lens 100 showing its rear side. As in FIG. 5, the lens core part 120 and the two outer lens parts 122, 124 are separately visible in FIGS. 6 to 9 only for the sake of illustration.

Figure 10:
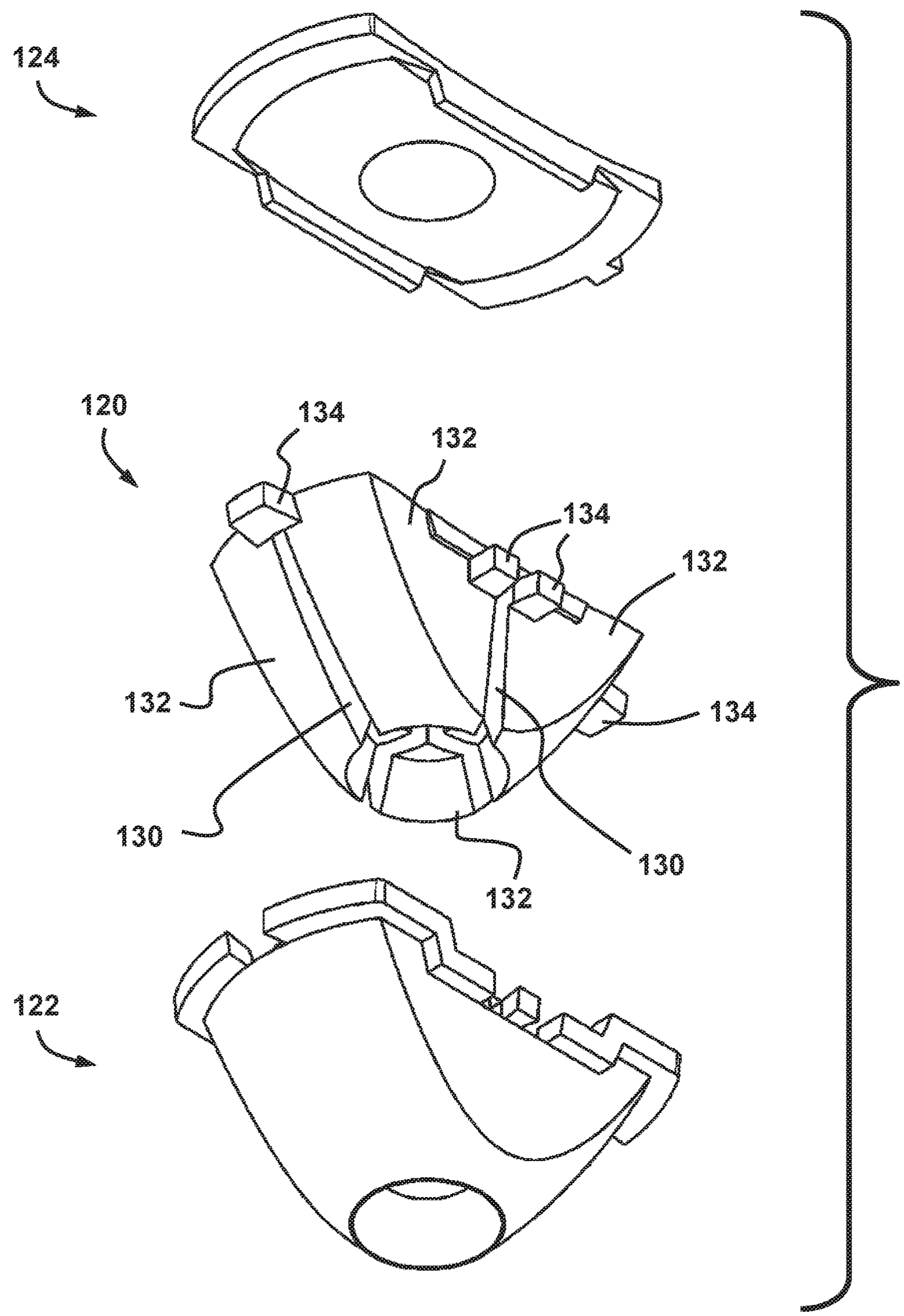
FIG. 10 is an exploded isometric view depicting the parts of the lens of FIG. 1.
Figure 11:
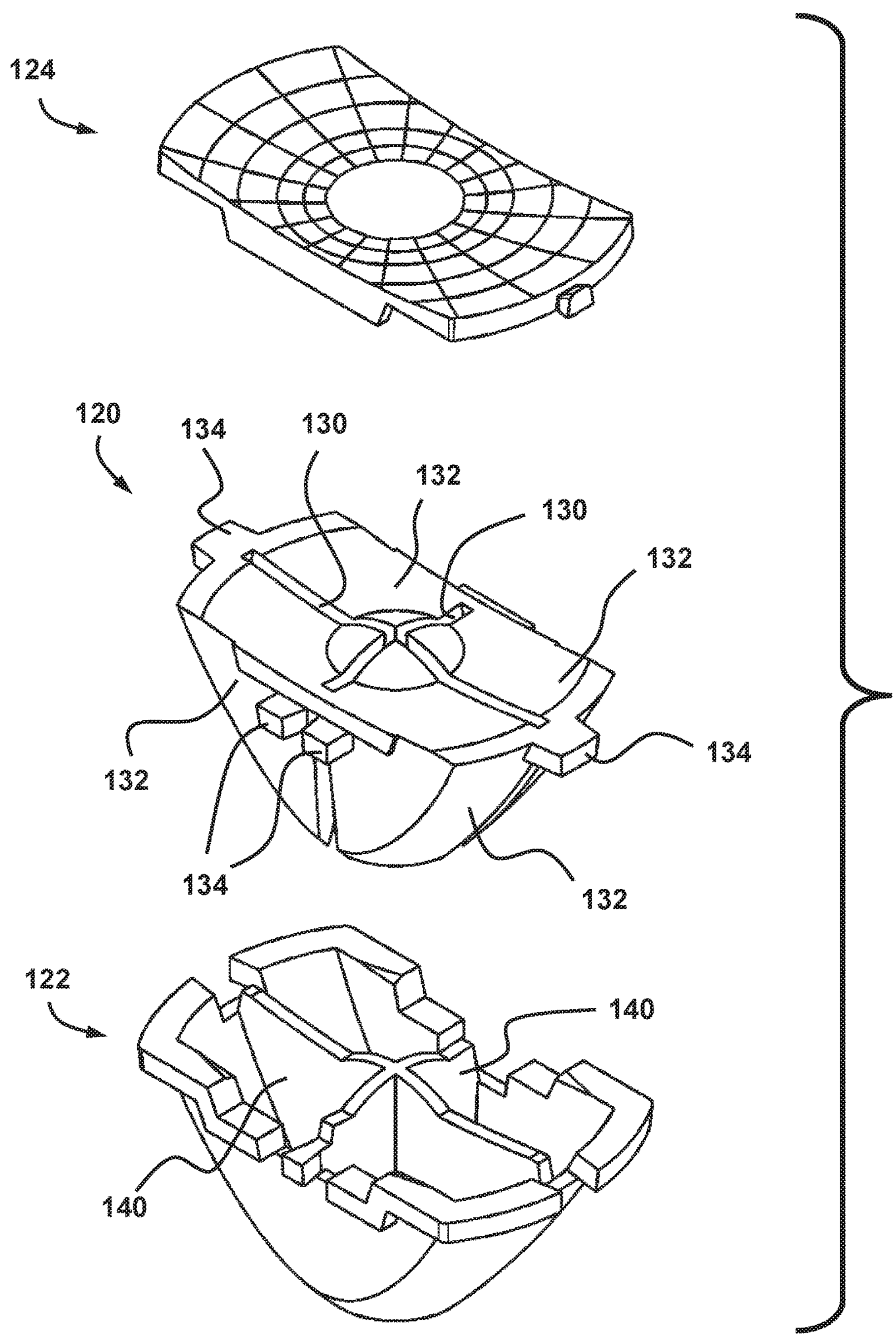
FIG. 11 is a view similar to FIG. 10 but as viewed from another angle.

FIG. 10 is an exploded isometric view depicting the parts of the lens 100 of FIG. 1. FIG. 11 is a view similar to FIG. 10 but as viewed from another angle. As can be seen, the lens core part 120 of the lens 100 includes two elongated slots 130 intersecting at the center. The slots 130 are perpendicular to one another and are rectilinear. They divides the lens core part 120 in four subparts 132, namely in four subparts 132 having a substantially similar volume. The four subparts 132 remain connected to one another by relatively small interconnecting portions. The lens core part 120 forms a monolithic piece over which the two outer lens parts 122, 124 are molded. The configuration is made of create smaller subparts that are easier to cool than a very thick one when the lens core 120 is manufactured. Various tabs 134 are also provided around the lens core part 120, for instance for positioning of the lens core part 120 during manufacturing.

Figure 12:
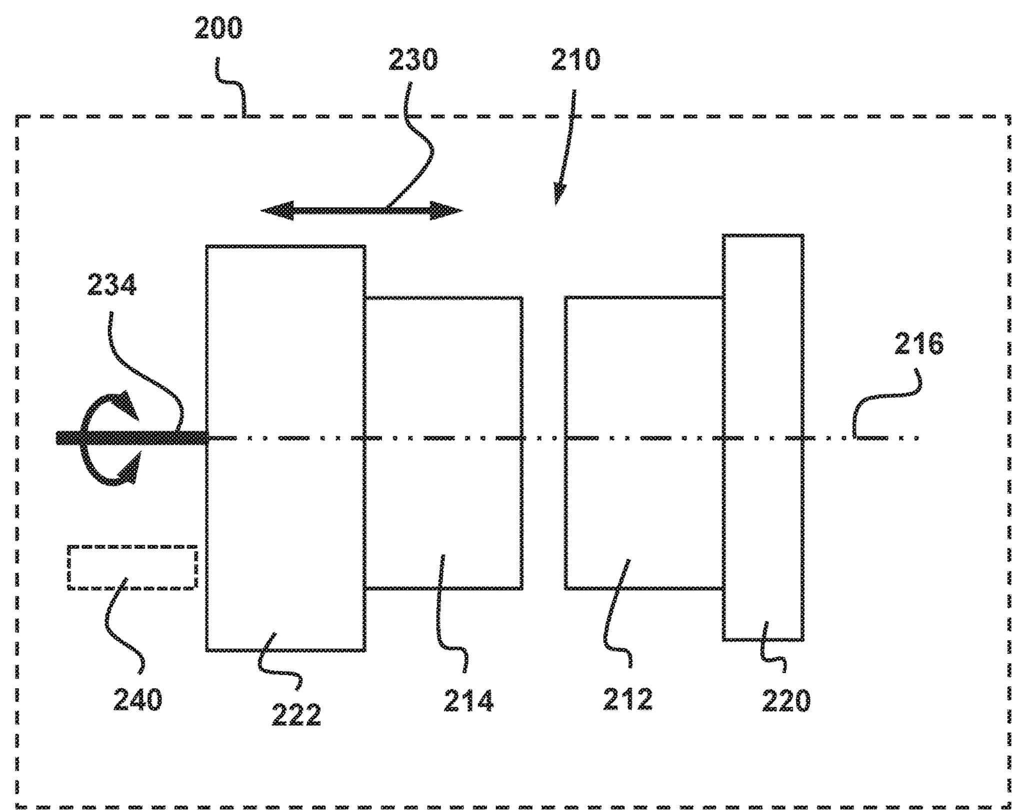
FIG. 12 is a schematic side view illustrating an example of a generic injection molding apparatus for use with an injection molding device of the proposed concept.

FIG. 12 is a schematic side view illustrating an example of a generic injection molding apparatus 200 for use with an injection molding device 210 as proposed herein. The injection molding device 210 is a portion of the injection molding apparatus 200. This is only one possible implementation of the proposed concept. Variants are possible as well.

As known to a person skilled in the art of plastic injection molding, the injection molding apparatus 200 will include a multitude of other components required for injecting plastic. For instance, it generally includes at least one source of hot molten plastic material, such a heated barrel in which is located a reciprocating plasticizing screw. Plastic granules are melted inside the heated barrel and the screw forces the molten plastic material into mold cavities at a given pressure. More than one barrel can be provided inside the same injection molding apparatus 200, depending on its design. For instance, one can have a corresponding barrel for each injection shot required to create the lens 100. These various components are generally well known for a person skilled in the art of injection molding and need not be further described herein.

The injection molding device 210 generally includes two parts, namely a first mold plate half 212 and a second mold plate half 214. The two mold plate halves 212, 214 are in registry with one another along a central axis 216 and their front surfaces are facing one another. The injection molding device 210 reciprocally opens and closes using parts moving along this central axis 216.

The injection molding apparatus 200 includes a frame to hold the injection molding device 210 in position. As schematically depicted in FIG. 12, the rear side of the first mold plate half 212 is attached to a first frame member 220 and the rear side of the second mold plate half 214 is attached to a second frame member 222. The second frame member 222 can both slide along a longitudinal axis 230 and pivots around a rotation axis 234. It can only pivot when the two mold plate halves 212, 214 are away from one another, as shown. The whole second mold plate half 214 will follow the movements of the second frame member 222. These movements will occur between each stage of the manufacturing process.

It should be noted that the first mold plate half 212 is sometimes called the "fixed half". The second mold plate haft 214 is sometimes called the "movable half" since it is one moving relative to the other.

One or more actuators are provided in the injection molding apparatus 200 to move the second mold plate half 214 with reference to the first mold plate half 212. An actuator is schematically illustrated in FIG. 12 at 240. The actuator or actuators 240 can also be used to generate the mold clamping force when the two mold plate halves 212, 214 are in their closed position. The clamping force must be high enough to withstand the pressures created inside the mold cavities during each injection shot.

The first mold plate half 212 and the second mold plate half 214 include corresponding components such as cooling channels, venting channels, internal heaters, to name just a few. Again, these various components are generally well known for a person skilled in the art of injection molding and need not be further described herein.

In use, each lens layer is formed by injecting the hot molten plastic material into a corresponding mold cavity in an injection shot during which a given amount of the hot molten plastic material follows a path leading inside the corresponding mold cavity. Each mold cavity required for making the lens 100 is formed between the first mold plate half 212 and the second mold plate half 214 when they are brought together at their mating surfaces (i.e. the parting line). This is referred to as the "closed position". When they are away from one another, this is referred to as the "opened position". The injection molding device 210 opens and closes at given intervals. The actuator or actuators 240 can be used to generate a mold clamping force when the two mold plate halves 212, 214 are in their closed position. The clamping force must be high enough to withstand the pressures created inside the mold cavities during each injection shot.

During an injection shot, the hot melt stream of the molten plastic material fills the mold cavity while air and gases are vented out of the mold cavity through venting channels at an opposite side. The first mold plate half 212 is the side from which the hot molten plastic material is injected in the illustrated example. Once the hot molten plastic material fills the entire mold cavity volume, a holding pressure is maintained to compensate for material shrinkage and prevent voids and/or bubbles from being formed. The plastic material then cools and solidifies during an initial cooling phase. The heat released during the initial cooling phase can be captured, for instance, by cooling channels located around the corresponding mold cavity. Water or other liquids can be circulated inside the cooling channels. Variants are possible as well.

Figure 13:
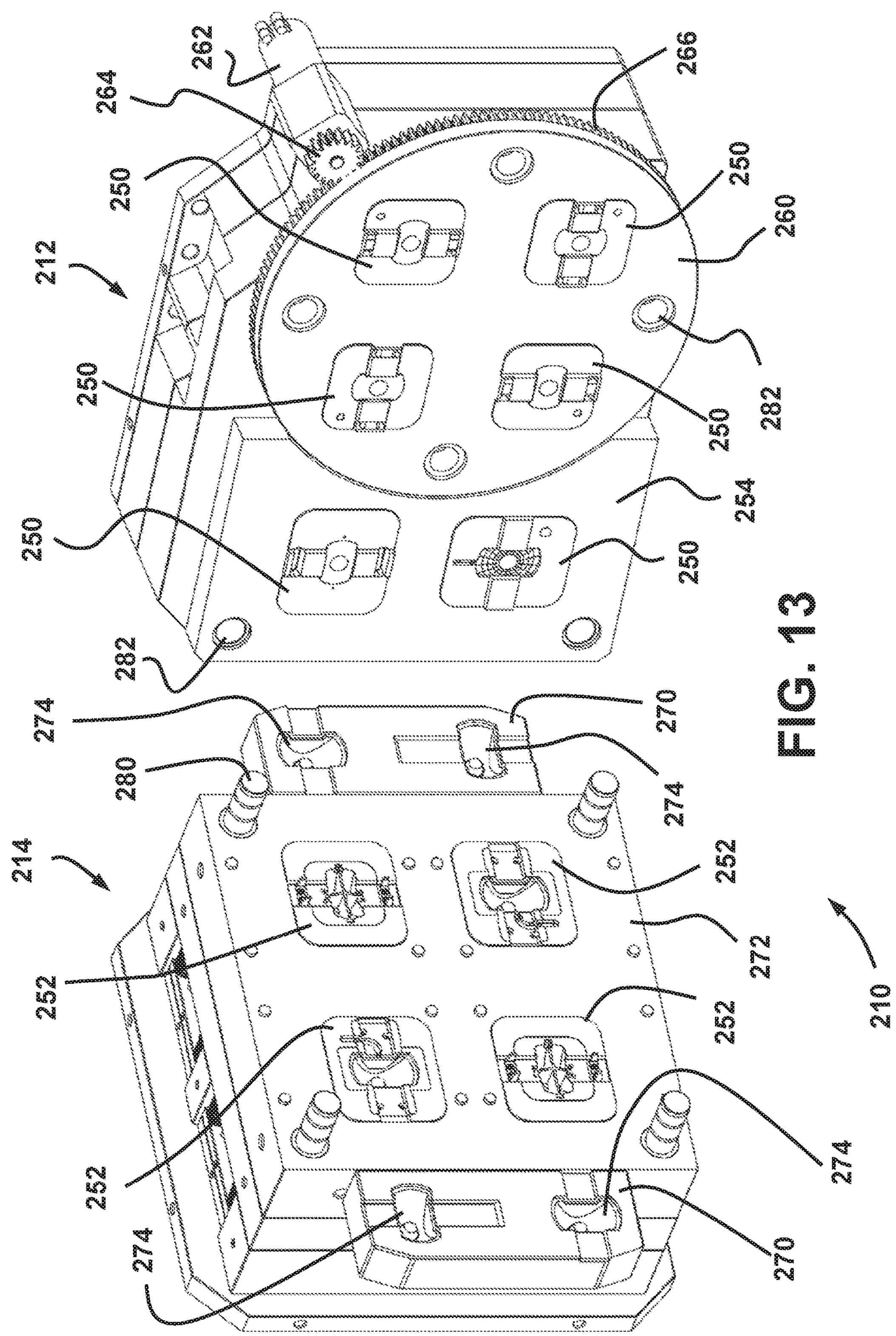
FIG. 13 is an isometric view of the first and second mold plate halves of a first example of an injection molding device of the proposed concept.

FIG. 13 is an isometric view of the first mold plate half 212 and the second mold plate half 214 of a first example of an injection molding device 210 of the proposed concept. This injection molding device 210 can be used in the injection molding apparatus 200 that is schematically depicted in FIG. 12. It must be understood that FIG. 13 illustrates the first mold plate half 212 and the second mold plate half 214 as if they were completely detached from inside the injection molding apparatus 200. When they are in their opened position, they are still facing one another as in FIG. 12. The layout of FIG. 13 is only for the sake of illustration.

The injection molding device 210 is designed to manufacture the lens 100 with a very short cycle time and also with an improved the lens quality. A shorter cycle time mean that more lenses can be manufactured over a given time period and an improved lens quality means that stringent tolerances can be met even if the lens 100 is relatively large in size. The molded parts remain in the injection molding device 210 until all layers are formed.

Overall, the proposed concept promotes having a stable batch-to-batch consistency and a very surface accuracy while preventing voids and/or bubbles from being formed inside the lens body. This will result in an injection molding devices and methods of manufacturing lenses that are both very accurate and cost effective. Overall, six lenses 100 are being manufactured at the same time inside the illustrated injection molding device 210. Variants are possible as well.

As can be seen in FIG. 13, the first and second mold plate halves 212, 214 include corresponding mold core inserts 250, 252. In the illustrated example, there are six mold core inserts 250 on the first mold plate half 212 and four mold core inserts 252 on the second mold plate half 214. Variants are possible as well.

Also in the illustrated example, the first mold plate half 212 includes a first rotatable carrier platen 260 on which are provided four of its mold core inserts 250. The other two mold core inserts 250 of the first mold plate half 212 are provided on a non-rotating portion of the first mold plate half 212.

The front surface of the first rotatable carrier platen 260 is flush with the front surface of the adjacent non-rotating portion of the first mold plate half 212. The first rotatable carrier platen 260 is driven in rotation around a rotation axis 232 by a rotatable actuator 262, for instance an electric motor, when the two mold plate halves 212, 214 are in the opened position. Pivoting the first rotatable carrier platen 260 will reposition the corresponding mold core inserts 250 with reference to the mold core inserts 252 on the second mold plate half 214. The electric motor 262, as shown, includes a gear 264 engaging the toothed outer periphery 266 of the first rotatable carrier platen 260. This first rotatable carrier platen 260 pivots by increments of 90 degrees. Other kinds of driving systems are also possible.

The mold core inserts 250 on the first rotatable carrier platen 260 are axisymmetric with reference to the rotation axis 232. They are identical to one another but they are disposed 90 degrees apart.

There are two kinds of mold core inserts 252 on the second mold plate half 214, two of each kind. They are disposed diagonally with reference to one another.

The second mold plate half 214 further includes two opposite cooling jigs 270 located on the sides of the second rotatable carrier platen 272 on which the four mold core inserts 252 are located. Each of the two cooling jigs 270 includes two cooling core inserts 274, which are disposed 90 degrees apart from one another on the same cooling jig 270 but are otherwise all identical in shape. The front surface of the two cooling jigs 270 is flush with the surface of the second rotatable carrier platen 272 but a groove is provided on their front surface to accommodate a gripping system located on each mold cavity insert 250 on the first rotatable carrier platen 260. The four cooling core inserts 274 will not be used for an injection shot but rather to hold the lens core part 120 during additional post-molding cooling stages.

In the first illustrated example, the second mold plate half 214 also includes a set of four pre-centering leader pins 280 that can fit inside corresponding pre-centering bushings 282 provided on the first mold plate half 212. There are six pre-centering bushings 282 in FIG. 13, thus two more than the number of four pre-centering leader pins 280. The additional pre-centering bushings 282 are not in registry with any one of the pre-centering leader pins 280. They are provided on the first rotatable carrier platen 260 of the first mold plate half 212. They provided a precise positioning between the first and second mold plate halves 212, 214. The pins 280 also prevent the first rotatable carrier platen 260 from pivoting when the first and second mold plate halves 212, 214 are in their closed position.

As aforesaid, three lens layers are required to make the lens 100 of FIG. 1 and the lens 100 is formed by a multistep process. The lens core part 120 will be formed first, followed by the other two outer lens parts 122, 124 (see FIG. 5 for instance).

Figure 14:
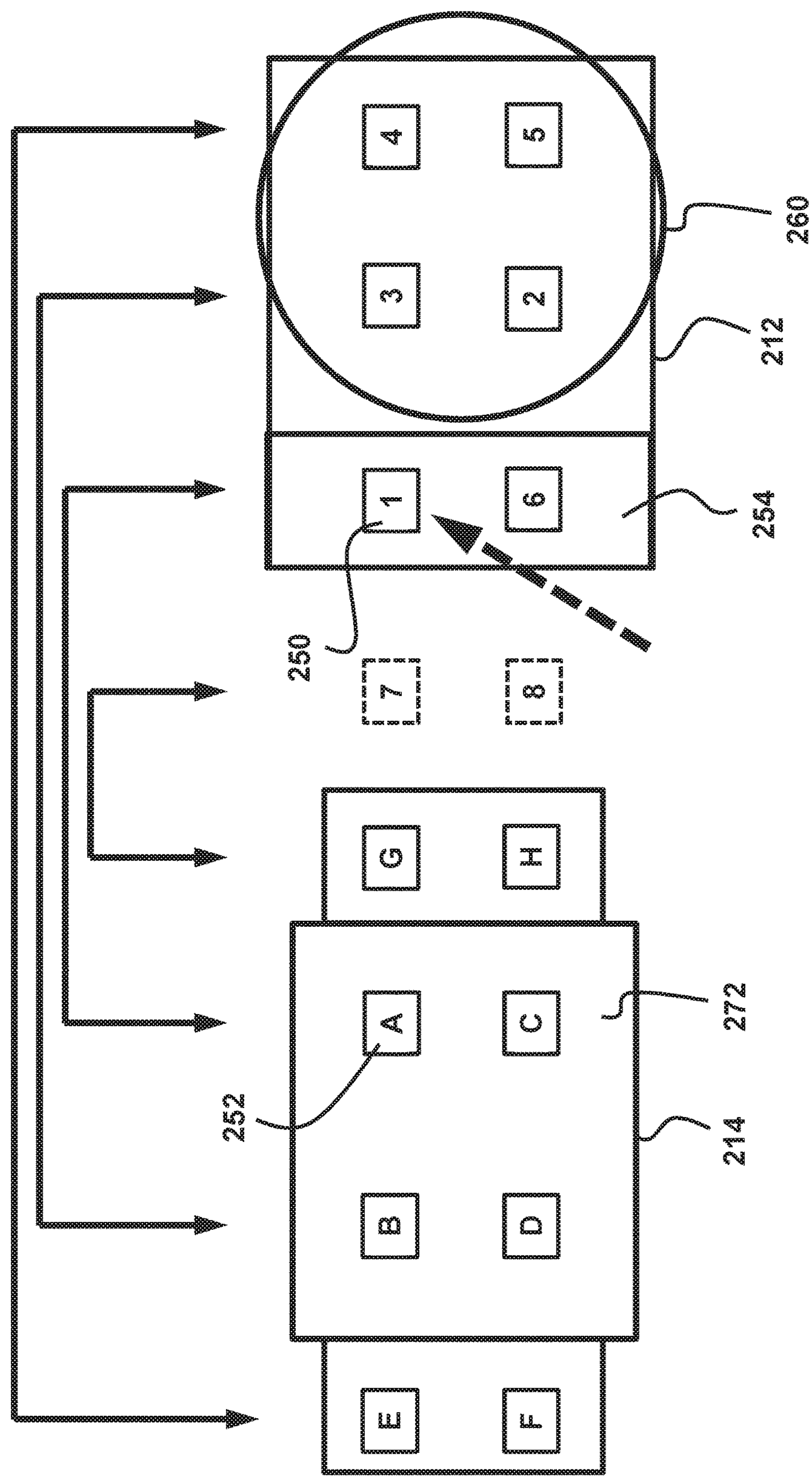
FIG. 14 is a schematic view depicting how the first and second mold plate halves of FIG. 13 are positioned and which elements match together during the first injection shot in the first example.

FIG. 14 is a schematic view depicting how the first and second mold plate halves 212, 214 of FIG. 13 are positioned and which elements match together during the first injection shot in the first example. The solid-line arrows show the matching sets when the two mold plate halves 212, 214 are in their closed position. The mold core inserts 250 are labeled "1" to "6". The mold core inserts 252 and the cooling core inserts 274 are labeled "A" to "H". The mold core inserts 250 on the first rotatable carrier platen 260 are labeled "2", "3", "4" and "5". The two mold core inserts 250 labeled "1" and "6" are on a stationary platen 254 of the first mold plate half 212. These two mold core inserts 250 are also adjacent to one another. The volume of the mold core insert 250 labeled as "6" is larger than the one labeled as "1" since it will be used for a third injection shot. The stationary platen 254 is coplanar with the first rotatable carrier platen 260.

The first injection shot is done in the first mold cavity formed between the internal surfaces of the mold core insert 250 that is labeled as "1" and the internal surfaces of the mold core insert 252 that is labeled as "A". The first injection shot always occurs inside the mold core insert 250 labeled as "1" but the opposite mold core insert 252 alternates between "A" and "D".

It should be noted that the labeling is only provided to follow the positions of the mold core inserts 250, 252 during the process. Also, the boxes identified with labels "7" and "8" correspond to positions outside the surface of the first mold plate half 212. They are only for the sake of illustration.

The first injection shot is carried out when the first and second mold plate halves 212, 214 are in their closed position. The first injection shot will form the lens core part 120. The hot molten plastic is injected from the rear of the first mold plate half 212. The first and second mold plate halves 212, 214 will stay in the closed position for a given time afterwards. Once the lens core part 120 is cooled to a certain point, the first and second mold plate halves 212, 214 can be opened.

Figure 15:
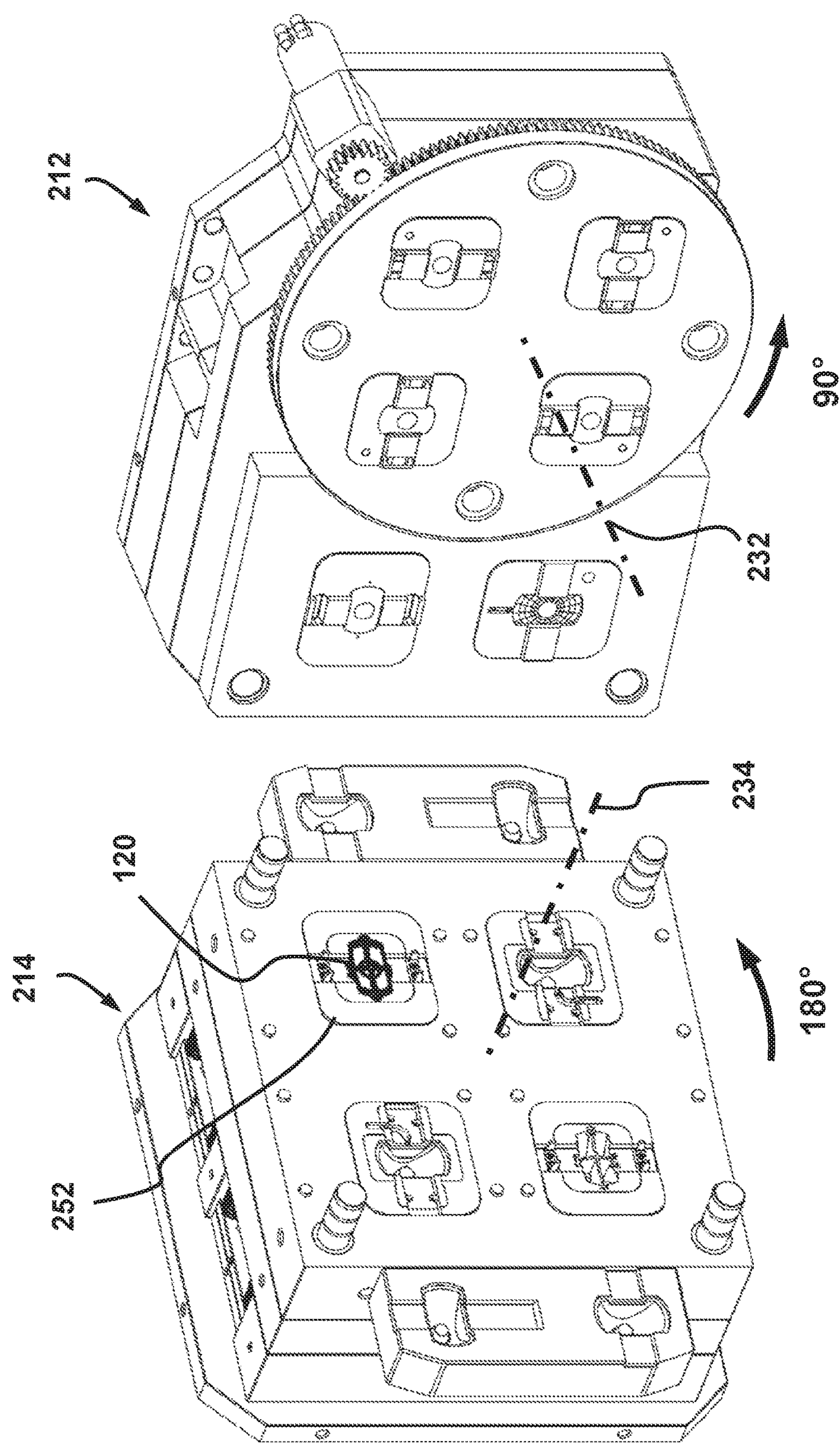
FIG. 15 is a view similar to FIG. 13, showing the first and second mold plate halves after the first injection shot and before pivoting.

FIG. 15 shows the first and second mold plate halves 212, 214 after the first injection shot, once they are in their opened position, before pivoting. The lens core part 120 is then located in the mold core insert 252 labeled as "A" in FIG. 14. FIG. 15 also shows the first and second mold plate halves 212, 214 before the first rotatable carrier platen 260 is pivoted of 90 degrees (in the counterclockwise direction, as viewed in FIG. 15) and the whole second mold plate half 214 is pivoted of 180 degrees to reposition the lens core part 120. These two motions will be repeated between each stage. The parts are pivoted simultaneously but variants are possible as well.

Figure 16:
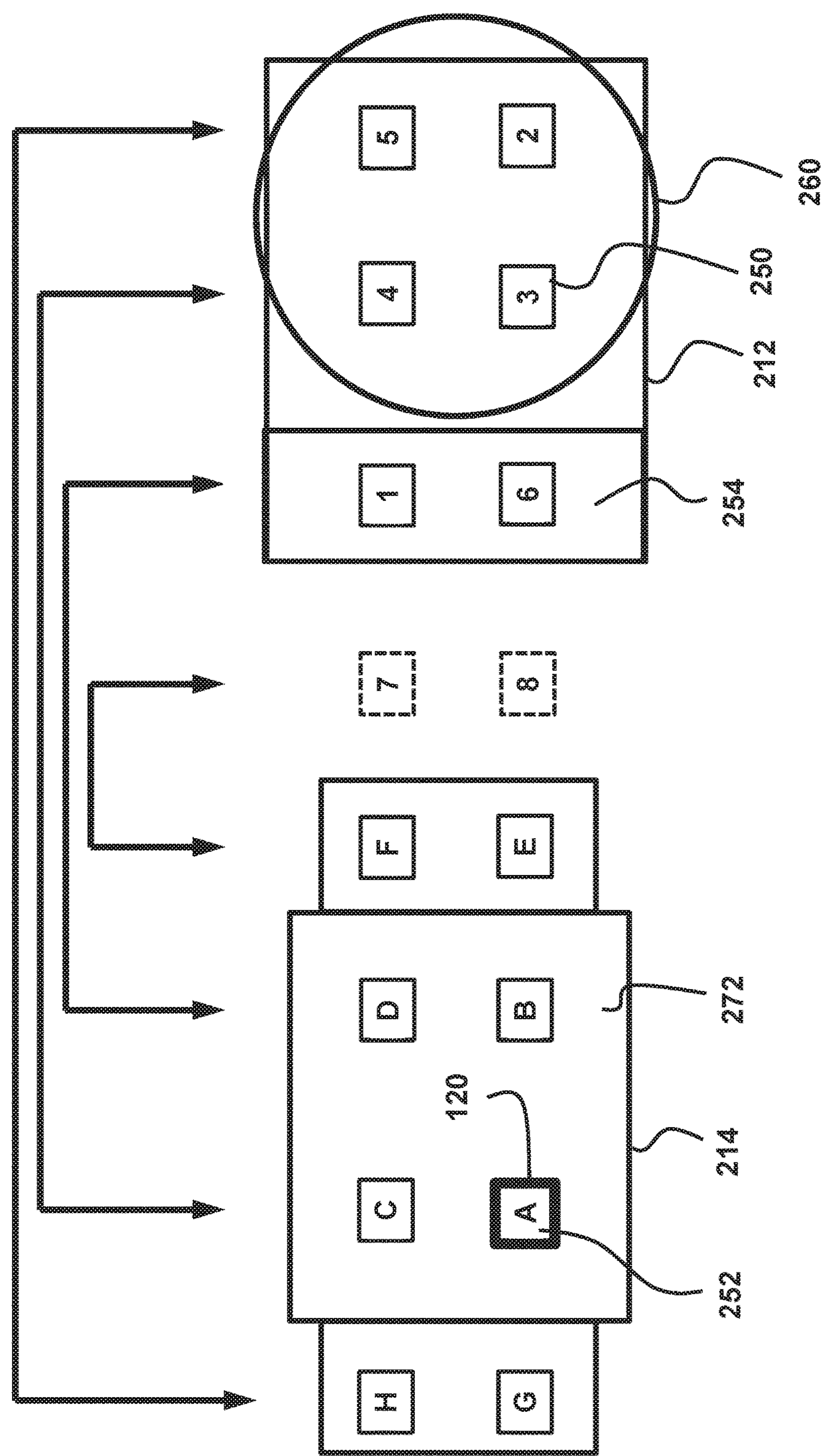
FIG. 16 is a view similar to FIG. 14, showing the position of the various elements after pivoting the first and second mold plate halves shown in FIG. 15.

FIG. 16 shows the position of the various elements after pivoting the first and second mold plate halves 212, 214 shown in FIG. 16. The lens core part 120 is located in the mold core insert 252 labeled as "A".

Once the pivoting is completed, the first and second mold plate halves 212, 214 can be closed again. The lens core part 120 will now engage the mold core insert 250 labeled as "3". This will begin a post-molding cooling stage. As one skilled in the art will understand, the post-molding cooling stage is a supplemental cooling since the lens core part 120 already cooled to a certain level immediately after the first injection shot and before the first and second mold plate halves 212, 214 opened. However, because it is relatively thick, more cooling time is required in this will be done inside a mold cavity where the conditions are optimum.

Figure 17:
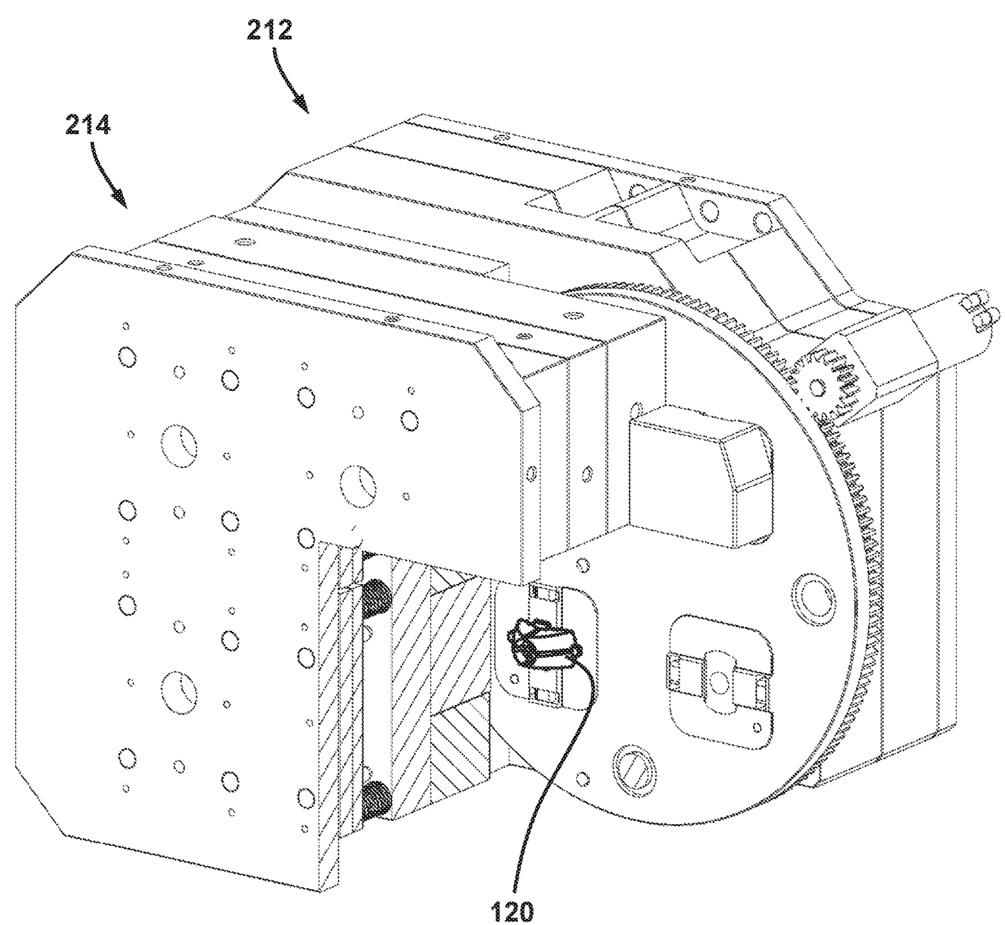
FIG. 17 is an isometric and partially cut-away view illustrating the first and second mold plate halves in their closed position during the post-molding cooling stage of the lens core part.

Meanwhile, the mold core insert 252 labeled as "D" is now in registry with the mold core insert 250 labeled as "1". The post-molding cooling stage of the lens core part 120 shown in FIG. 17 is the first injection shot of the next lens core part to be made. The productively of the manufacturing is thus very high since a new lens core part is being made at every cycle. Each cycle will have the same time period in most implementations.

It should be noted that the figures only show one lens 100 being made for the sake of simplicity. Six lenses are being made at the same time inside the injection molding device 210, all being at different stages. Variants are possible as well.

FIG. 17 is an isometric and partially cut-away view illustrating the first and second mold plate halves 212, 214 in their closed position during the post-molding cooling stage of the lens core part 120.

Figure 18:
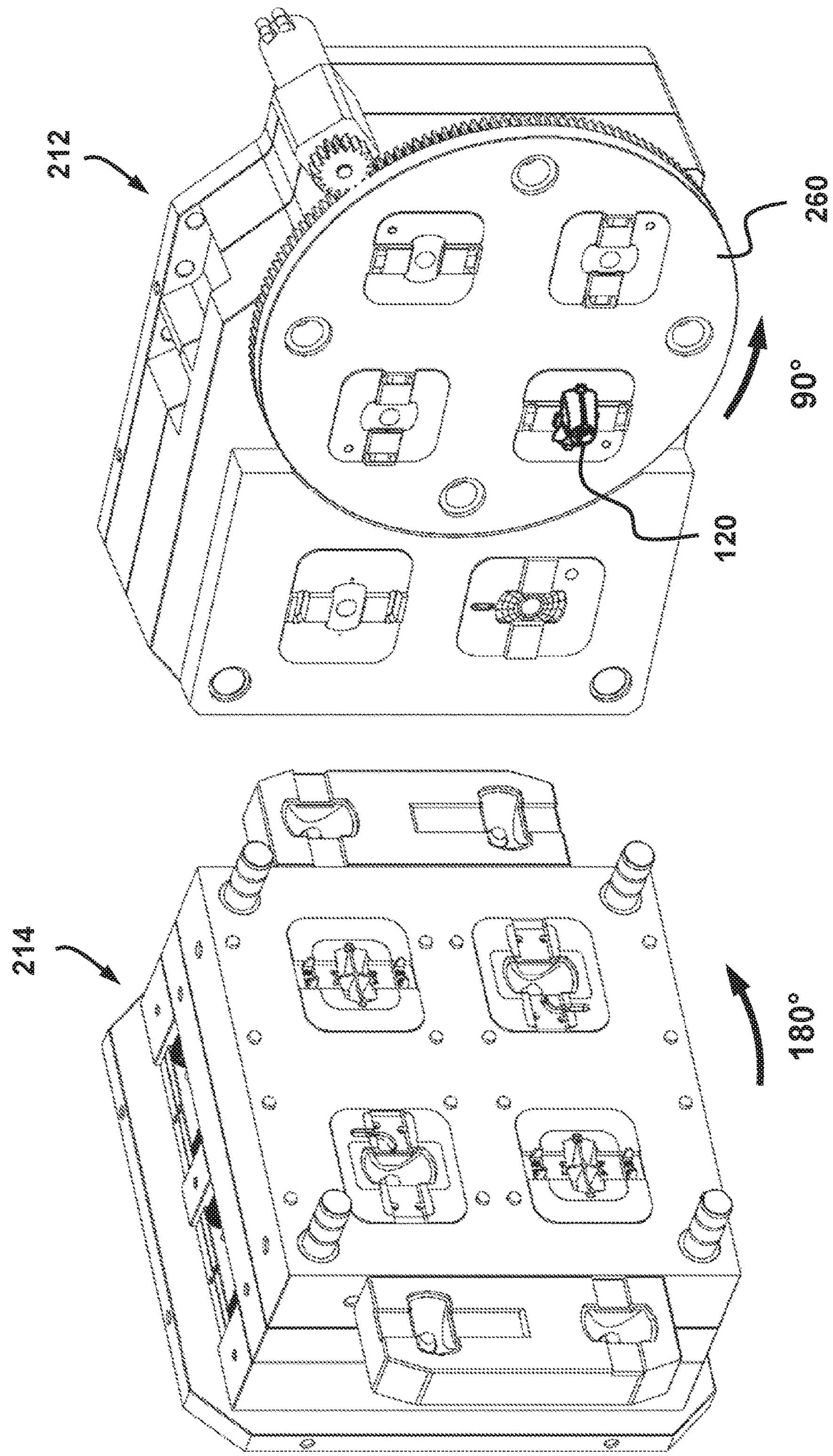
FIG. 18 is a view similar to FIG. 13, showing where the lens core part is located after the post-molding cooling stage, and once the first and second mold plate halves are in their opened position, and before pivoting.

FIG. 18 shows where the lens core part 120 is located after the post-molding cooling stage, once the first and second mold plate halves 212, 214 are in their opened position, and before pivoting. As can be seen, the lens core part 120 is now held by the mold core insert 250 labeled as "3" on the first mold plate half 212. The lens core part 120 was gripped between two movable jaws located close to the surface of the corresponding mold core insert 250. These jaws are part of a gripping system. The lens core part 120 was also pushed out of the opposite mold core insert 252 when the first and second mold plate halves 212, 214 were opened. Variants are possible as well since many different techniques are possible. However, the lens being formed will always remain in position in at least one of the mold core inserts 250, 252 at all times until the last stage is completed.

FIG. 18 also shows the first and second mold plate halves 212, 214 before the first and second mold plate halves 212, 214 are pivoted to reposition the lens core part 120 after the post-molding cooling stage.

Figure 19:
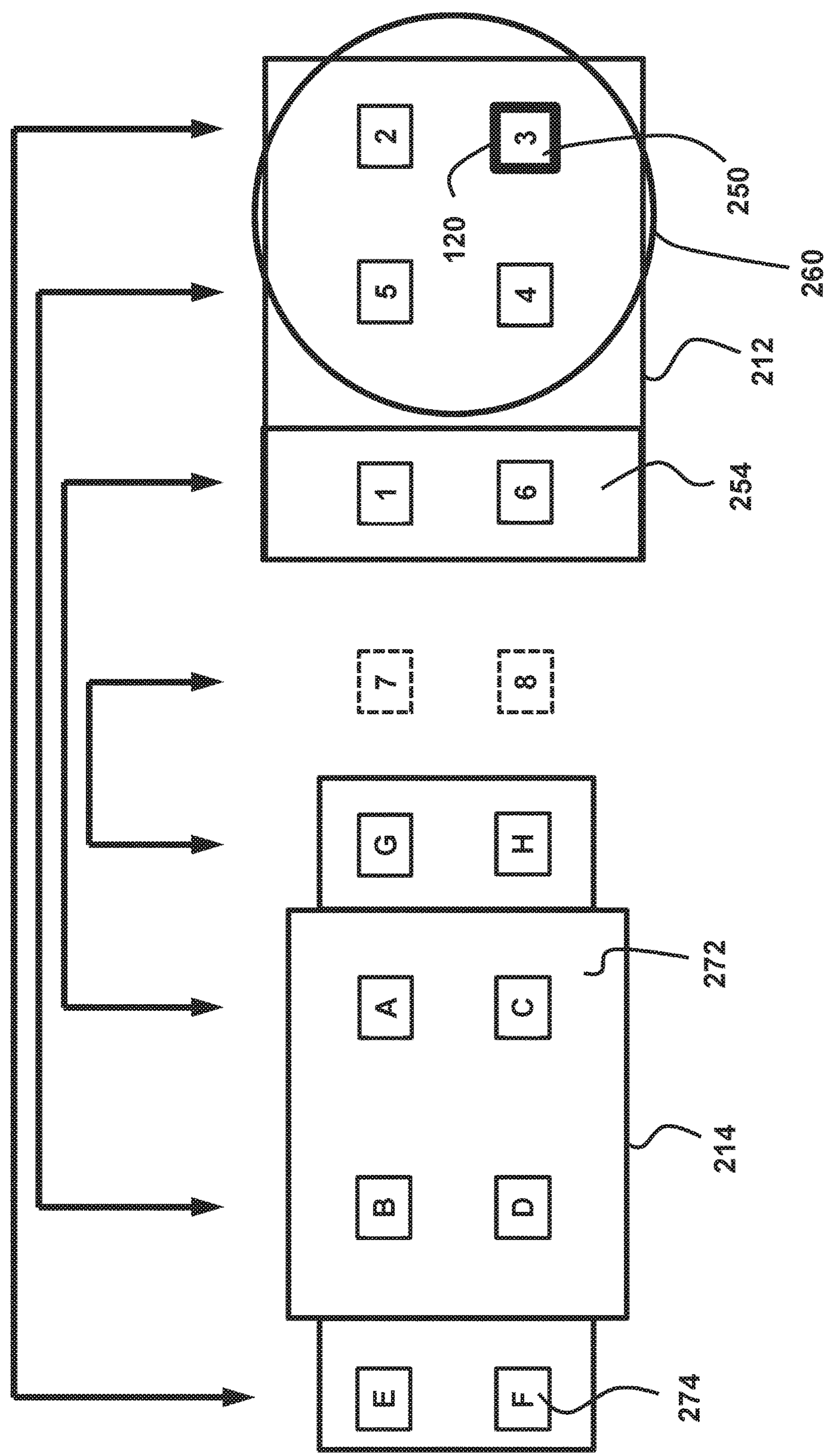
FIG. 19 is a view similar to FIG. 14, showing the position of the various elements after pivoting the first and second mold plate halves shown in FIG. 18.

FIG. 19 shows the position of the various elements after the pivoting of the first and second mold plate halves 212, 214 shown in FIG. 18. The lens core part 120 is still held by the mold core insert 250 labeled as "3" on the first mold plate half 212. This mold core insert 250 is now in registry with the cooling core insert 274 labeled as "F". The first and second mold plate halves 212, 214 can be set into their closed position afterwards for a first additional post-molding cooling stage. The word "additional" used herein denotes a post-molding cooling stage that may not necessarily be required in all instances.

Figure 20:
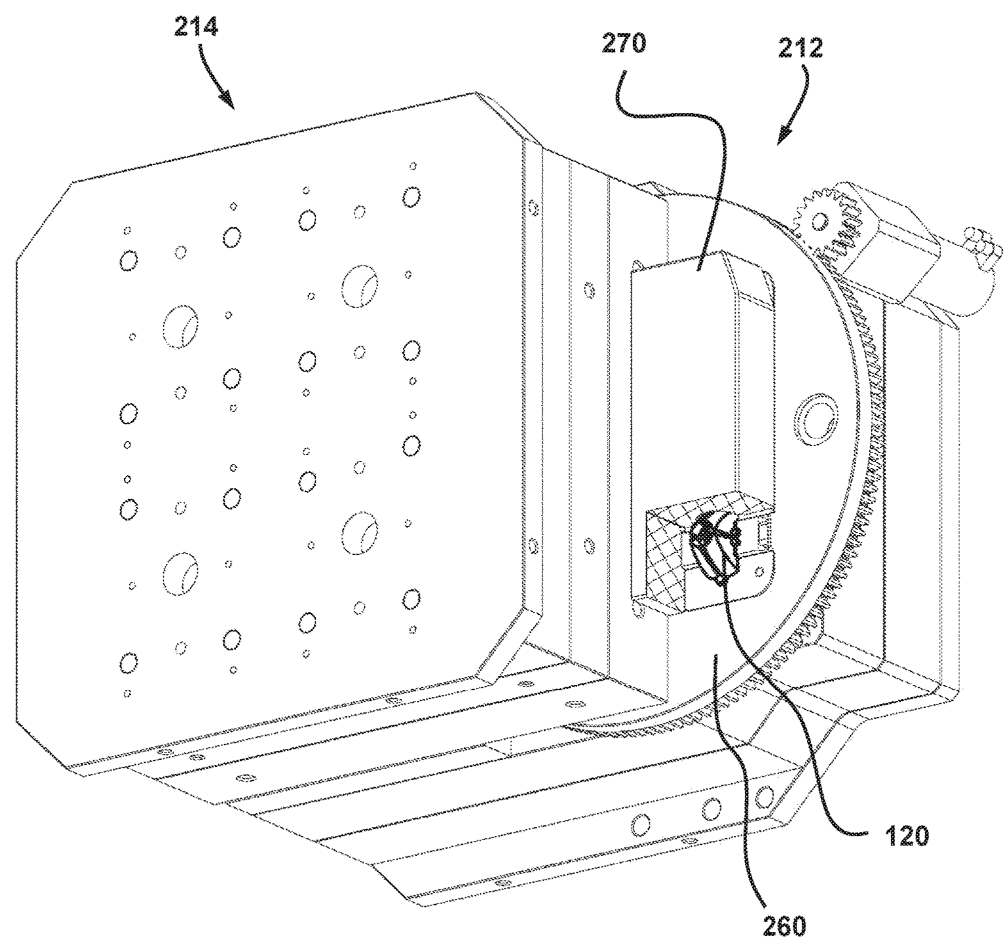
FIG. 20 is an isometric and partially cut-away view illustrating the first and second mold plate halves in their closed position during the first additional post-molding cooling stage of the lens core part.

FIG. 20 is an isometric and partially cut-away view illustrating the first and second mold plate halves 212, 214 in their closed position during the first additional post-molding cooling stage of the lens core part 120.

Figure 21:
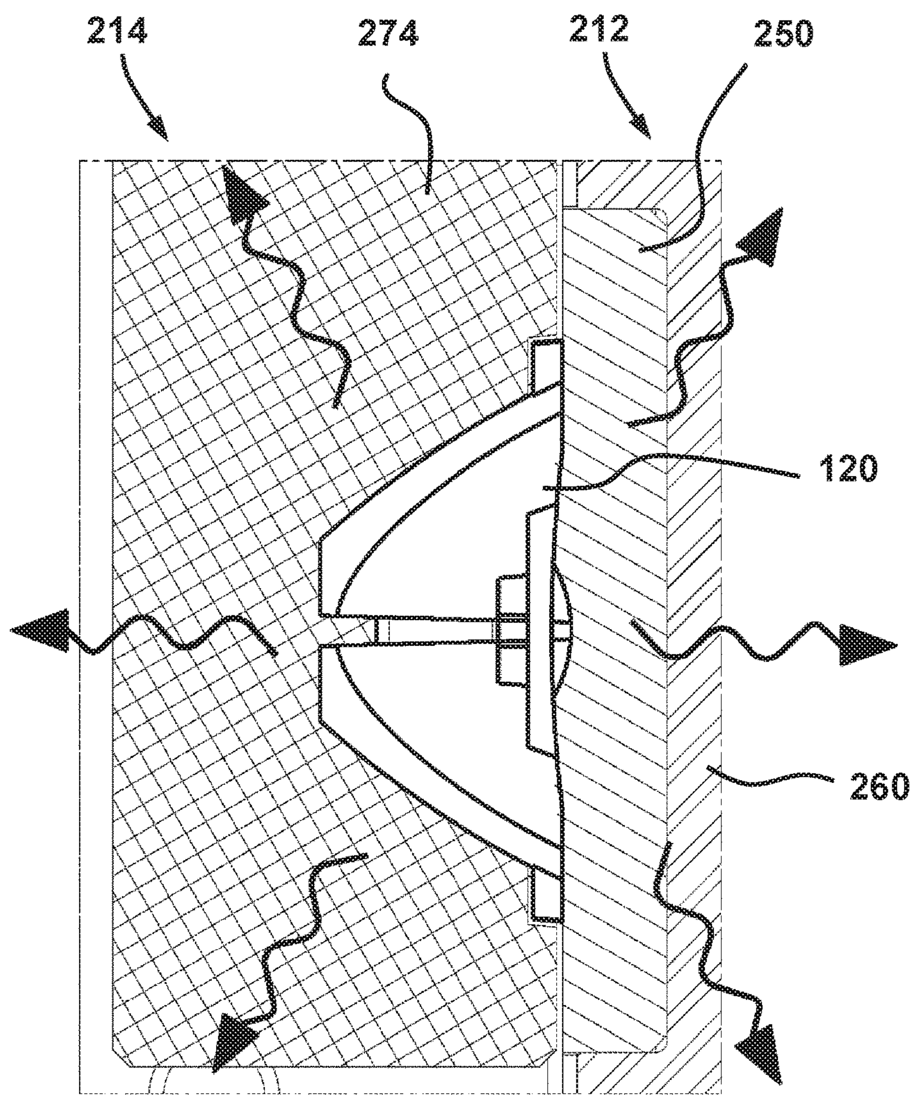
FIG. 21 is a semi-schematic cross-section view depicting heat being released from the lens core part during the first additional post-molding cooling stage.

FIG. 21 is a semi-schematic cross-section view depicting heat being released from the lens core part 120 during the first additional post-molding cooling stage. Heat is transferred by conduction to the first and second mold plate halves 212, 214. The various cooling channels in these components retrieve the heat.

If desired, the cooling or some of the cooling of the lens core part 120 can be done using a fluid flow on the surface of the lens core part 120. Heat will be transferred from the lens core part 120 to the fluid by convection. The lens core part 120 can be cooled by conduction, convection or both, depending on the requirements. Variants are possible as well.

Figure 22:
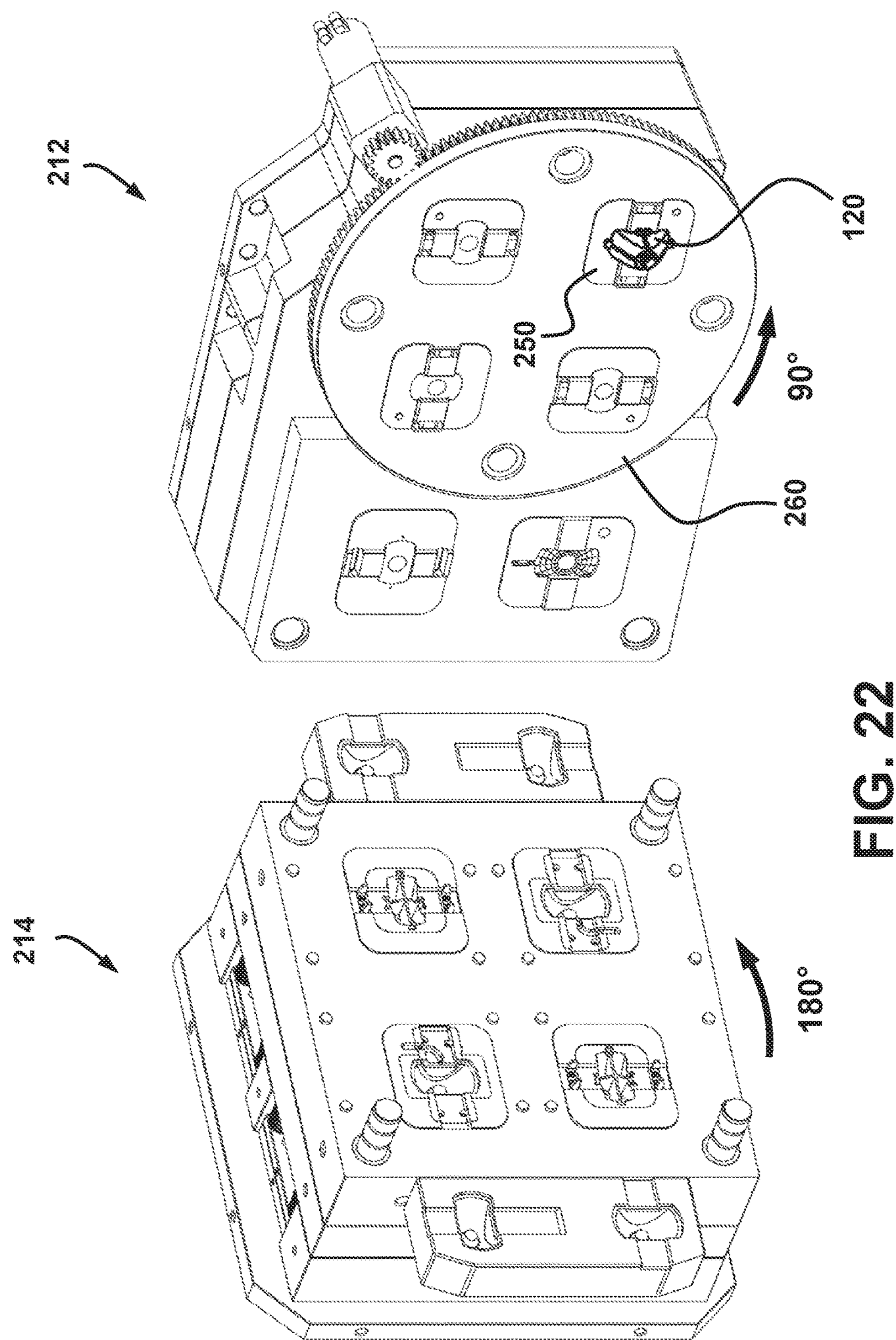
FIG. 22 is a view similar to FIG. 13, showing the first and second mold plate halves before they are pivoted after the first additional post-molding cooling stage.

FIG. 22 shows the first and second mold plate halves 212, 214 before are pivoted after the first additional post-molding cooling stage.

Figure 23:
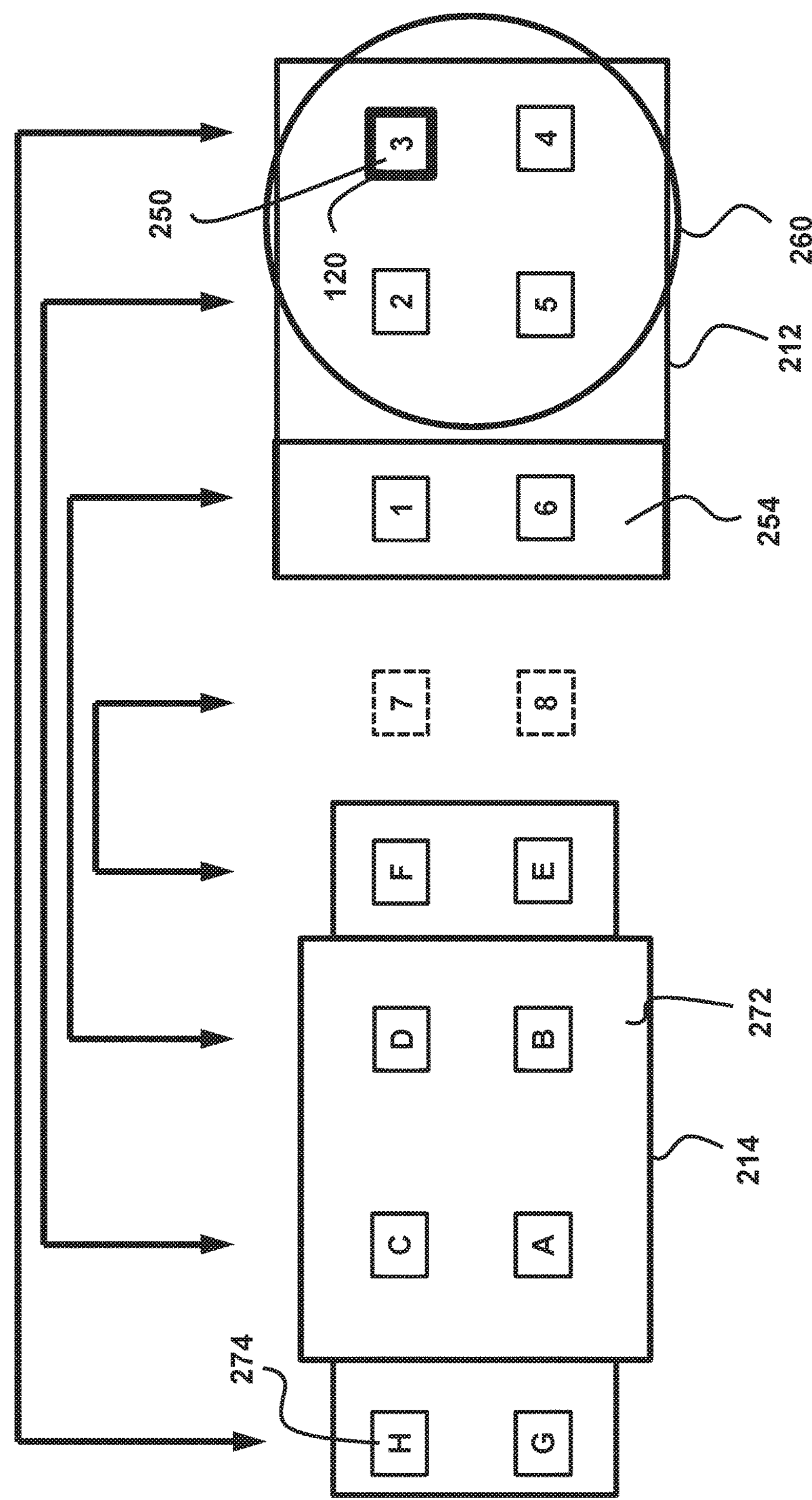
FIG. 23 is a view similar to FIG. 14, showing the position of the various elements after pivoting the first and second mold plate halves shown in FIG. 22.

FIG. 23 shows the position of the various elements after pivoting the first and second mold plate halves 212, 214 shown in FIG. 22. The first and second mold plate halves 212, 214 can be set afterwards into their closed position for a second additional post-molding cooling stage.

Figure 24:
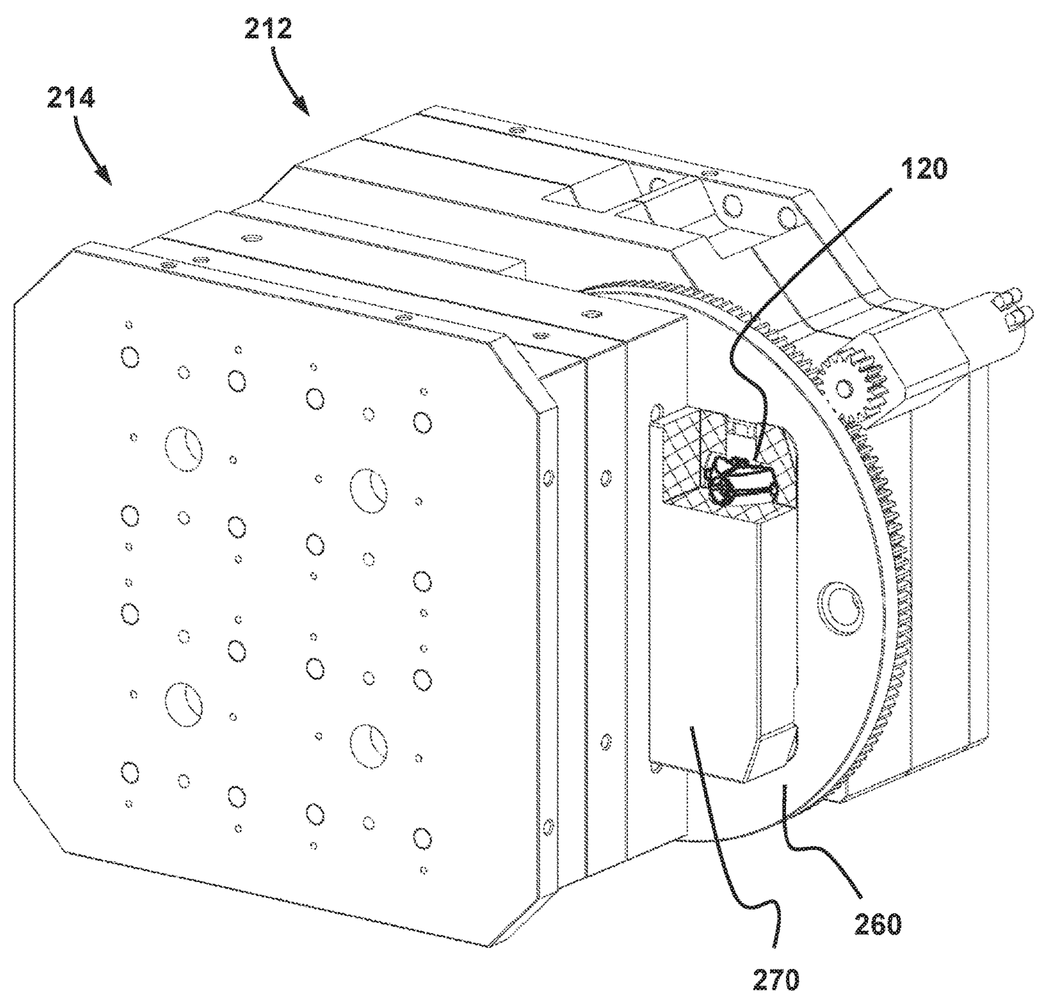
FIG. 24 is an isometric and partially cut-away view illustrating the first and second mold plate halves in their closed position during the second additional post-molding cooling stage of the lens core part.

FIG. 24 is an isometric and partially cut-away view illustrating the first and second mold plate halves 212, 214 in their closed position during the second additional post-molding cooling stage of the lens core part 120. The lens core part 120 is cooled between the mold core insert 250 labeled as "3" and the cooling core insert 274 labeled as "H".

Figure 25:
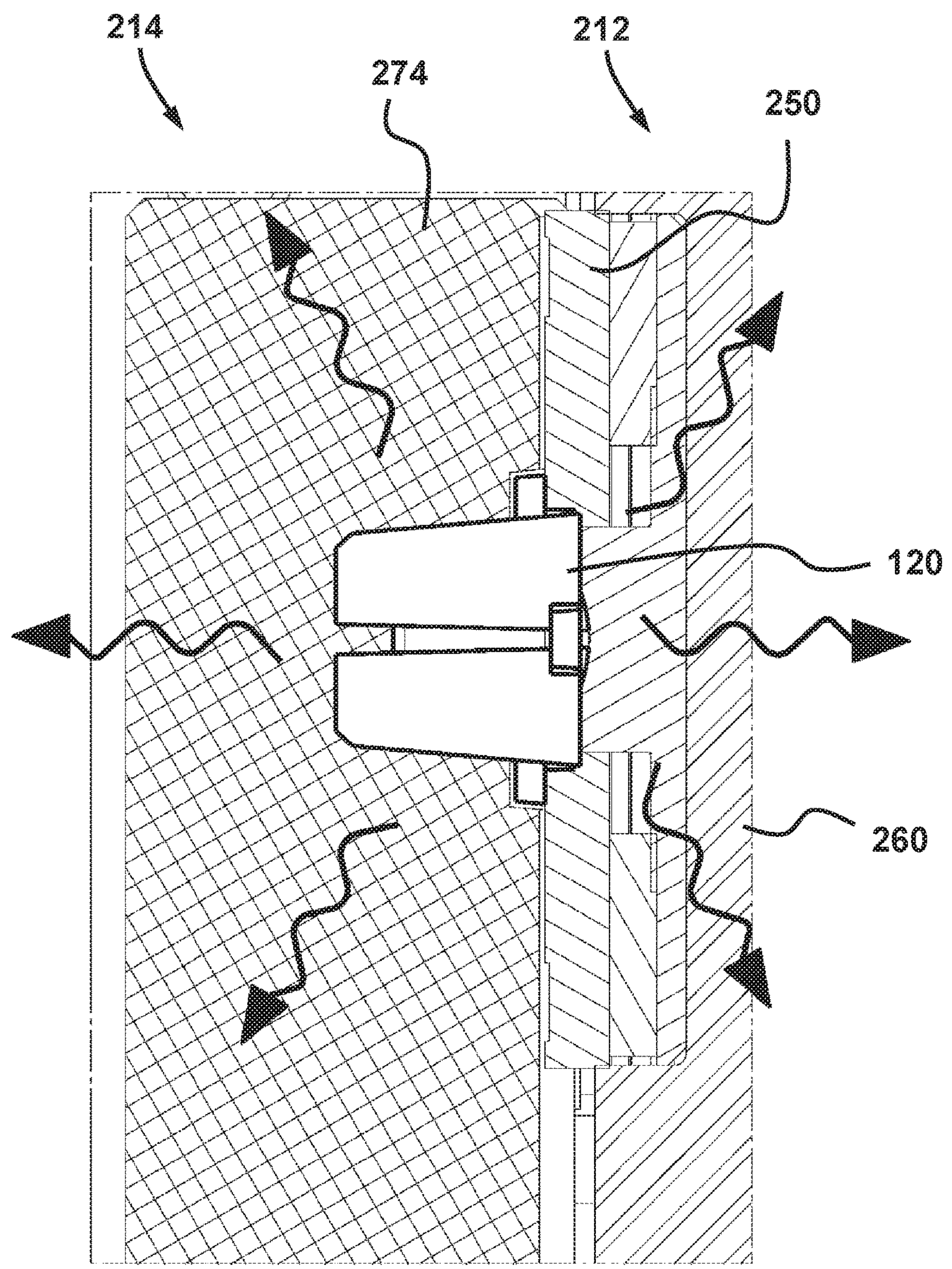
FIG. 25 is a semi-schematic cross-section view depicting heat being released from the lens core part during the second additional post-molding cooling stage.

FIG. 25 is a semi-schematic cross-section view depicting heat being released from the lens core part 120 during the second additional post-molding cooling stage. The first and second mold plate halves 212, 214 open after the second additional post-molding cooling stage.

Figure 26:
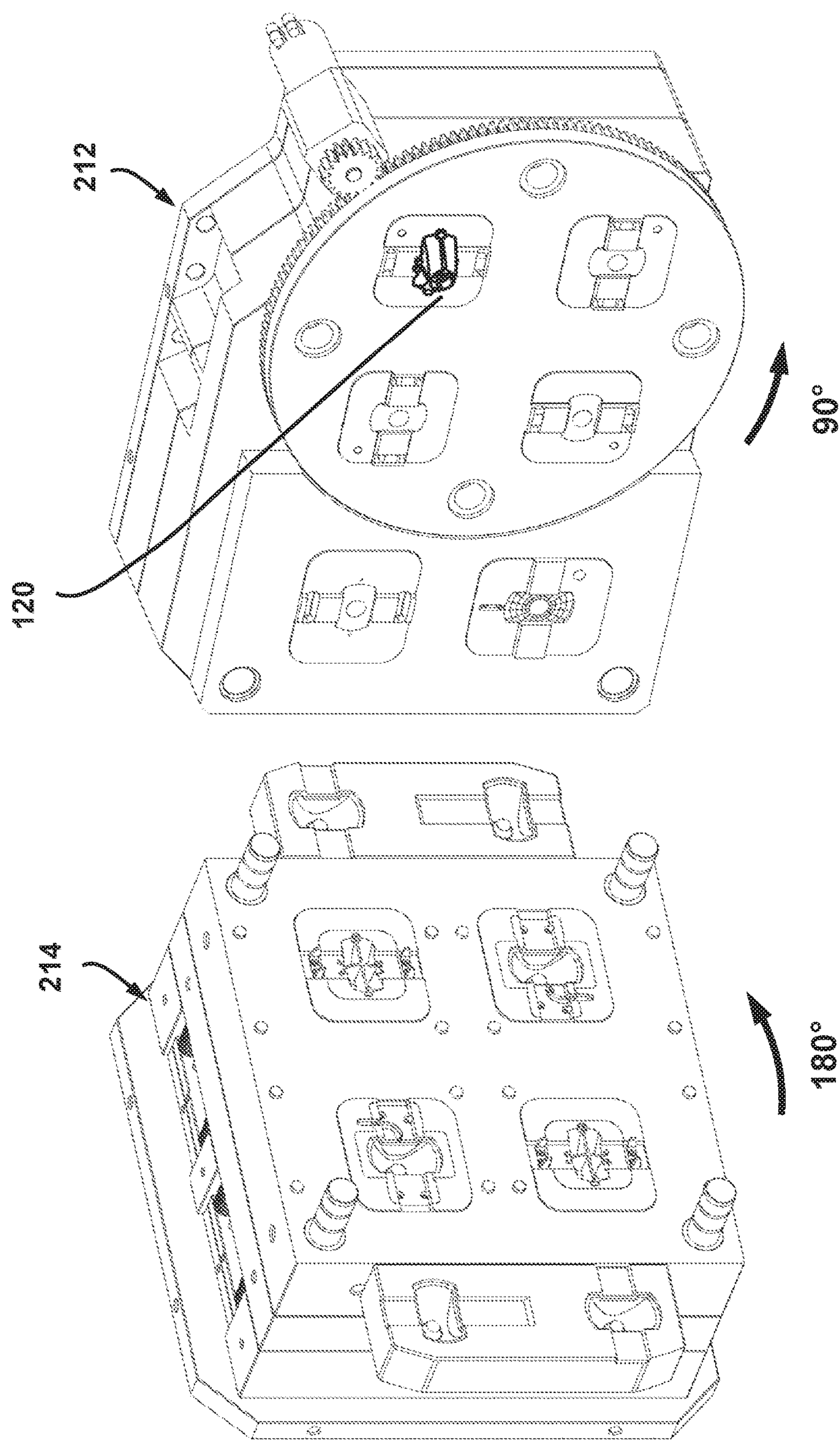
FIG. 26 is a view similar to FIG. 13, showing the first and second mold plate halves before they are pivoted after the second additional post-molding cooling stage.

FIG. 26 shows the first and second mold plate halves 212, 214 before they are pivoted after the second additional post-molding cooling stage.

Figure 27:
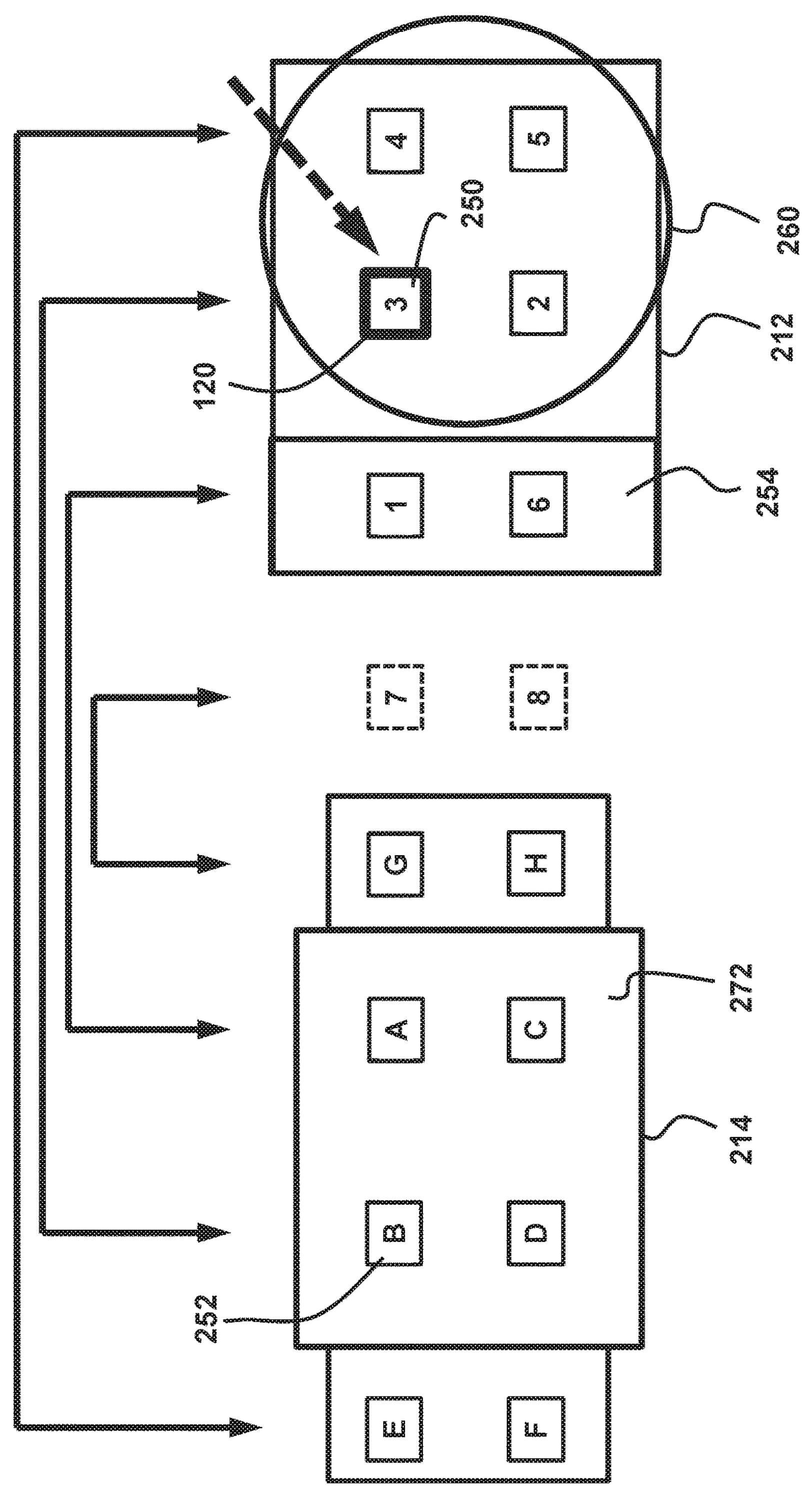
FIG. 27 is a view similar to FIG. 14, showing the position of the various elements after pivoting the first and second mold plate halves shown in FIG. 26.

FIG. 27 shows the position of the various elements after pivoting the first and second mold plate halves 212, 214 shown in FIG. 26. The first and second mold plate halves 212, 214 can be set afterwards into their closed position. The mold core insert 250 labeled as "3" is now in registry with the mold core insert 252 labeled as "B". This arrow illustrated with stippled lines in FIG. 27 represents the second injection shot of hot molten plastic material.

Figure 28:
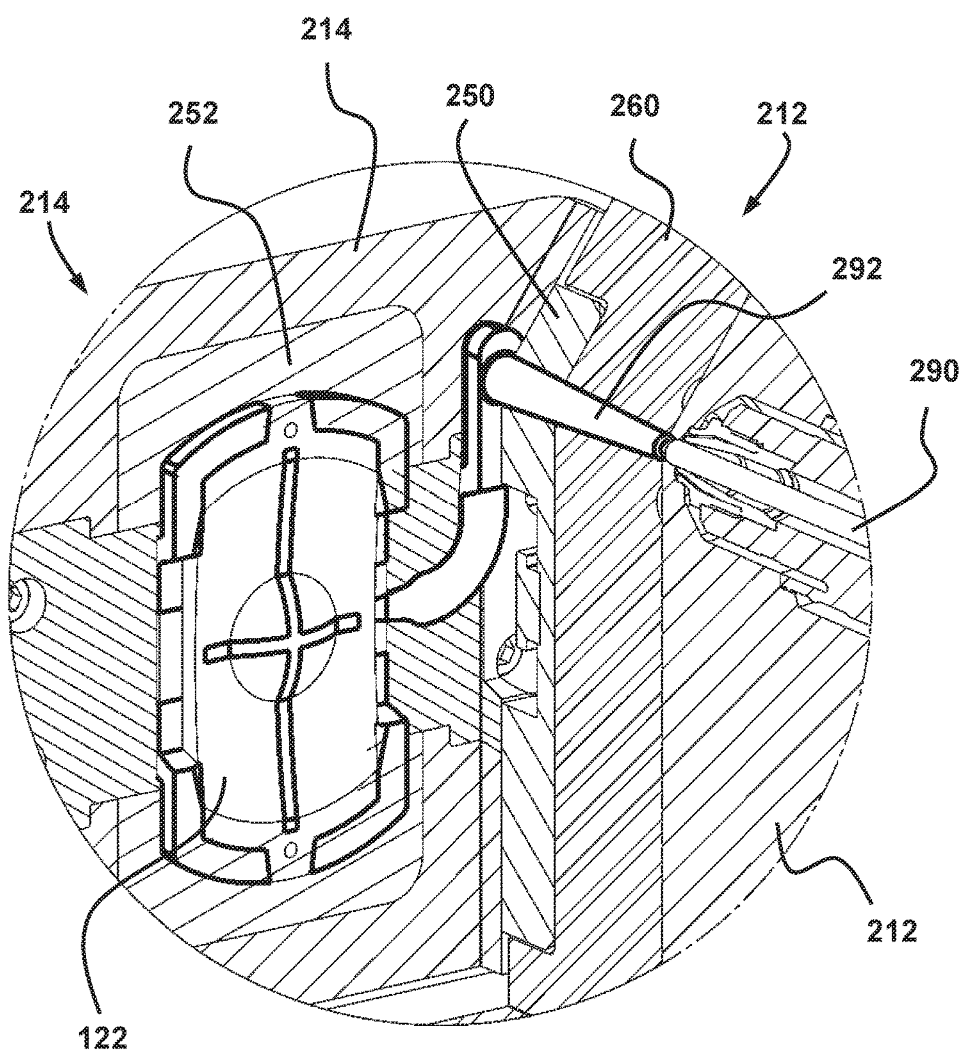
FIG. 28 is an enlarged cross-section view of the first outer lens part being formed over the lens core part during the second injection shot.

FIG. 28 is an enlarged view of the first outer lens part 122 being formed over the lens core part 120 during the second injection shot. This first outer lens part 122 is overmolded directly over the lens core part 120. Both parts 120, 122 will be fused together by the end of the manufacturing process.

As can be seen, the hot molten plastic material is injected across the first rotatable carrier platen 260. In this first illustrated example, it first flows into a hot runner 290 and then into a passageway 292 across the first rotatable carrier platen 260 as well as its corresponding mold core insert 250. The exit of the hot runner 290 is thus in registry with the inlet of the corresponding passageway 292. The hot molten plastic material enters the mold cavity at right angle. Variants are possible as well. Still, in this first illustrated example, all four mold core inserts 250 on the first rotatable carrier platen 260, and which are labeled "2", "3", "4" and "5", are configured and disposed to allow the second injection shot.

Figure 29:
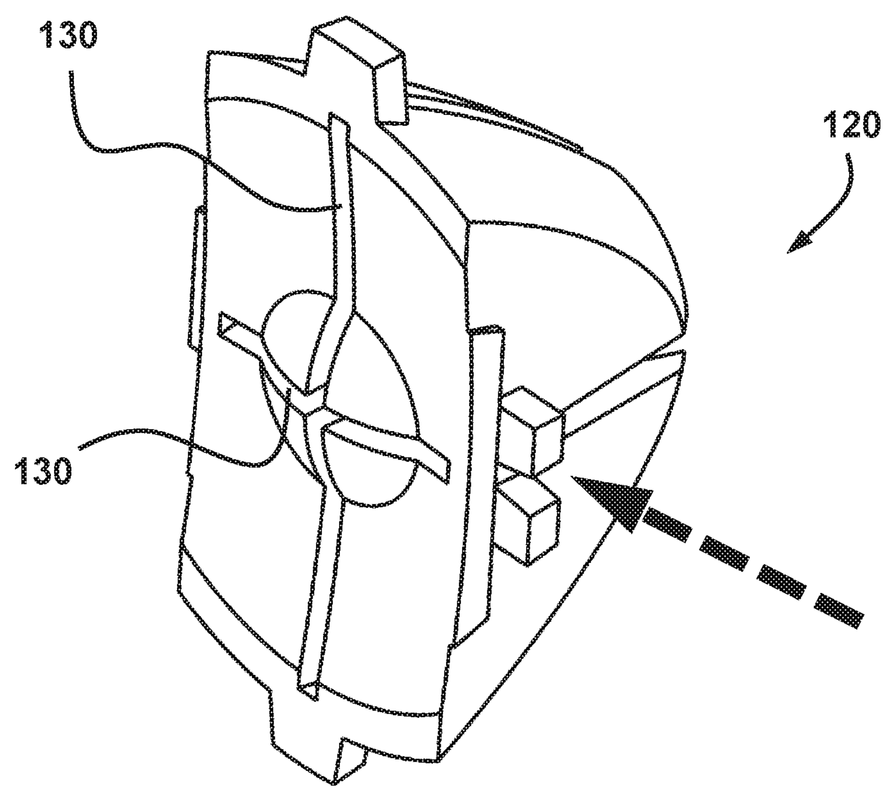
FIG. 29 is an isometric view of the lens core part depicting where the hot molten material is injected during the second injection shot.

FIG. 29 is a semi-schematic view of the lens core part 120 depicting where the hot molten plastic material is injected during the second injection shot with reference to the lens core part 120. The hot molten plastic material will come out of an opening through the corresponding mold core insert 250 and flow inside the various spaces created by the network of slots 130 and other openings inside the lens core part 120 to reach the locations where the first layer is formed. Venting channels (not shown) are provided in the mold core inserts 250, 252 so that air and other gases can leave the mold cavity as it is being filled with plastic material.

Figure 30:
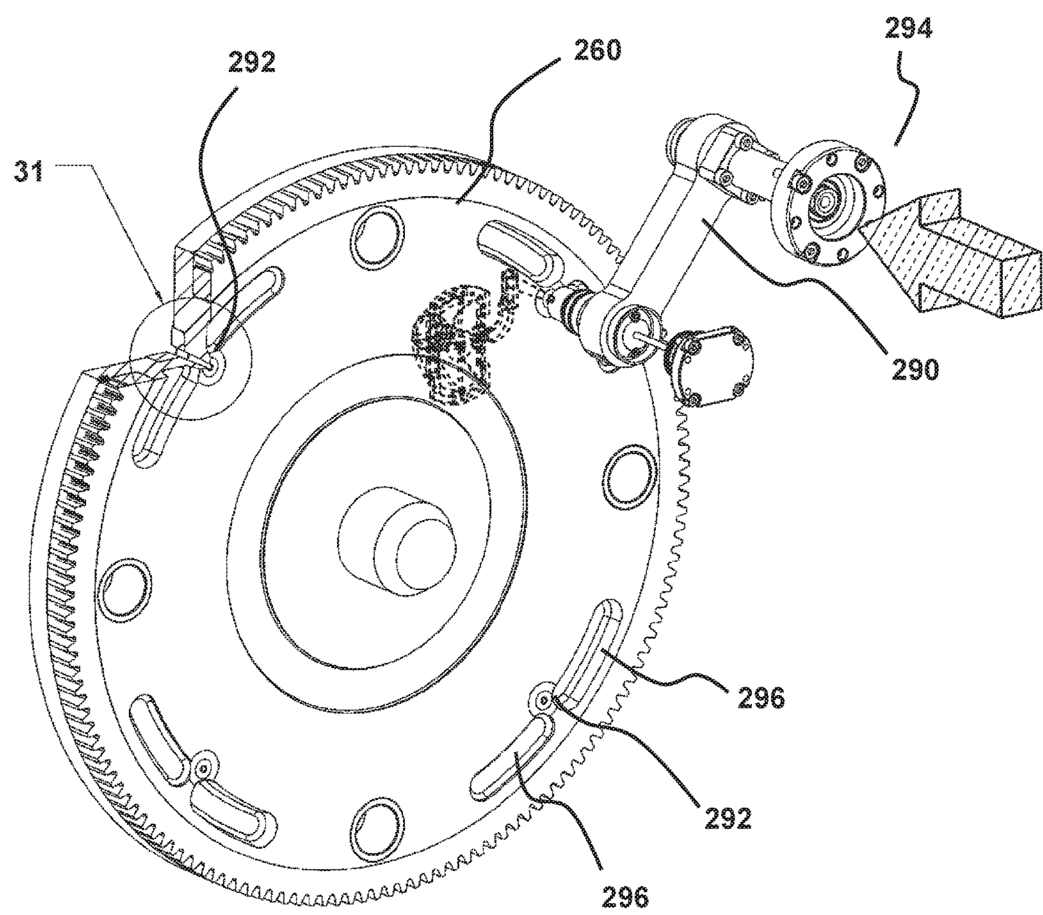
FIG. 30 is an isometric and partially cut-away view of rotatable carrier platen during the second injection shot.

FIG. 30 is an isometric and partially cut-away view of the first rotatable carrier platen 260 during the second injection shot. It shows an example of an arrangement for the hot runner 290. The hot molten plastic material enters the hot runner 290 through a corresponding melt inlet 294.

Also shown are pairs of overflow chambers 296 provided on each side of each passageway 292. There are four passageways 292 in the illustrated example and each of them includes a corresponding pair of overflow chambers 296. Each overflow chamber 296 extends across the width of the first rotatable carrier platen 260 and are somewhat shaped as oblong slots. The four passageways 292 and their overflow chambers 296 are disposed in an axisymmetric manner around the rotation axis 232 of the first rotatable carrier platen 260. Variants are possible as well.

The main purpose of the overflow chambers 296 is to receive the molten plastic material in the event of a problem with the mold cavity. For instance, if the stream cannot reach the mold cavity, most of the plastic material will go into the overflow chambers 296 instead of leaking in other locations, particularly locations that can be difficult to clean. If desired, one can include sensors or the like to indicate the presence of plastic material inside one of the overflow chambers 296.

Figure 31:
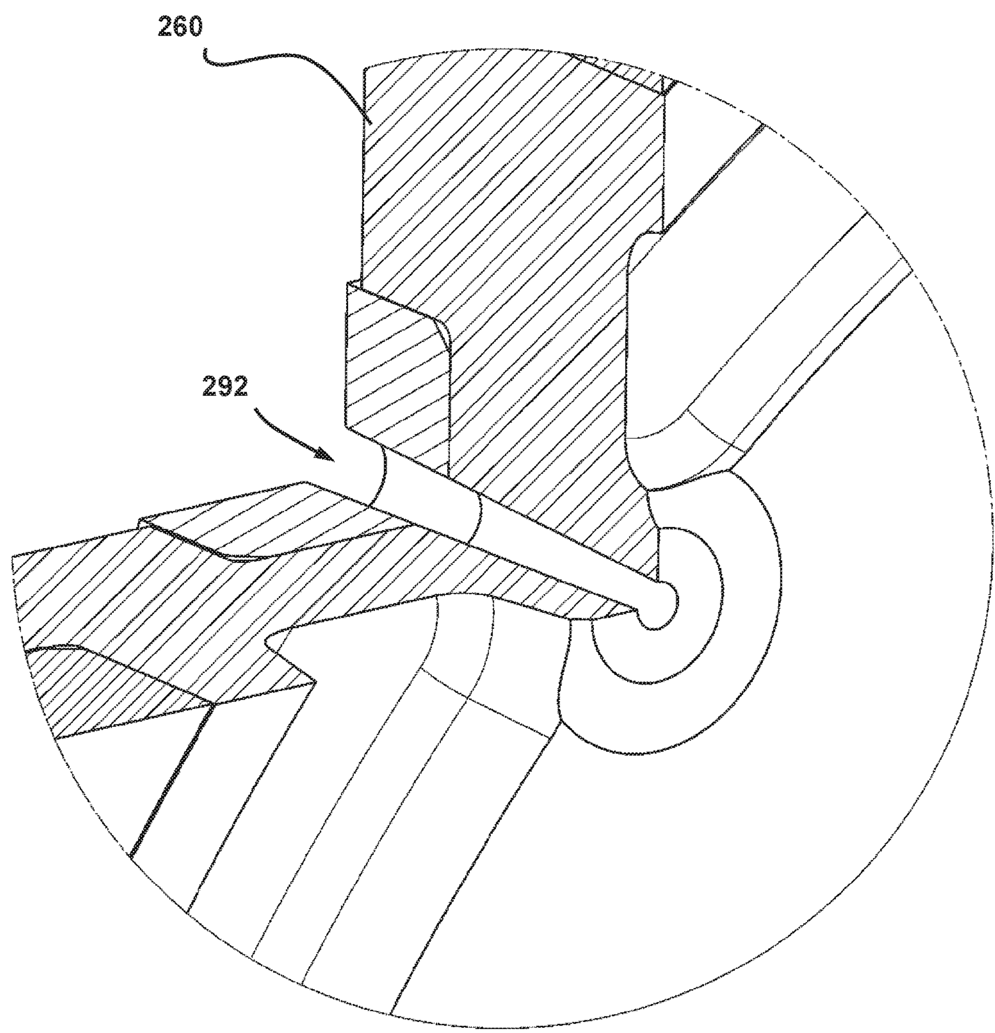
FIG. 31 is an enlarged view of one of the molten material passageways provided across the rotatable carrier platen shown in FIG. 30.

FIG. 31 is an enlarged view of one of the passageways 292 provided through the first rotatable carrier platen 260. The enlarged area is identified in FIG. 30 at 31. FIG. 31 shows that the passageway 292 includes a seat at its inlet and against which the outlet of the hot runner 290 can abut. The illustrated passageway 292 is also widening towards its outlet. Variants are possible as well.

After the second injection shot, the first and second mold plate halves 212, 214 can be set into their opened position.

Figure 32:
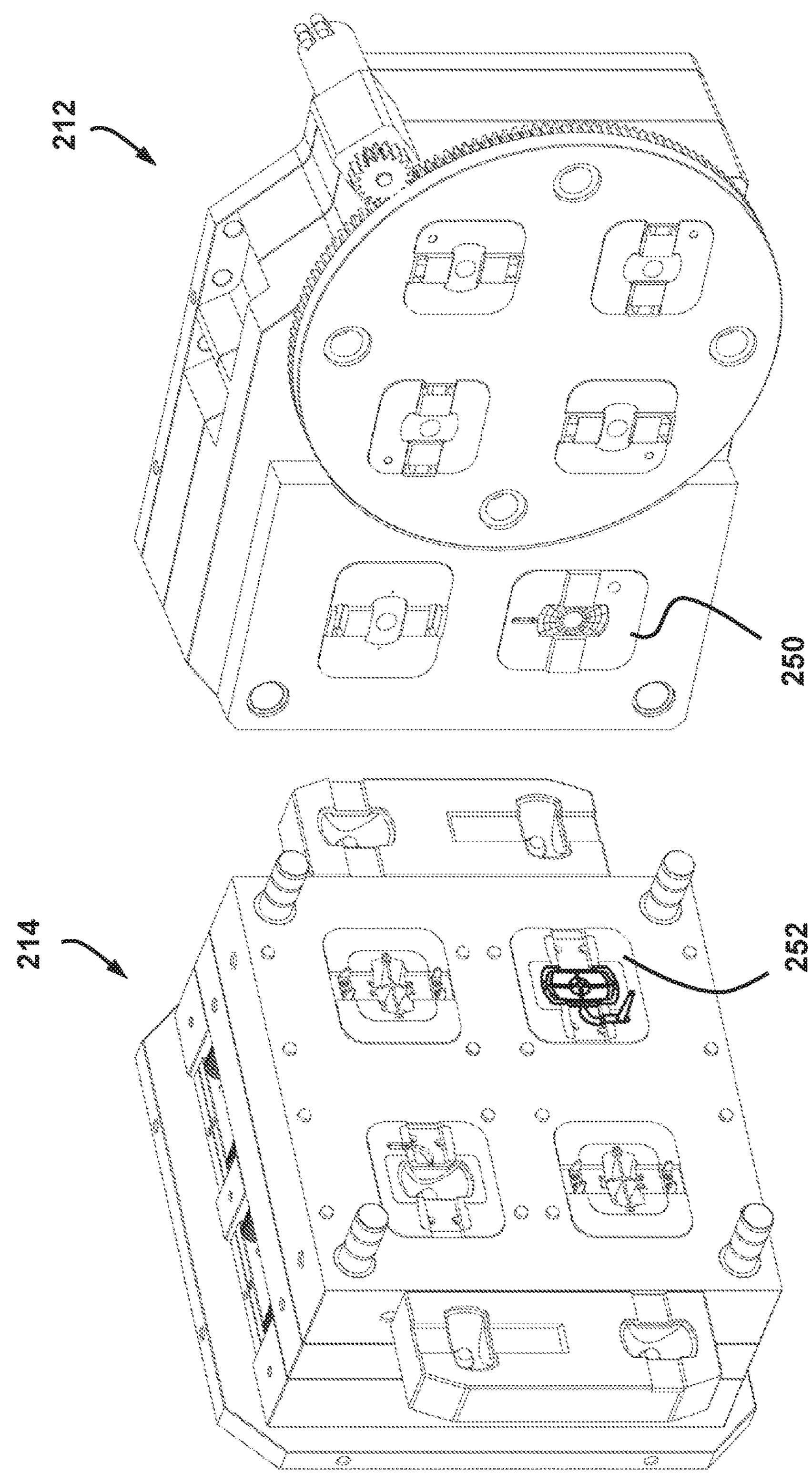
FIG. 32 is a view similar to FIG. 13, showing the first and second mold plate halves after they were pivoted following the second injection shot.

FIG. 32 shows the first and second mold plate halves 212, 214 after they were pivoted following the second injection shot. The lens 100 of the illustrated example now includes two layers at that point, and the third injection shot will add the third layer. As can be seen, the partially-formed lens 100 is now held on the second mold core plate half 214.

Figure 33:
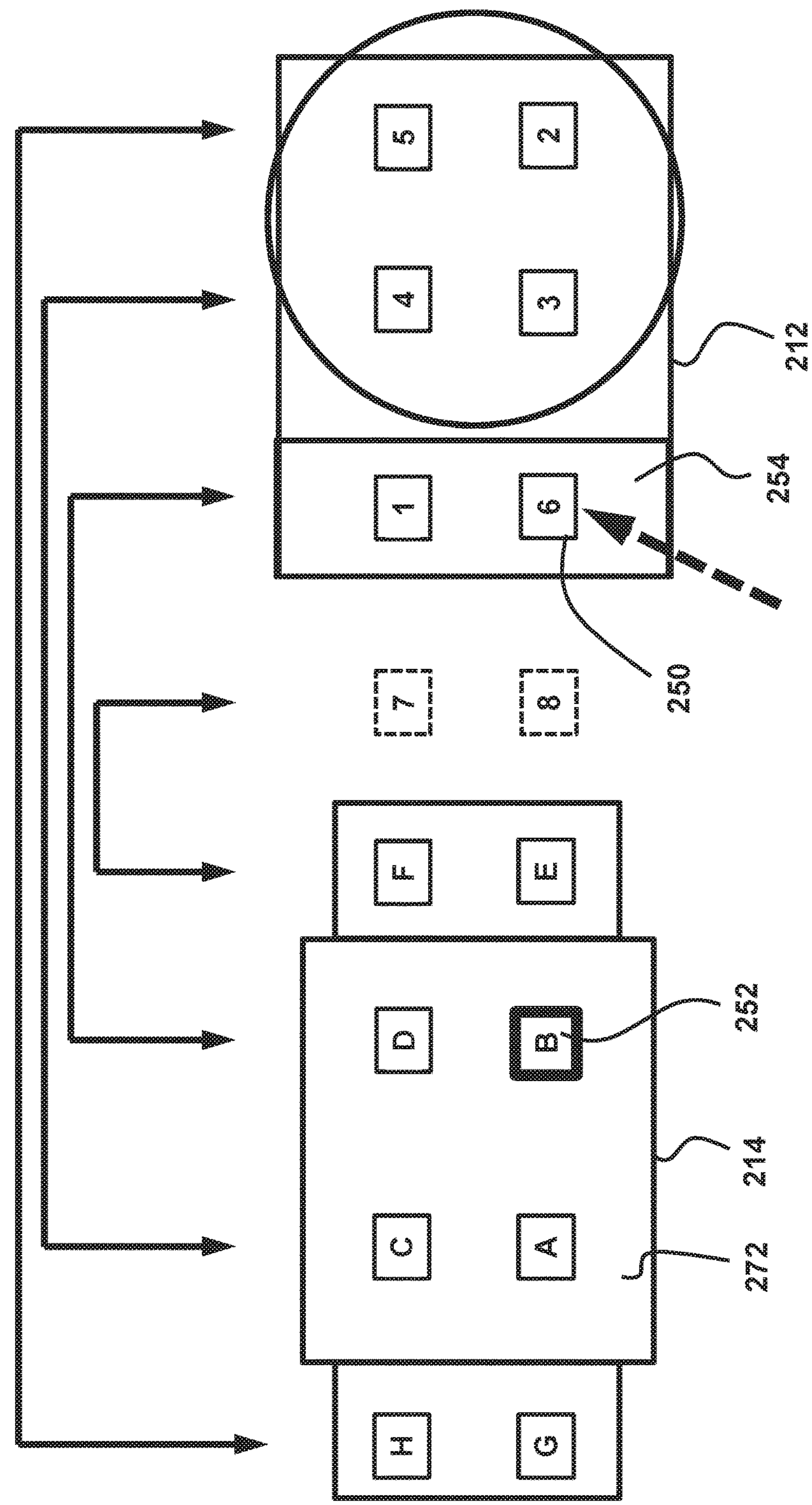
FIG. 33 is a view similar to FIG. 14, showing the position of the various elements of the first and second mold plate halves shown in FIG. 32 after pivoting.

FIG. 33 shows the position of the various elements after pivoting the first and second mold plate halves 212, 214 shown in FIG. 32. Then, the injection molding device 210 can be closed once again and the third injection shot can be done. The arrow in stippled lines represents the third injection shot to form the second outer lens part 124 (FIG. 5). The mold cavity for the third injection shot will be formed by the mold core insert 250 labeled as "6" and the mold core insert 252 labeled as "B".

Figure 34:
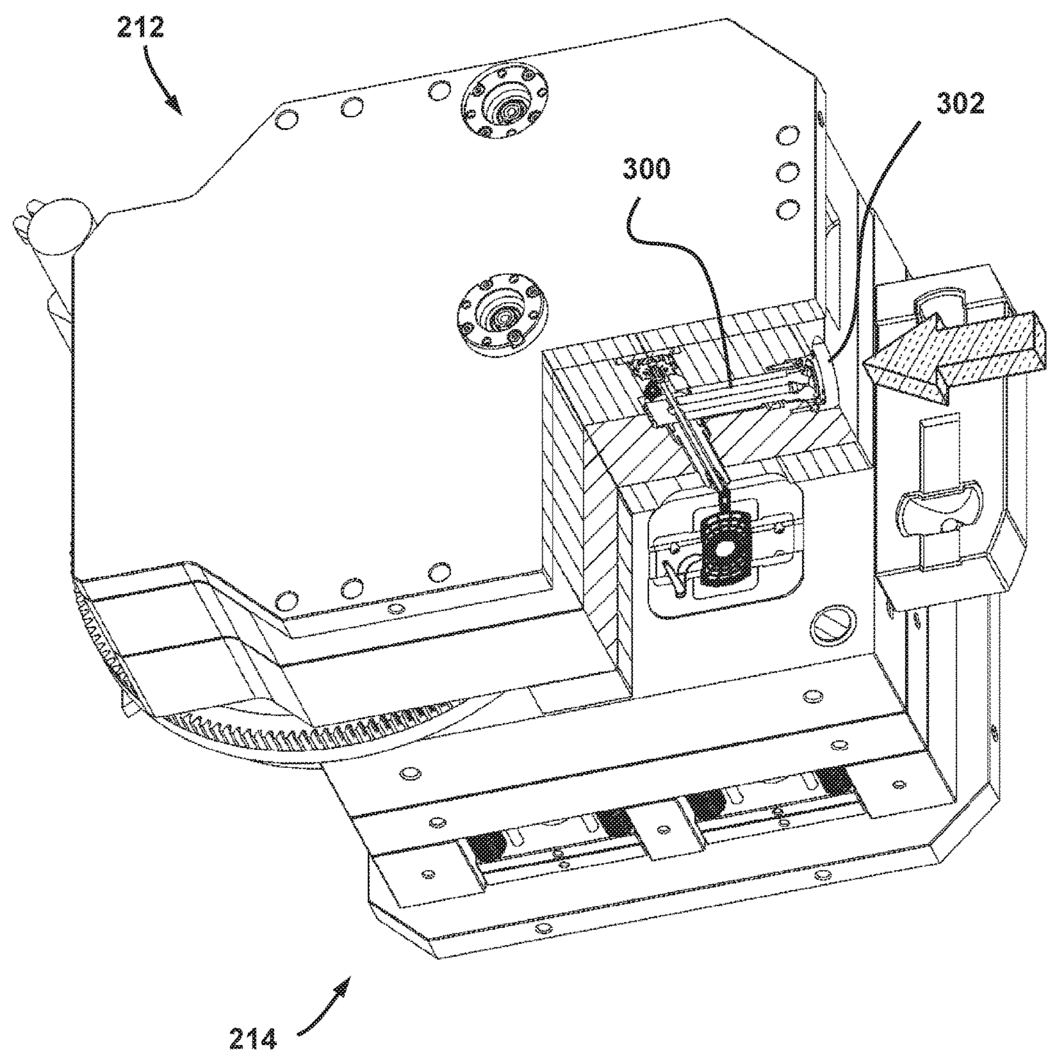
FIG. 34 is an isometric and partially cut-away view illustrating the first and second mold plate halves in their closed position during the third injection shot.

FIG. 34 is an isometric and partially cut-away view illustrating the first and second mold plate halves 212, 214 in their closed position during the third injection shot. In this first example, the hot molten plastic material follows a hot runner 300 and it is injected through a corresponding melt inlet 302. This melt inlet 302 is located on the side of the first mold plate half 212. Variants are possible as well.

Once the third injection shot is completed and the second outer lens part 124 cooled inside the mold cavity, the first and second mold plate half 212, 214 can be set to their opened position and the lens 100, now complete, can be ejected from the injection molding device 210. The lens 100 can be picked up, for instance, by a robot. Other methods and arrangements are possible as well.

Figure 35:
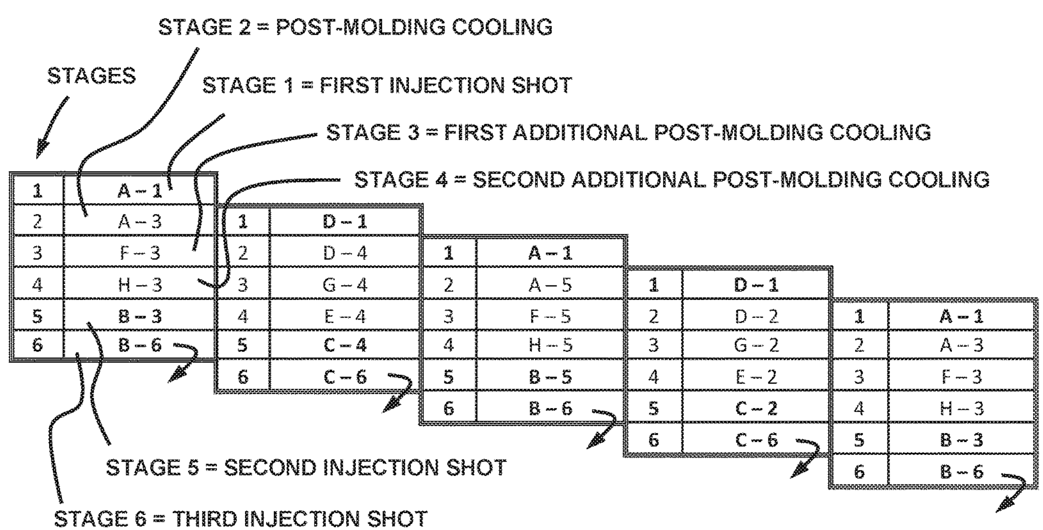
FIG. 35 is a table depicting the manufacturing stages of lenses being made in succession inside the injection molding device of the first example.

FIG. 35 is a table depicting the stages for lenses 100 being made in succession inside the injection molding device 210 of the first example. As can be seen, a new lens 100 is being manufactured at each new stage. There are six stages in the illustrated example and all the mold cavities 250 of the first mold plate half 212 will be used at the same time while the injection molding device 210 is in operation.

In FIG. 35, the left column represents the lens described herein. The first stage corresponds to what is shown in FIG.

14. The second stage corresponds to what is shown in FIG. 16. The third stage corresponds to what is shown in FIG. 19. The fourth stage corresponds to what is shown in FIG. 23. The fifth stage corresponds to what is shown in FIG. 27. Finally, the sixth stage corresponds to what is shown in FIG. 33. The arrow at stage 6 in FIG. 35 represents the lens 100 being ejected or otherwise removed from the injection molding device 210.

As can be seen, the same sequence is repeated when the fifth lens will be made (right column). The fifth lens of this first example starts at the fifth stage of the first lens (left column).

The method of manufacturing lenses can be repeated on a continuous basis.

FIGS. 36 to 44 depict details of a second example of an injection molding device 210 of the proposed concept. This second example is somewhat similar to the first one but here, but the two additional post-molding cooling steps are not implemented.

In some designs, and/or when using some materials, the basic post-molding cooling step may be sufficient to meet the requirements. For instance, when using a material such as polycarbonate, the mechanical properties of the outer layer (sometimes called the "frozen skin") of the lens core part 120 may be suitable for sending the lens core part 120 directly to the second injection step, even if its interior is not entirely solid. Thus, the two additional post-molding cooling steps are omitted.

FIG. 36 is an isometric view of the first and second mold plate halves 212, 214 of the second example of the injection molding device 210. As can be seen, FIG. 36 shows that the second mold plate half 214 has no cooling jigs 270. It should be noted that one could also use the injection molding device 210 as in the first example (see FIG. 13 for instance) for carrying out the molding sequence without the two additional post-molding cooling steps as done in the second example described herein. In the second example, the first rotatable carrier platen 260 pivots of 90 degrees, in the clockwise direction as viewed in FIG. 36, each time the injection molding device 210 opens.

Figure 37:
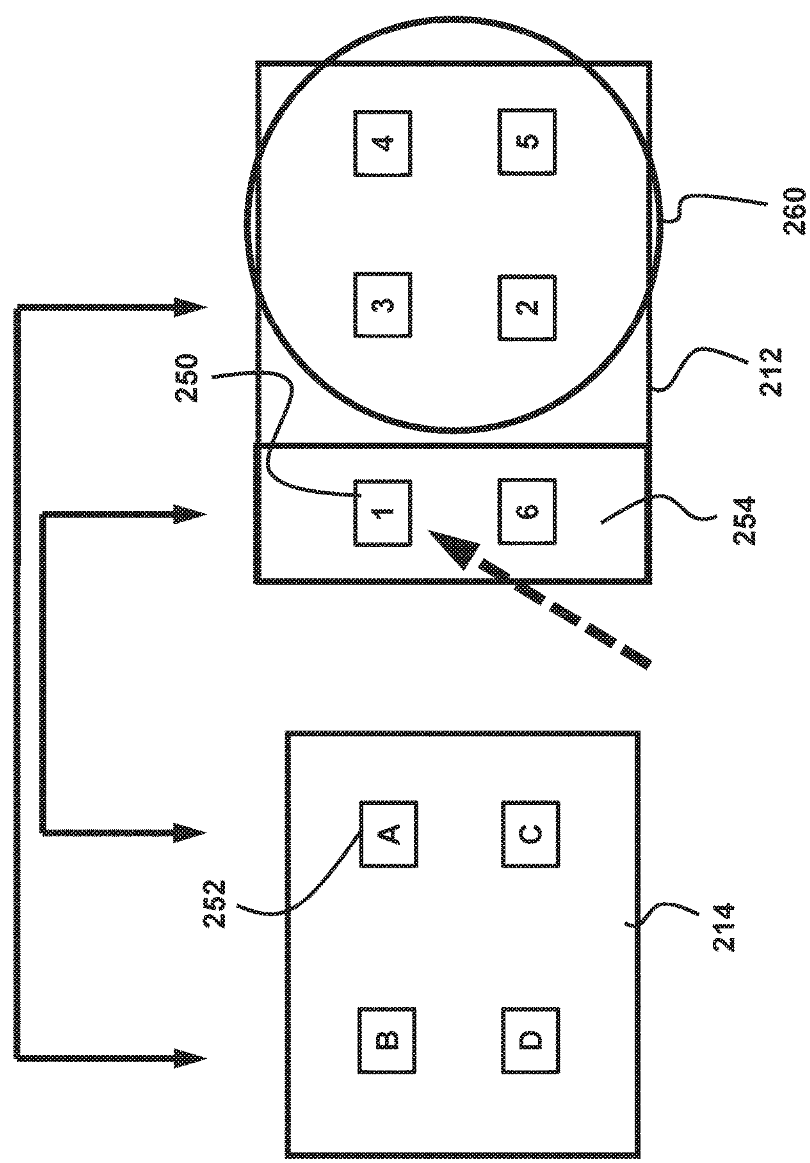
FIG. 37 is a schematic view depicting how the first and second mold plate halves are positioned and which elements match together during the first injection shot in the second example shown in FIG. 36.

FIG. 37 is a schematic view depicting how the first and second mold plate halves 212, 214 are positioned and which elements match together during the first injection shot in this second example. Again, the solid-line arrows show the matching sets when the two mold plate halves 212, 214 are in their closed position. The mold core inserts 250 are labeled "1" to "6". The mold core inserts 252 are labeled "A" to "D".

The first injection shot is done in the mold cavity formed between the internal surfaces of the mold core insert 250 that is labeled as "1" and the internal surfaces of the mold core insert 252 that is labeled as "A". The first injection shot always occurs inside the mold core insert 250 labeled as "1" but the opposite mold core insert 252 alternates between "A" and "D".

Figure 38:
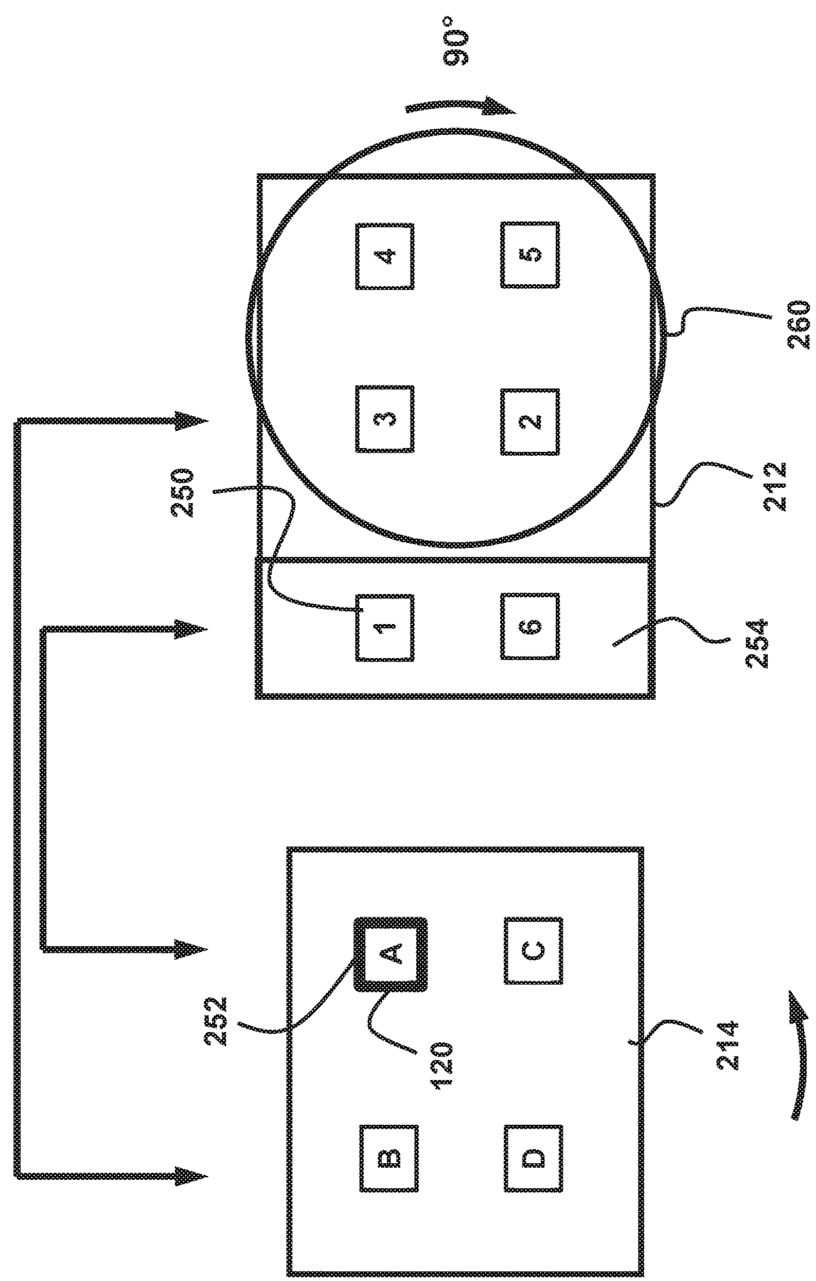
FIG. 38 is a view similar to FIG. 37, showing the position of the various elements immediately after the first injection shot and prior to pivoting.

FIG. 38 is a view similar to FIG. 37, showing the position of the various elements immediately after the first injection shot and prior to pivoting. As can be seen, the lens core part 120 is held in the mold core insert 252 labeled as "A".

Figure 39:
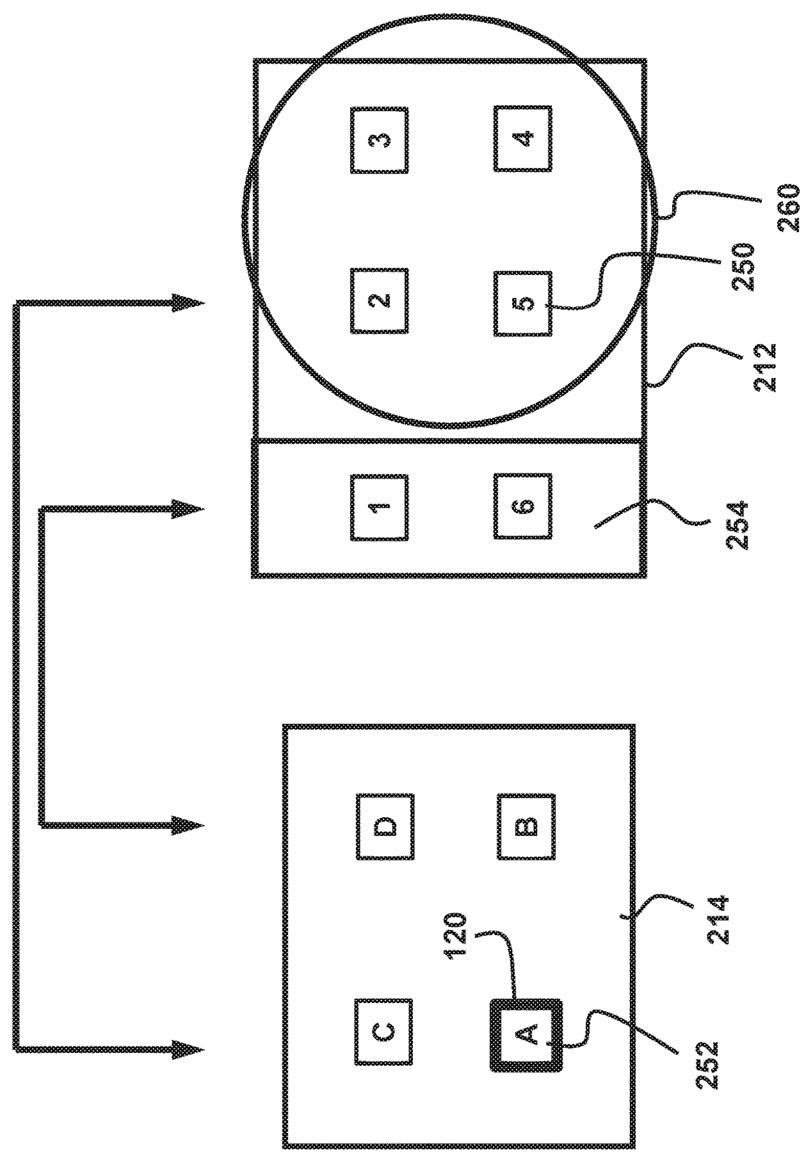
FIG. 39 is a view similar to FIG. 37, showing the position of the various elements after pivoting the first and second mold plate halves shown in FIG. 38.

FIG. 39 is a view similar to FIG. 37, showing the position of the various elements after pivoting the first and second mold plate halves 212, 214 shown in FIG. 38. The mold core insert 252 labeled as "A" is now in front of the mold core insert 250 labeled as "5" as the first rotatable carrier platen 260 pivoted of 90 degrees in the clockwise direction and the second mold plate half 214 pivoted of 180 degrees. The injection molding device 210 can now close and this will begin the post-molding cooling step of the illustrated lens core part 120.

Figure 40:
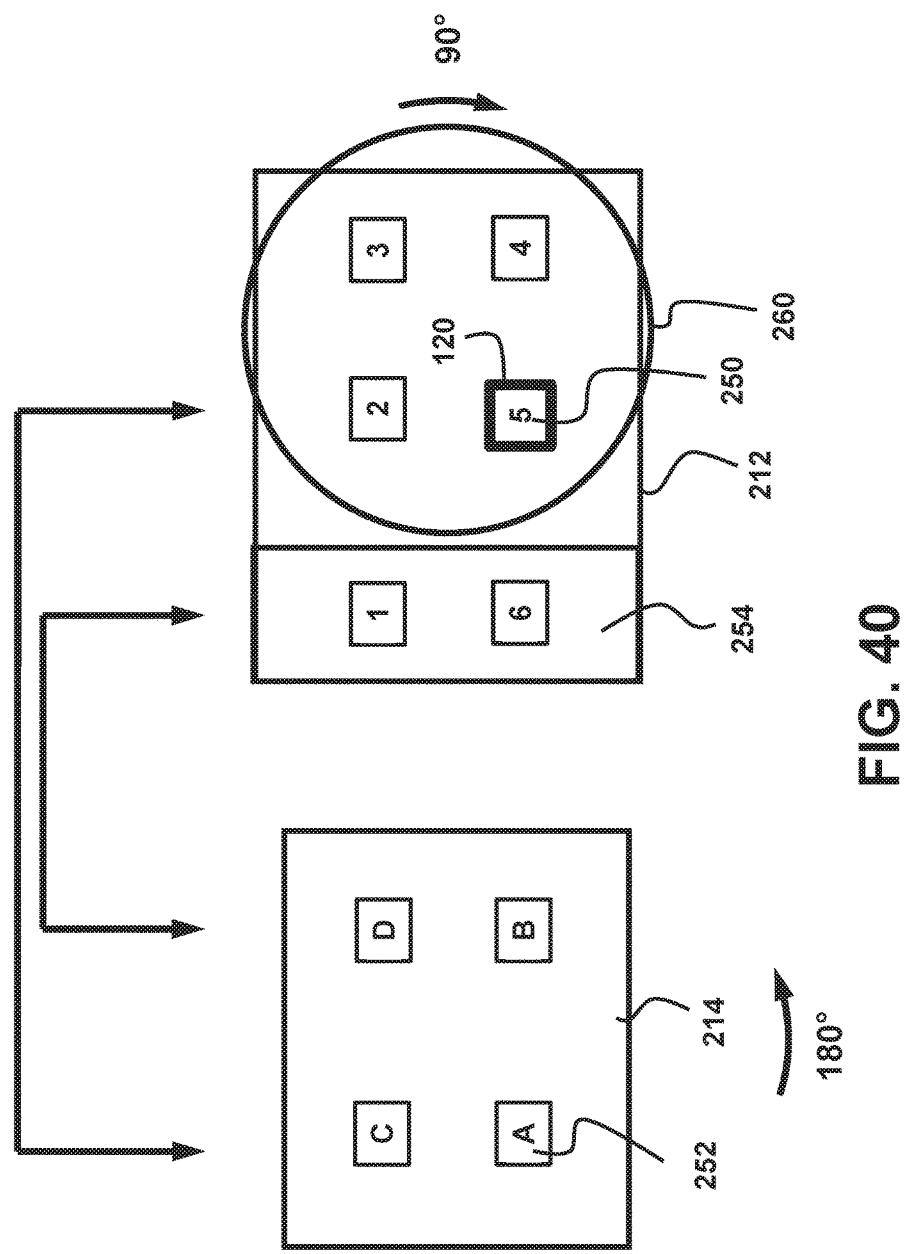
FIG. 40 is a view similar to FIG. 37, showing the position of the various elements of the first and second mold plate halves shown in FIG. 39, after the opening following the post-molding cooling stage and prior to pivoting.

FIG. 40 is a view similar to FIG. 37, showing the position of the various elements of the first and second mold plate halves 212, 214 shown in FIG. 39, after the opening following the post-molding cooling stage and prior to pivoting. As can be seen, the lens core part 120 is now held the mold core insert 250 labeled as "5".

Figure 41:
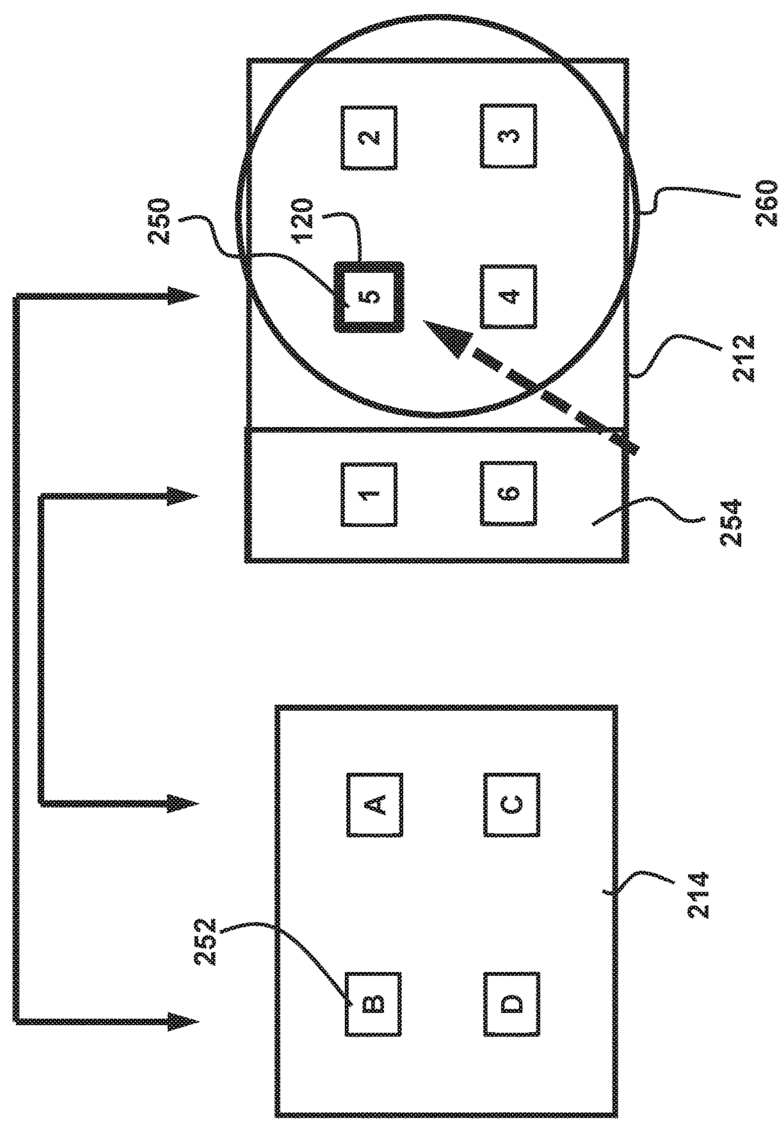
FIG. 41 is a view similar to FIG. 37, showing the position of the various elements, after pivoting the first and second mold plate halves shown in FIG. 40, and before the second injection shot.

FIG. 41 is a view similar to FIG. 37, showing the position of the various elements after pivoting the first and second mold plate halves 212, 214 shown in FIG. 40, and before the second injection shot. The mold core insert 250 labeled as "5" is now in front of the mold core insert 252 labeled as "B" as the first rotatable carrier platen 260 pivoted of 90 degrees in the clockwise direction and the second mold plate half 214 pivoted of 180 degrees at the same time. The injection molding device 210 can now close and this will begin the second injection shot of the illustrated lens core part 120.

Figure 42:
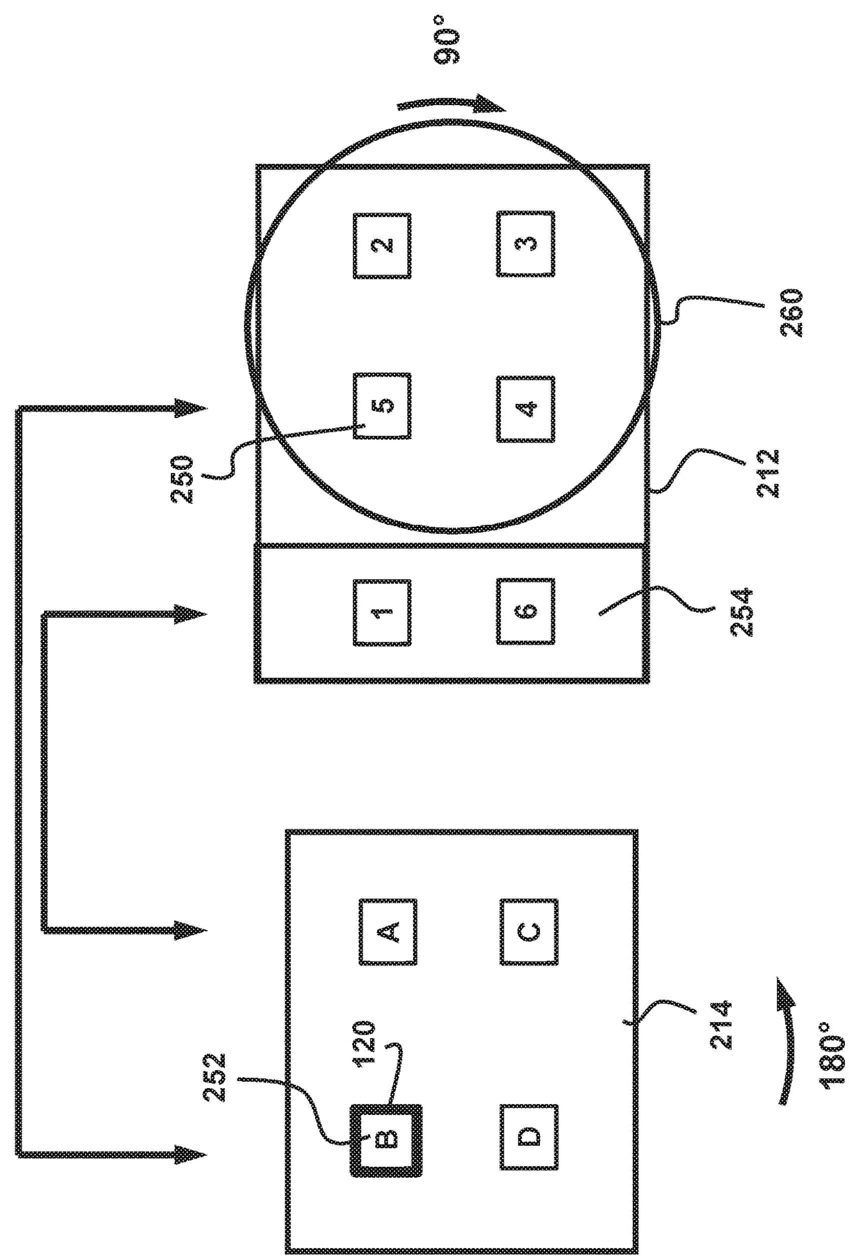
FIG. 42 is a view similar to FIG. 37, showing the position of the various elements of the first and second mold plate halves shown in FIG. 41, after the opening following the second injection shot and prior to pivoting.

FIG. 42 is a view similar to FIG. 37, showing the position of the various elements of the first and second mold plate halves 212, 214 shown in FIG. 41, after the opening following the second injection shot and prior to pivoting. As can be seen, the lens core part 120 is held in the mold core insert 252 labeled as "B".

Figure 43:
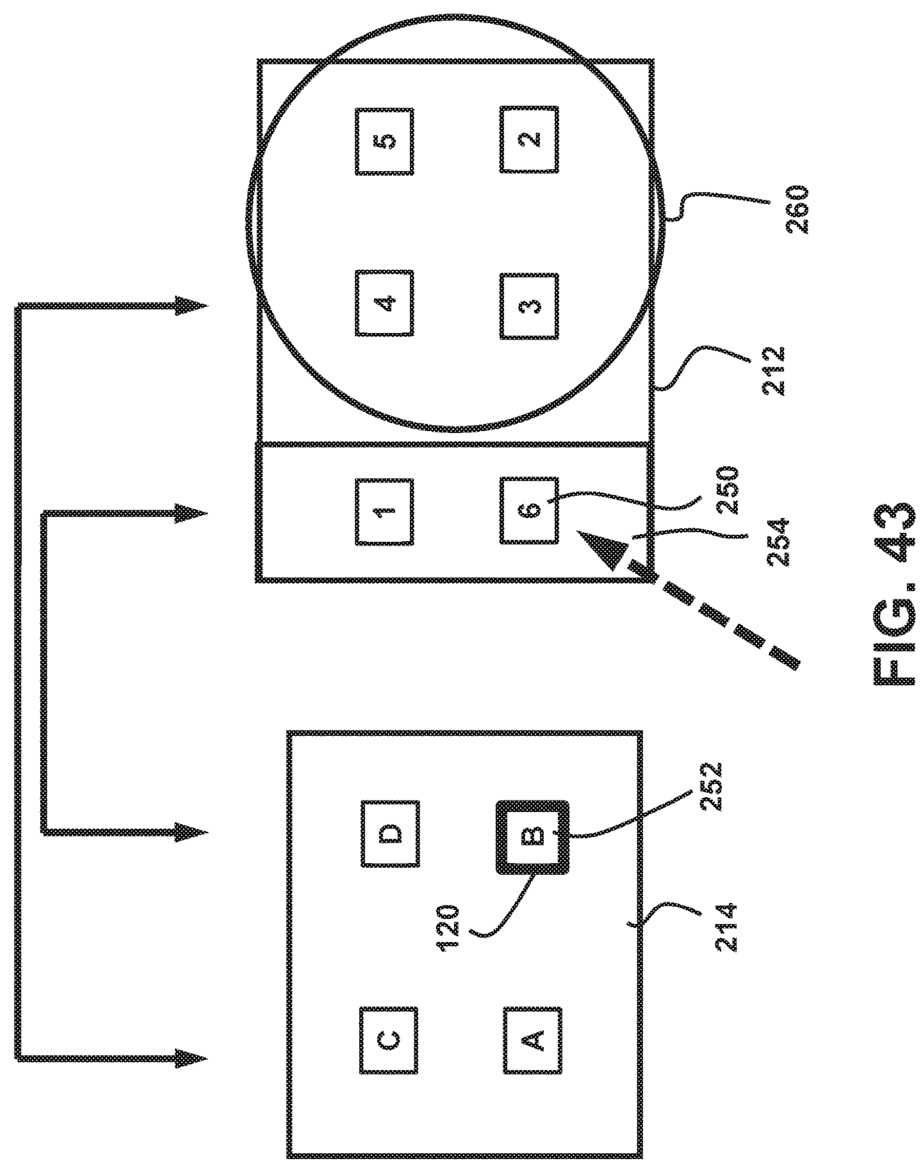
FIG. 43 is a view similar to FIG. 37, showing the position of the various elements, after pivoting the first and second mold plate halves shown in FIG. 42 and during the third injection shot.

FIG. 43 is a view similar to FIG. 37, showing the position of the various elements after pivoting the first and second mold plate halves 212, 214 shown in FIG. 42. The mold core insert 252 labeled as "B" is now in front of the mold core insert 250 labeled as "6" since the second mold plate half 214 pivoted of 180 degrees. This mold core insert 250 labeled as "6" is on the fixed portion of the first mold plate half 212. The injection molding device 210 closes and the third injection shot will be done.

Figure 44:
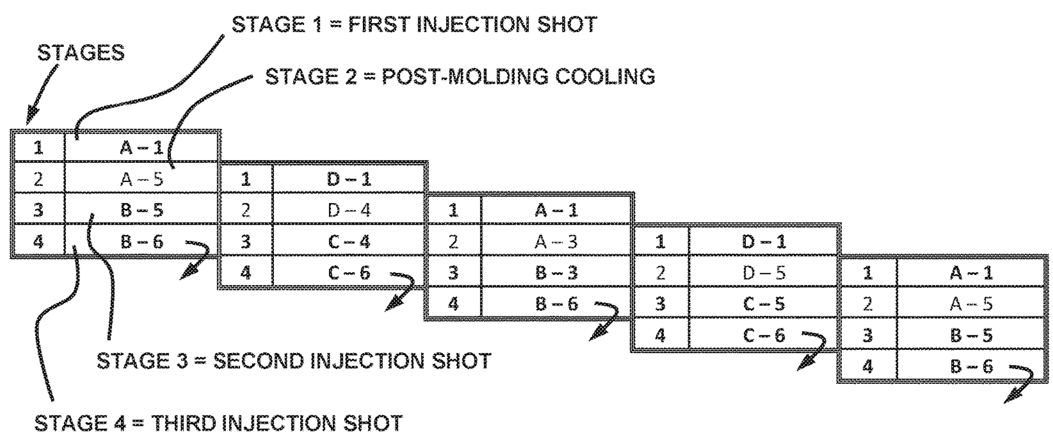
FIG. 44 is a table depicting the manufacturing stages of lenses being made in succession inside the injection molding device of the second example.

FIG. 44 is a table depicting the manufacturing stages of lenses being made in succession inside the injection molding device 210 of the second example. As aforesaid, more than one lens can be manufactured at the same time and this was not shown in FIGS. 37 to 43 only for the sake of clarity. The table of FIG. 44 shows that after the first injection shot of the illustrated part and once the mold core inserts 250 on the first rotatable carrier platen 260 and the mold core inserts 252 on the second mold plate half 214 pivoted, the first injection shot of another lens was done between the mold core insert 250 labeled as "1" and the mold core insert 252 labeled as "D". This occurred while the injection molding device 210 was as in FIG. 39. Then, once the injection molding device 210 was set as shown in FIG. 41, the first injection shot of yet another lens was done between the mold core insert 250 labeled as "1" and the mold core insert 252 labeled as "A". This can be repeated continuously. FIGS. 45 to 64 illustrate another example of a multistep injection molding device 210 based on the proposed concept. This third example implements a four-step sequence similar to that of the second example but the overall design of the injection molding apparatus would be somewhat different.

It should be noted that the three examples depicted herein share the following features:

- There are three injection shots, one for the lens core part 120 and two for the outer layers 122, 124;
- The first injection shot is followed by at least one post-molding cooling step;
- The second injection shot is done across the first rotatable carrier platen 260;
- The first and third injection shot are done through mold core inserts 250 that are adjacent to one another on the stationary platen 254;

The lens 100 being molded remains in the injection molding device 210 until the three injection shots are completed.

The injection molding device 210 of the third example is also illustrated in a configuration where four lenses 100 are molded simultaneously at each station instead of just one as in the first and the second example. In these first two examples, multiple lenses are molded simultaneously but there is only one at each station of the injection molding device 210. Here, in the third example, the configuration allows multiple lenses to be formed in parallel at each station but the overall size of the injection molding device 210 is kept relatively small. Providing multiple mold cavities at each step of injection molding devices 210 as depicted in the first and second examples is still possible. However, the diameter of the first rotatable carrier platen 260 may become a limiting factor. Another challenge is the fact the pressure involved during the injection shots in the first two examples are off-centered with reference to the first mold plate half 212. Molding more lenses 100 at each station will increase the force exerted thereon.

If desired, the injection molding device 210 of the third example may be configured for molding a single lens at each station, or for molding two, three or even more than four lenses at the same time at each station.

Figure 45:
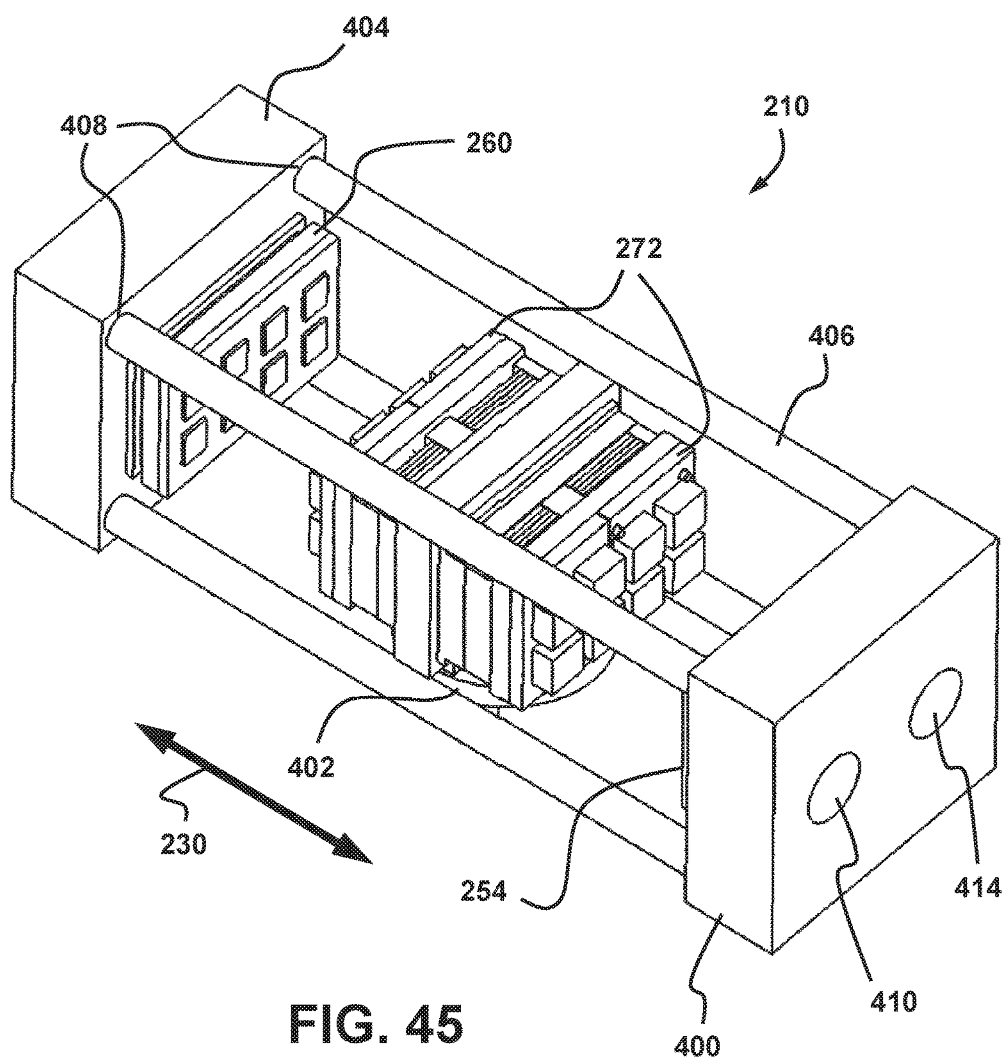
FIG. 45 is an isometric view of another variant of the injection molding device of the proposed concept, the injection molding device being illustrated in an opened position.
Figure 46:
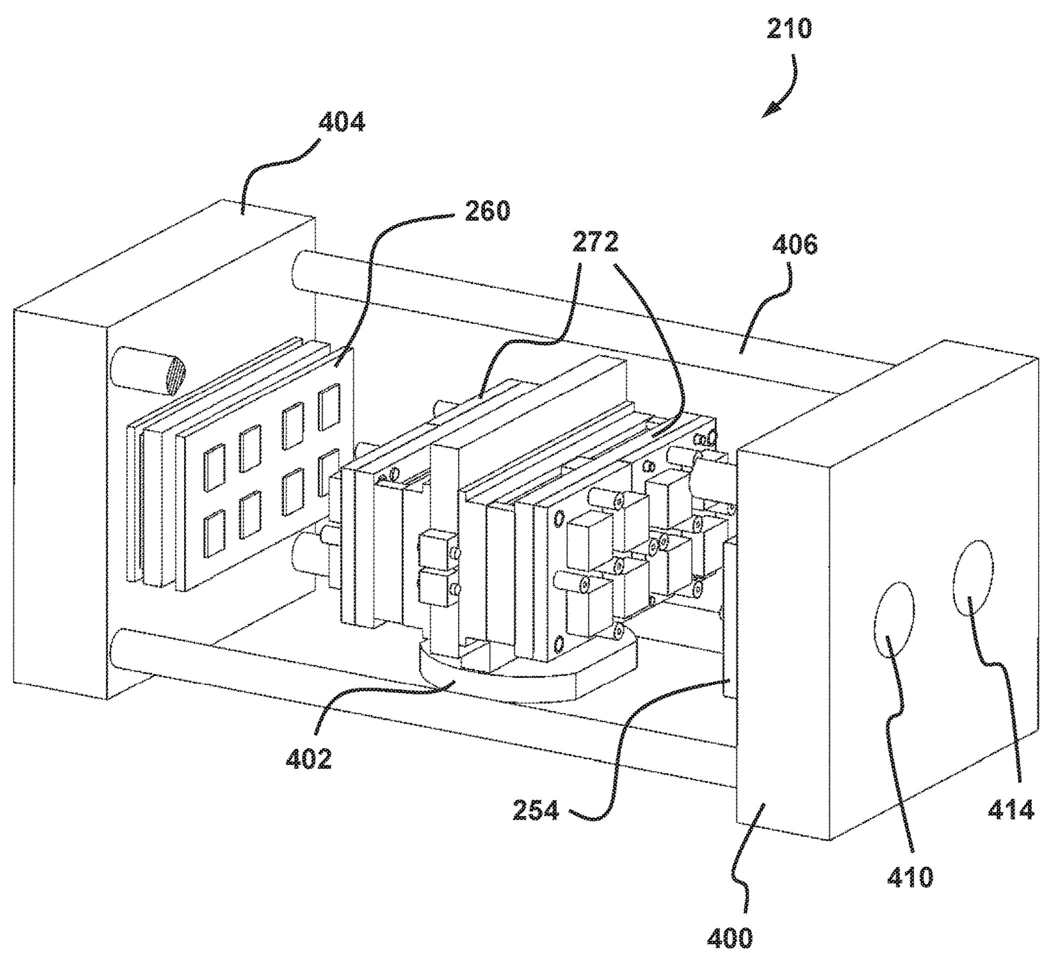
FIG. 46 is a view similar to FIG. 45, showing the third example of the injection molding device from another angle and with some parts being removed for the sake of illustration.

FIG. 45 is an isometric view of this third example of the injection molding device 210. The injection molding device 210 is illustrated in an open position. FIG. 46 is a view similar to FIG. 45, showing the third example of the injection molding device 210 from another angle and with some parts being removed for the sake of illustration.

As can be seen, the injection molding device 210 of the third example includes a stationary frame unit 400, a sliding and pivoting frame unit 402 and a sliding frame unit 404. The sliding and pivoting frame unit 402 and the sliding frame unit 404 are linearly movable with reference to the inner main face of the stationary frame unit 400 where a first set of the first mold core inserts 250 are provided. These first mold core inserts 250 are on a stationary platen 254. The second set of the first mold core inserts 250 are provided on a first rotatable carrier platen 260 located on the inner main face of the sliding frame unit 404. The sliding and pivoting frame unit 402 is located between the first and the second sets of first mold core inserts 250, thus between the stationary frame unit 400 and the sliding frame unit 404. In the third illustrated example, the sliding and pivoting frame unit 402 includes two opposite faces that are configured and disposed for engagement with the inner main faces of the stationary frame unit 400 and the sliding frame unit 404. One of these opposite faces of the sliding and pivoting frame unit 402 holds a first set of the second mold core inserts 252 and the other one of the face holds a second set of second mold core inserts 252. Thus, each of these opposite faces constitutes a second rotatable carrier platen 272.

The sliding and pivoting frame unit 402 and the sliding frame unit 404 can be moved closer and away from the stationary frame unit 400 using an actuator arrangement, for instance one including one or more electric motors and/or hydraulic actuators and/or any other suitable mechanism. The linear motion of these frame units 402, 404 can be guided by spaced-apart rods 406 or the like that are extending parallel to the longitudinal axis 230 of this injection molding device 210. One end of these rods 406 can be rigidly attached to the stationary frame unit 400. The sliding and pivoting frame unit 402 can include a base or an outer frame support that is in a sliding engagement with the rods 406. As shown, the sliding frame unit 404 can include guiding holes 408 or the like for creating a sliding engagement with the rods 406. The arrangement shown in the figures were simplified for the sake of illustration. Many variants are possible as well. For instance, the sliding and pivoting frame unit 402 and the sliding frame unit 404 can be guided using a different arrangement. Also, although the frame unit 400 is labeled as “stationary” and simpler to implement as a fixed, immovable part inside the injection molding device 210, one could possibly design the frame unit 400 as being movable and, for instance, design the frame unit 404 as being “stationary”. The working principle remains the same and accordingly, for the sake of simplicity and in order to avoid adding unnecessary complexities to the entire disclosure, the words “stationary”, “pivoting” and “sliding” are referring to the relative motions with reference to the inner main face of the frame unit 400.

When the injection molding device 210 is an opened position, the sliding and pivoting frame unit 402 is about half way between the stationary frame unit 400 and the sliding frame unit 404. The distance is sufficient to allow the sliding and pivoting frame unit 402 to pivot around a second pivot axis 234 that is perpendicular to the longitudinal axis 230 along which the sliding motion is done. If the longitudinal axis 230 is horizontal, this second pivot axis 234 can be vertical. It should be noted that the first and second mold plate halves in the third example are doubled since there are two interfaces.

Figure 47:
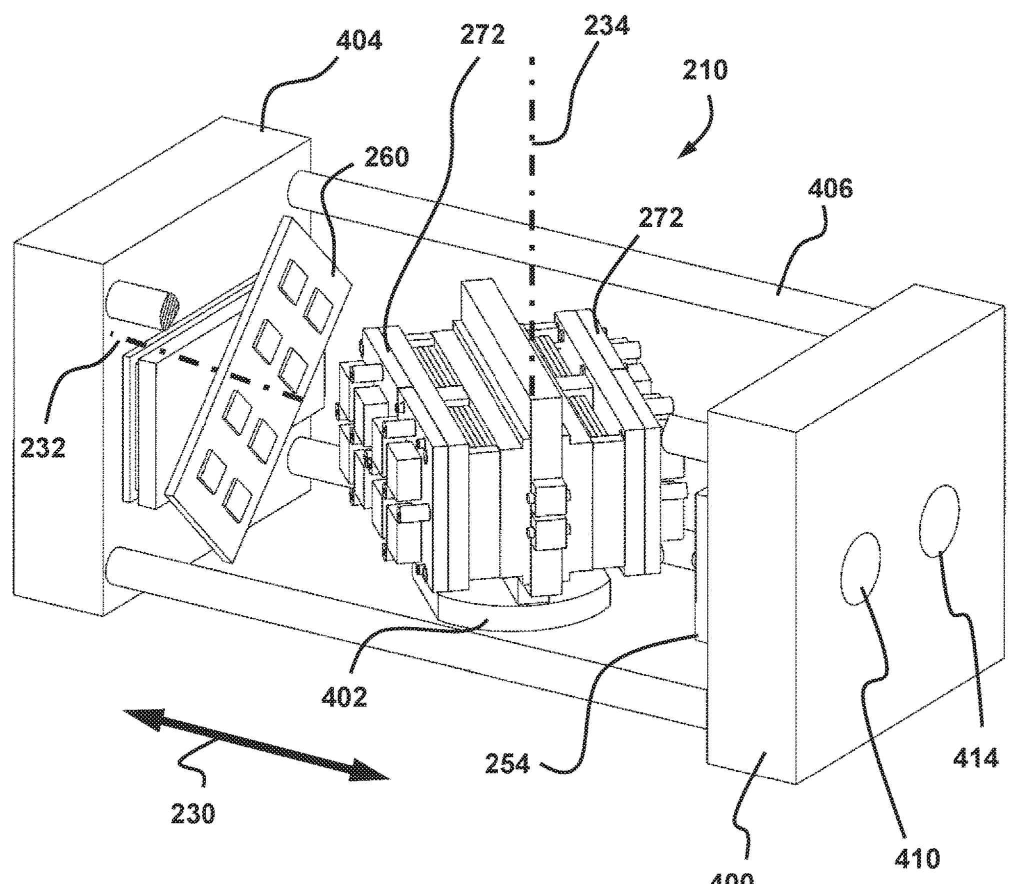
FIG. 47 is a view similar to FIG. 46, showing parts being pivoted.

FIG. 47 is a view similar to FIG. 46, showing parts being pivoted. This will allow changing the relative position of the mold core inserts 250 with reference to the mold core inserts 252 in a way that is somewhat similar to that done during the operation of the injection molding devices 210 described in the first and second examples. In the third example, the part supporting the mold core inserts 252 is pivoted of 180 degrees and the first rotatable carrier platen 260 on the sliding frame unit 404 is also pivoted of 180 degrees between each stage. The pivoting motions would generally be done simultaneously but variants are possible.

The mold core inserts 250 located on the stationary frame unit 400 are used for the first and the third injection shots. The apertures 410, 414 schematically represent the locations through which the hot molten plastic material for the first injection shot and the hot molten plastic material for the third injection shot will be supplied, respectively. Different passageways will be included in and around these apertures 410, 414.

Figure 48:
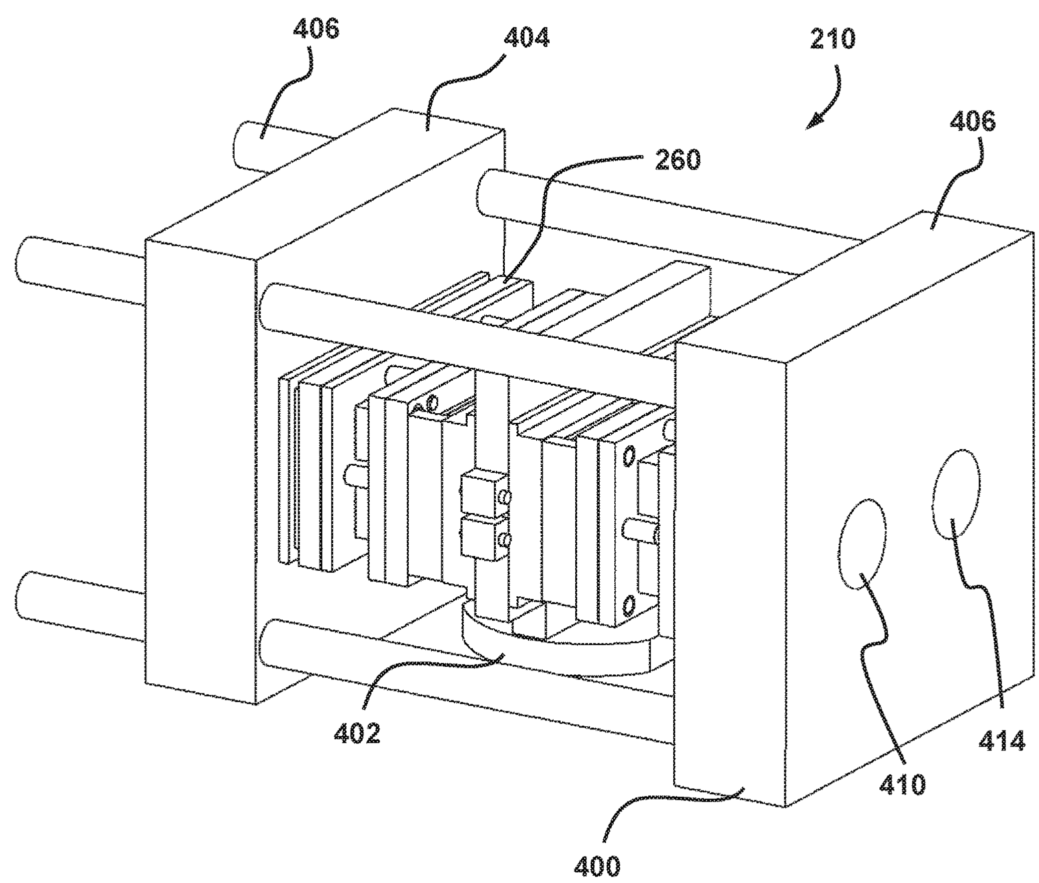
FIG. 48 is a view similar to FIG. 45 but with the injection molding device being in a closed position.
Figure 49:
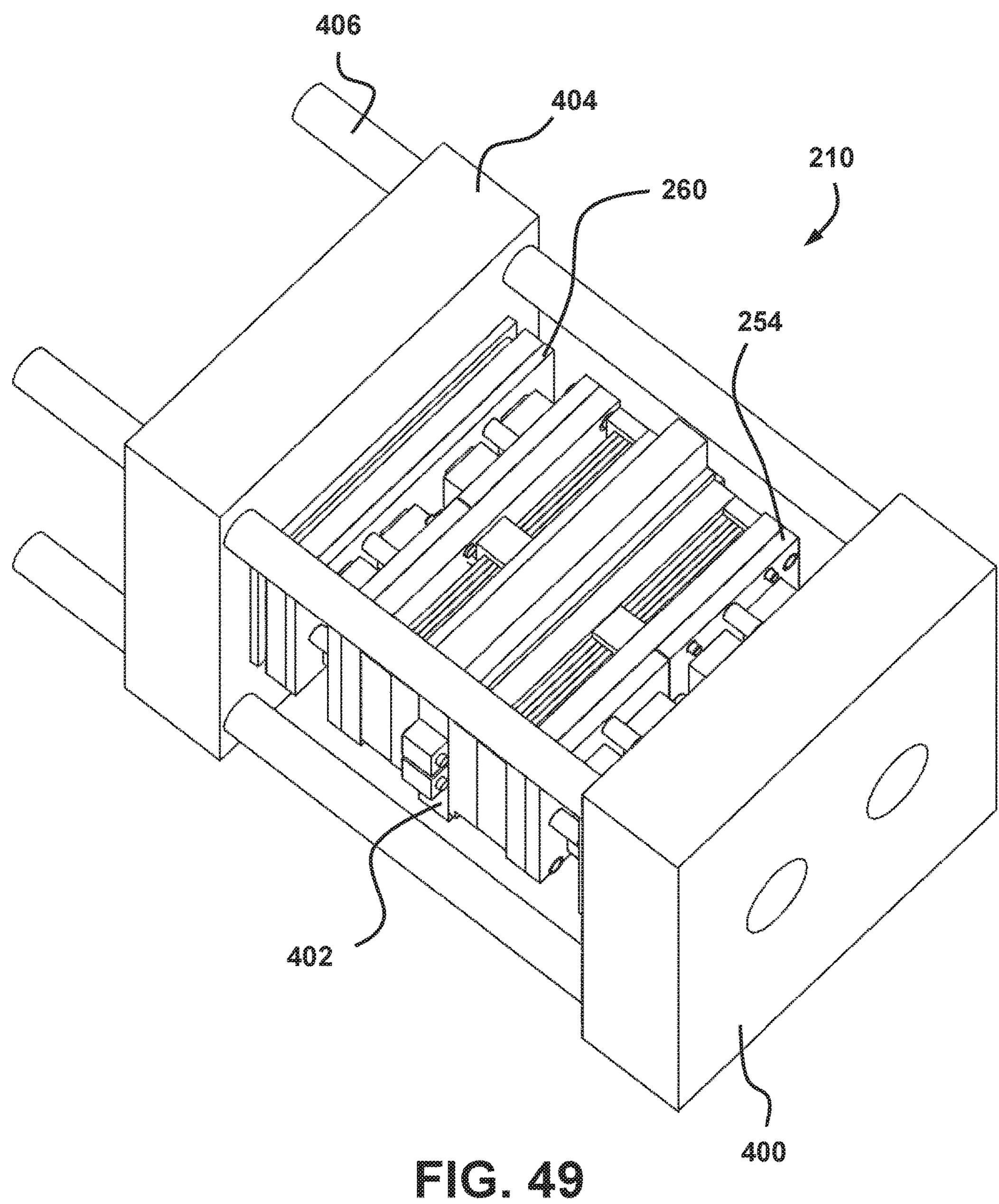
FIG. 49 is a view similar to FIG. 48 taken from another angle.

FIG. 48 is a view similar to FIG. 45 but with the injection molding device 210 being in a closed position. FIG. 49 is a view similar to FIG. 48 taken from another angle. FIG. 49 also shows an aperture 412 that schematically represents the location through which the hot molten plastic material for the second injection shot will be supplied.

FIGS. 50 to 64 are schematic top views depicting how the parts are positioned during operation of the injection molding device 210 shown in FIG. 45. It thus shows the basic operations of the third example of the injection molding device 210 from an upper viewpoint. It should be noted that for the sake of simplicity, although four lenses are molded simultaneously at each stage of the injection molding device 210 of FIG. 45, FIGS. 50 to 64 represent the mold core inserts 250, 252 as if only one lens is molded at each stage.

As can be seen, the stationary frame unit 400 holds the mold core insert 250 labeled as “1” and the one labeled as “4”. The first side of the sliding and pivoting frame unit 402 holds the mold core insert 252 labeled as “A” and the one labeled as “B”. On its opposite side, it holds the mold core insert 252 labeled as “C” and the one labeled as “D”. The first rotatable carrier platen 260, which is located on the sliding frame unit 404, holds the mold core insert 250 labeled as "2" and the one labeled as "3".

In FIG. 51, the injection molding device 210 is in a closed position and this brought the mold core insert 250 labeled as "1" on the stationary frame unit 400 is registry with the mold core insert 252 on the sliding and pivoting frame unit 402. This first injection shot is done, as depicted by the arrow in stippled line.

In FIG. 52, the injection molding device 210 opened after the cycle and the lens core part 120 is now held by the mold core insert 252 labeled as "A".

FIG. 53 illustrates the sliding and pivoting frame unit 402 being pivoted of 180 degrees around its corresponding pivot axis 234 and the first rotatable carrier platen 260 being pivoted of 180 degrees around its corresponding pivot axis 232. As aforesaid, both pivot axes are perpendicular to one another.

Figure 54:
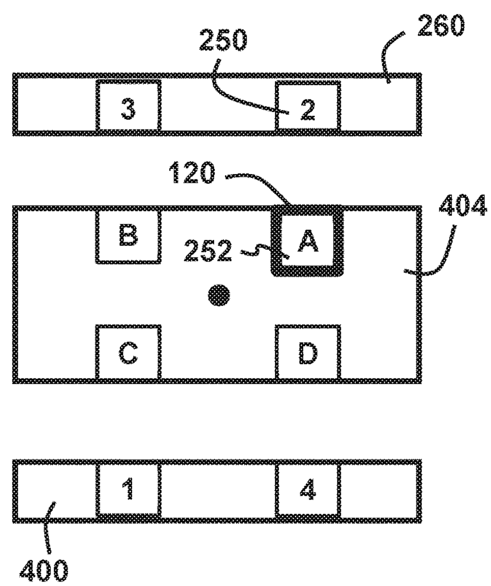

FIG. 54 illustrates the parts after pivoting. The mold core insert 252 labeled as "A" is now in registry with the mold core insert 250 labeled as "2".

Figure 55:
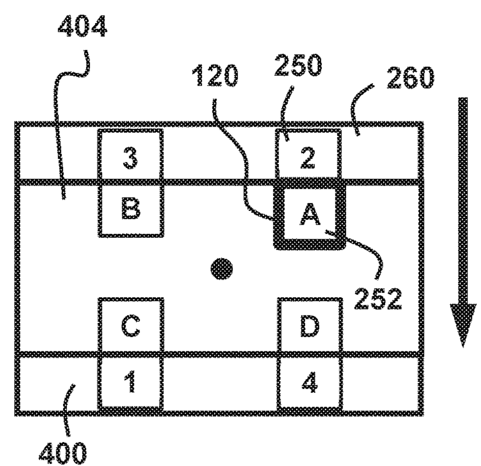

FIG. 55 illustrates the injection molding device 210 being closed once again. This begins the post-molding cooling of the lens core part 120.

Figure 56:
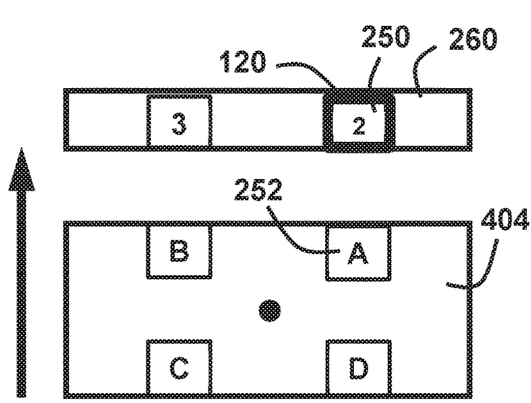

In FIG. 56, the injection molding device 210 opened after some time and the lens core part 120 is now held by the mold core insert 250 labeled as "2".

Figure 57:
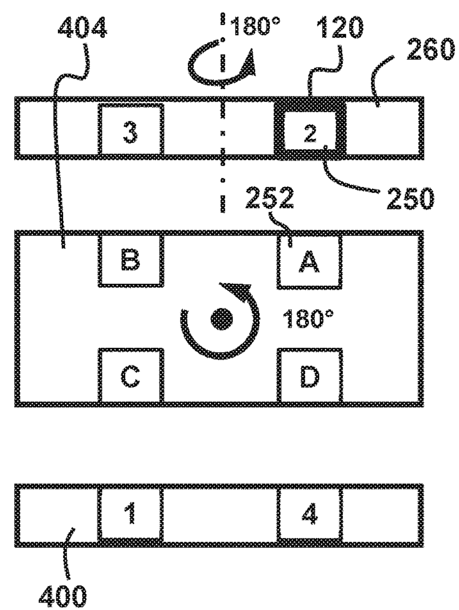

FIG. 57 illustrates the sliding and pivoting frame unit 402 being again pivoted of 180 degrees around its corresponding pivot axis 234 and the first rotatable carrier platen 260 being again pivoted of 180 degrees around its corresponding pivot axis 232.

It should be noted that in this example, the second pivoting motions are in the opposite direction. This does not affect the final position of the parts since they are both pivoted over 180 degrees. However, using cooling lines and wires between the base of the sliding and pivoting frame unit 402 and the pivoting part can simplify the design and the maintenance of the equipment over one having a complex interface involving annular connectors. The direction of the pivoting motions is alternated to prevent the lines and wires from entangling.

Figure 58:
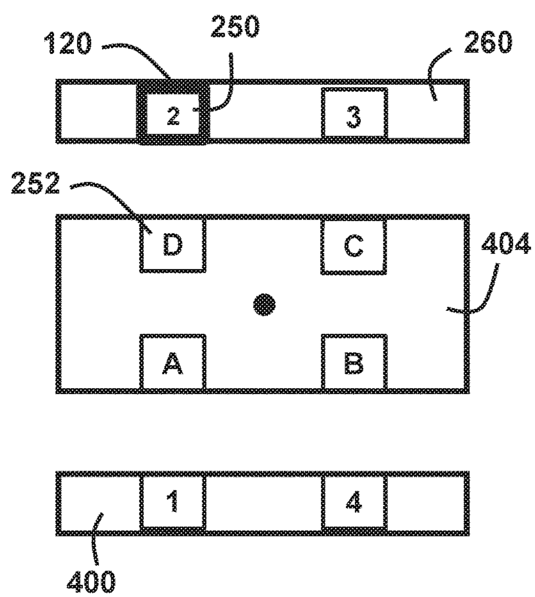

FIG. 58 illustrates the parts after pivoting. The mold core insert 250 labeled as "2" is now in registry with the mold core insert 252 labeled as "D".

Figure 59:
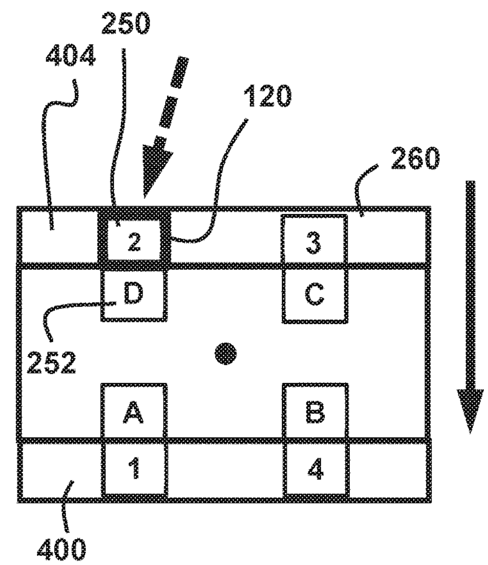

FIG. 59 illustrates the injection molding device 210 being closed once again. This begins the second injection shot of the lens 100. A given amount of the hot molten material is injected through the first rotatable carrier platen 260 using passageways leading to the mold core insert 250 labeled as "2".

Figure 60:
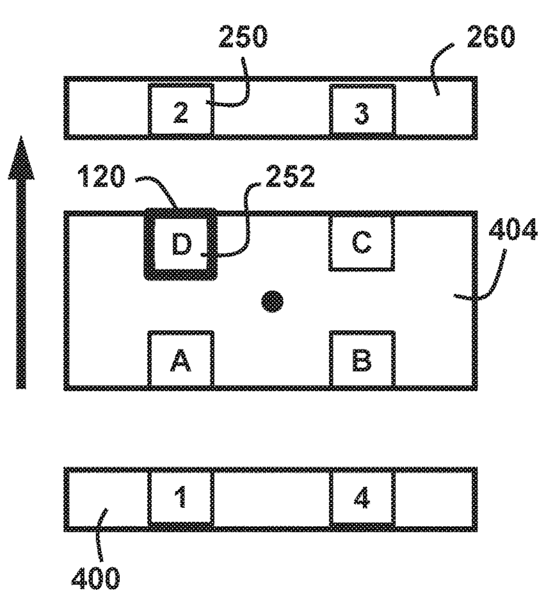

In FIG. 60, the injection molding device 210 opened after some time and the lens 100 is now held by the mold core insert 252 labeled as "D".

Figure 61:
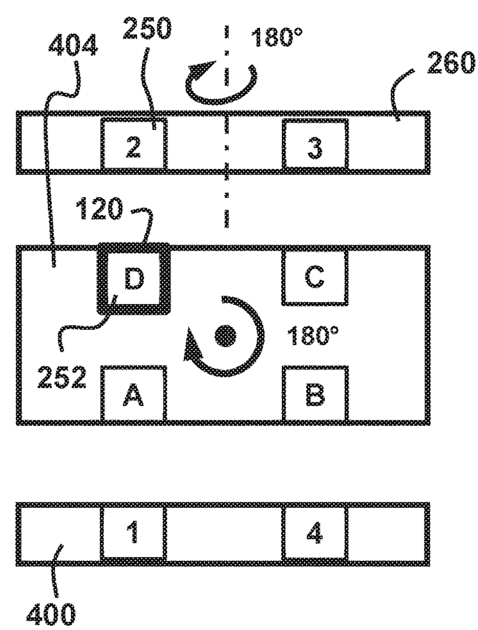

FIG. 61 illustrates the sliding and pivoting frame unit 402 being again pivoted of 180 degrees around its corresponding pivot axis 234 and the first rotatable carrier platen 260 being again pivoted of 180 degrees at the same time around its corresponding pivot axis 232.

Figure 62:
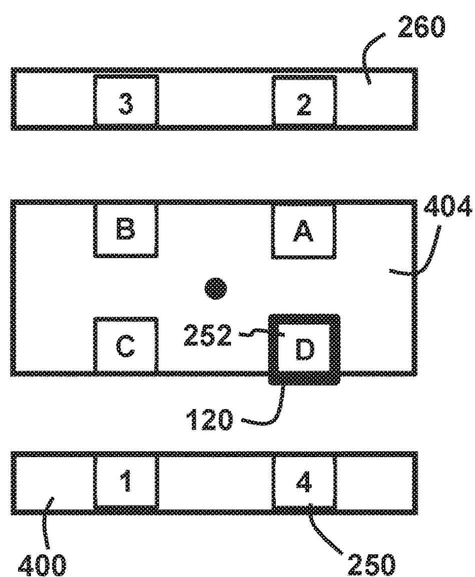

FIG. 62 illustrates the parts after pivoting. The mold core insert 252 labeled as "D" is now in registry with the mold core insert 250 labeled as "4".

Figure 63:
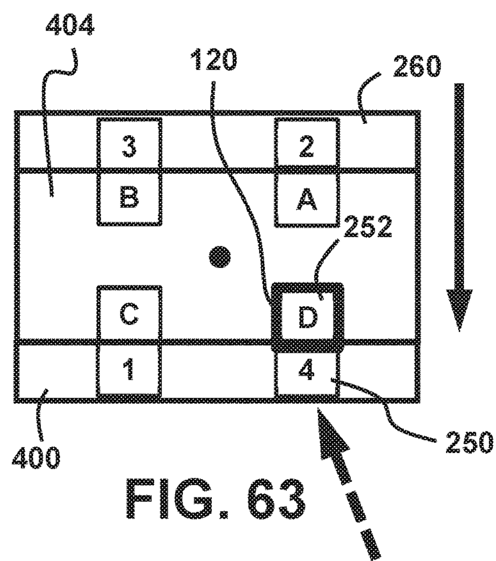

FIG. 63 illustrates the injection molding device 210 being closed once again. This begins the third injection shot of the lens 100. A given amount of the hot molten plastic material is injected through the stationary platen 254 on the stationary frame unit 400.

Figure 64:
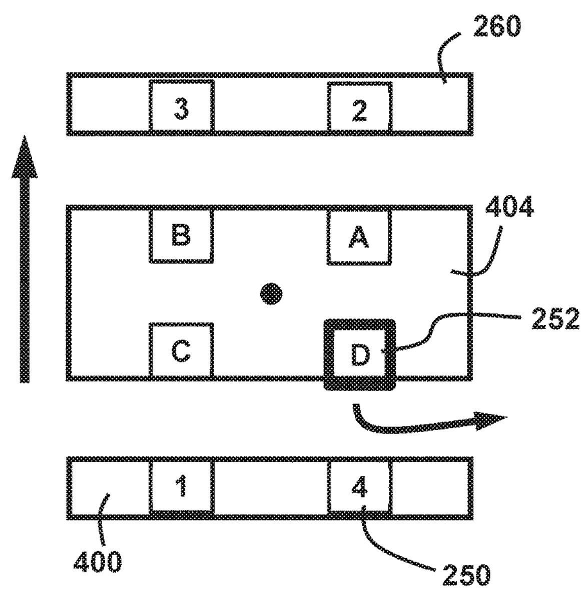

In FIG. 64, the injection molding device 210 opened after some time and the lens 100 is still held by the mold core insert 252 labeled as "D". The injection molding of the lens is now complete and the lens can be removed from the injection molding device 210, for instance using a robot or any other suitable technique.

Figure 65:
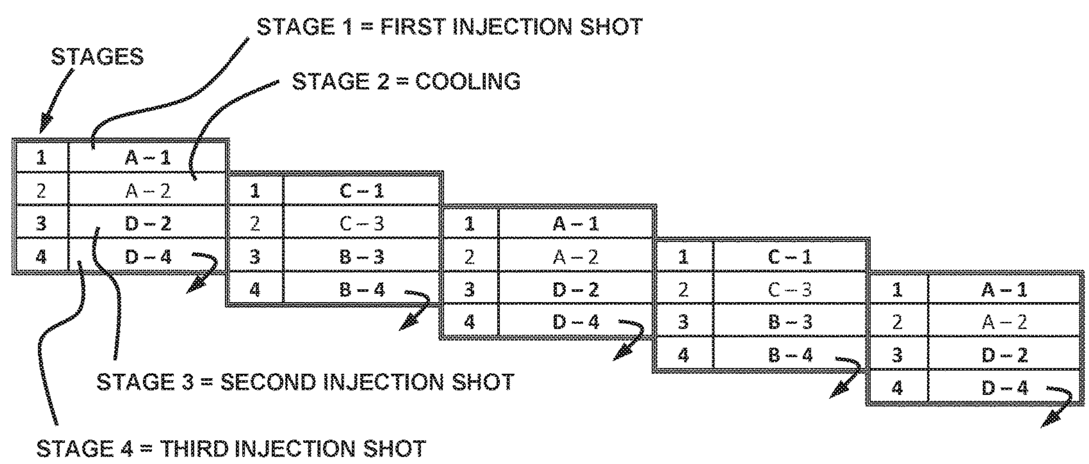
FIG. 65 is a table depicting the manufacturing stages of lenses being made in succession inside the injection molding device of the third example.

FIG. 65 is a table depicting the manufacturing stages of parts being made in succession inside the injection molding device 210 of the third example. Again, this table shows that as soon as the parts of the injection molding device 210 are pivoted, another lens begins its manufacturing sequence in the injection molding apparatus 210. The first line of the second column corresponds to what is shown in FIG. 55. Although not depicted in the figure for the sake of simplicity, the first injection shot of that next lens is done in the mold cavity formed between mold core insert 250 labeled as "1" and the mold core insert 252 labeled as "C".

When four lenses are molded in parallel at each station, there is a total of 16 lenses being present in the injection molding device 210.

The configuration of the third example has many advantages. For instance, the forces created by the first and second injection shots are counterbalanced since the stations are facing one another. The configuration is also more suitable for manufacturing multiple lenses at the same time without resulting in equipment have an excessive size, as could be the case with the first and second examples. Furthermore, most of the cooling can be concentrated on the central part, thus away from the hot parts were hot molten plastic is injected.

Overall, the proposed concept can be implemented using different designs. More designs can be devised as well. The three examples described and illustrated herein are not the only possible implementations for the proposed concept.

Still, FIGS. 1 to 11 showed some lenses 100 that can be made using the proposed concept. Additional examples are presented below and in the other figures. The proposed concept is not limited to these examples since many other designs are possible as well.

Figure 66:
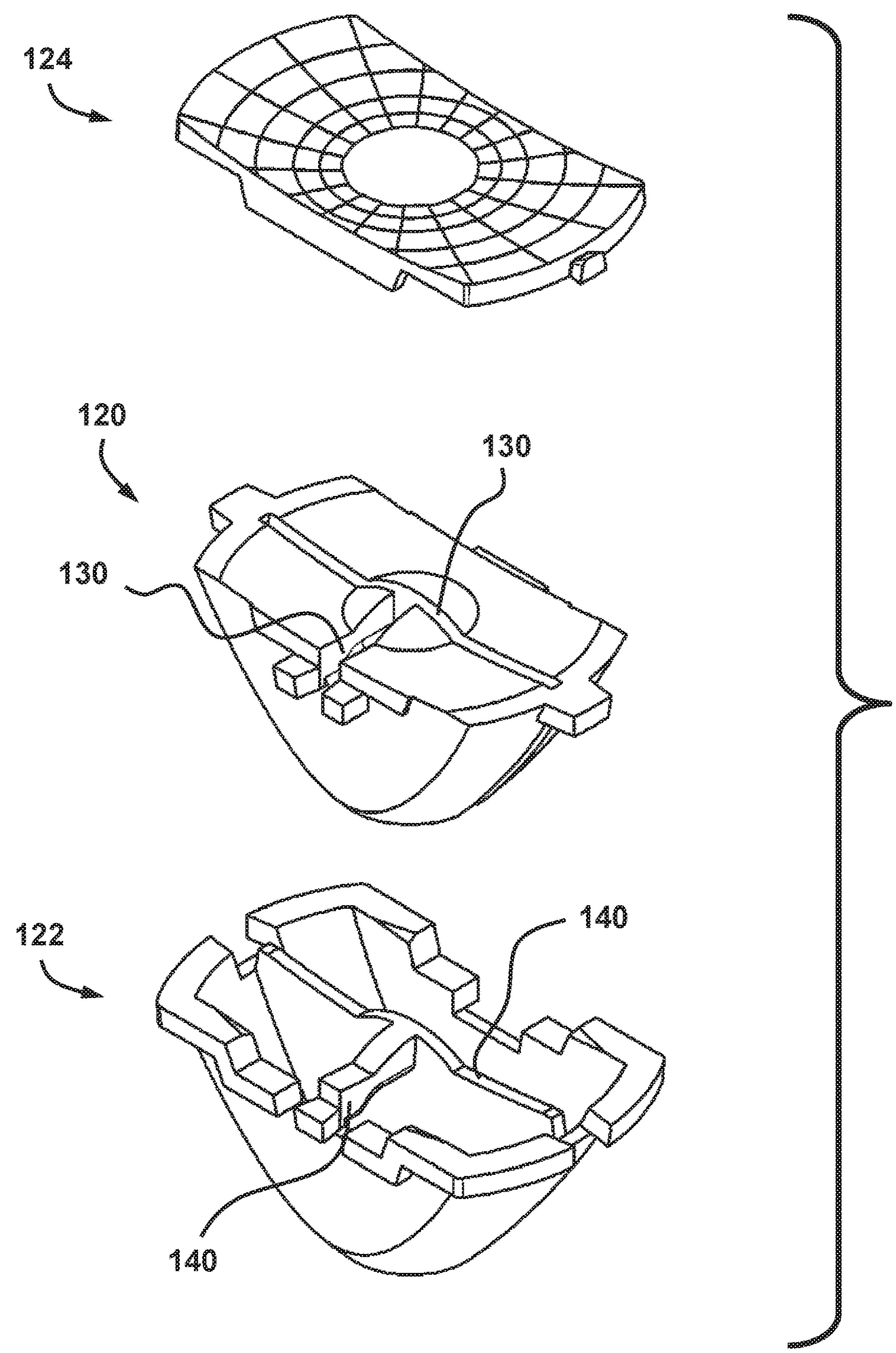
FIGS. 66 and 67 are exploded isometric views depicting lenses having other examples of lens core parts.
Figure 67:
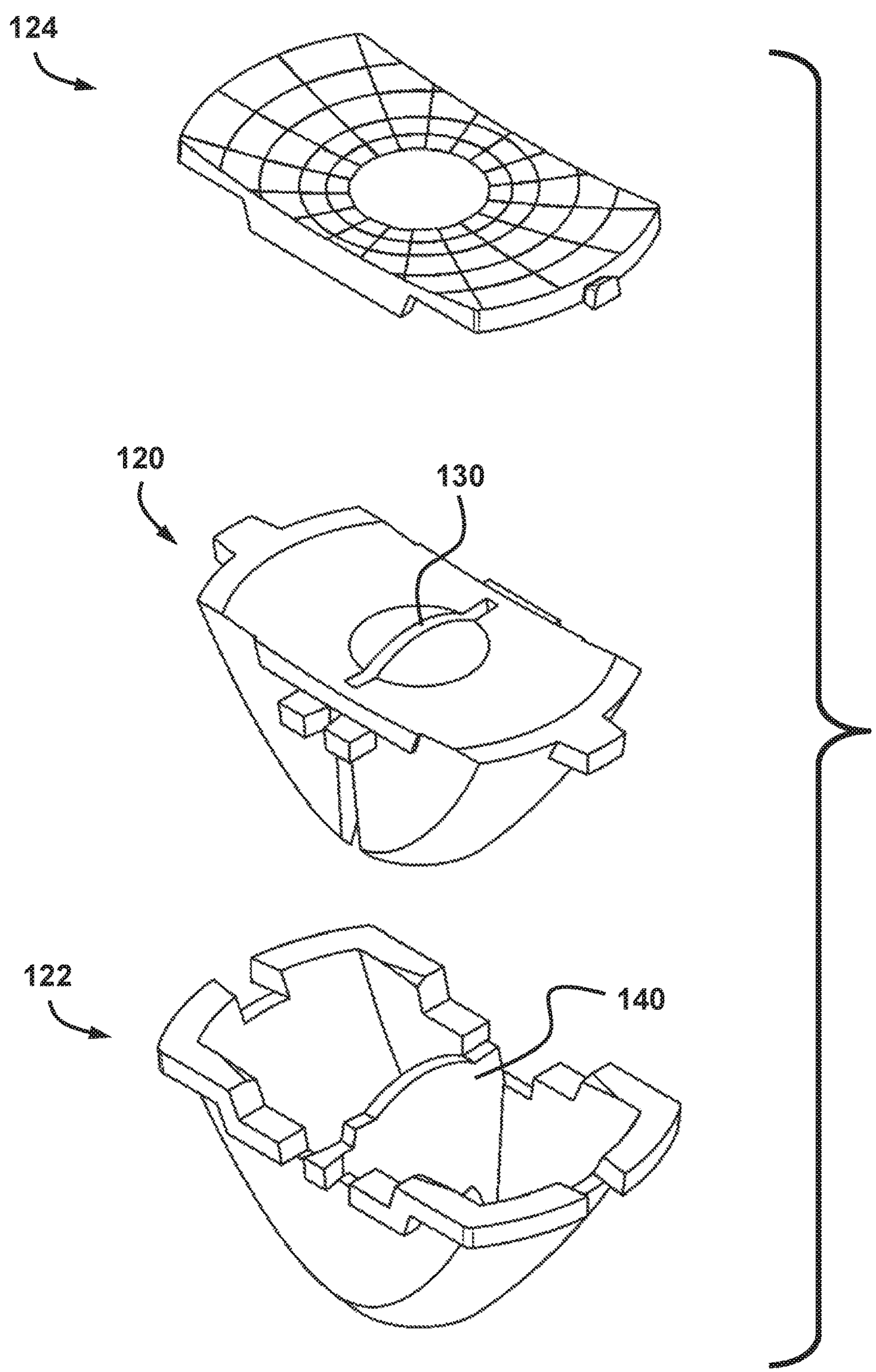

FIGS. 66 and 67 are exploded isometric views depicting lenses having other examples of lens core part 120 for the lens 100. In FIG. 66, the lens core part 120 includes slots forming a T-shaped arrangement. The lens core part 120 is thus divided in three subparts. In FIG. 67, the lens core part 120 only has a single central slot. The lens core part 120 is thus divided in two subparts. Other arrangements and configurations are possible as well.

Figure 68:
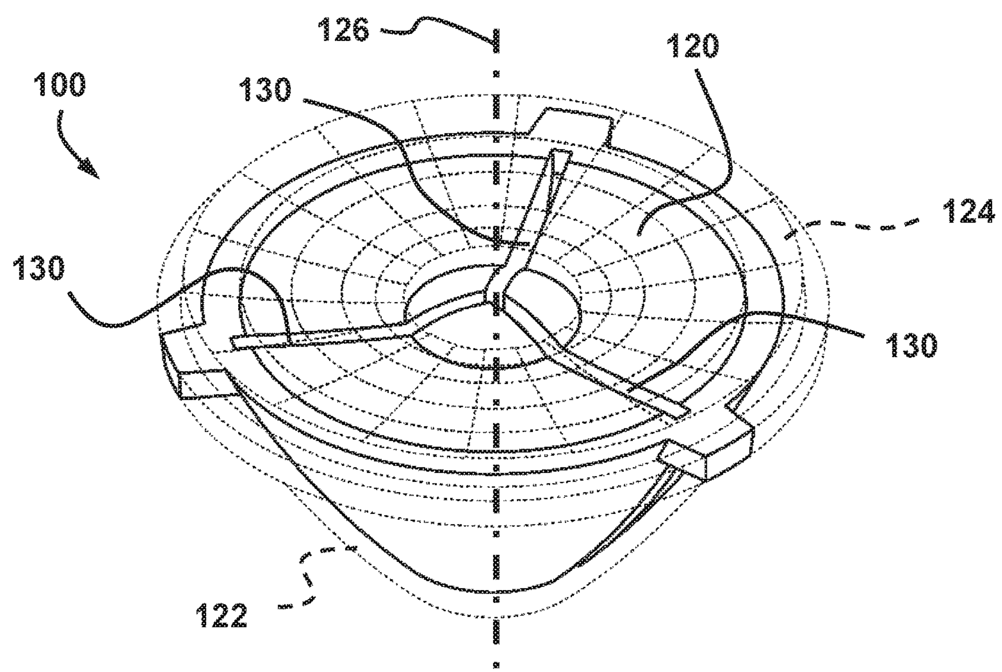
FIG. 68 is a semi-schematic isometric view illustrating another example of lens.

FIG. 68 is a semi-schematic isometric view illustrating another kind of lens 100. The slots 130 of the lens core part 120 inside this lens 100 are disposed radially. They are also symmetrically disposed and connected together at the center where the central axis 126 is located. Like in FIG. 5, the lens core part 120 and the outer lens parts 122, 124 of this lens 100 are distinctly visible only for the sake of illustration.

Figure 69:
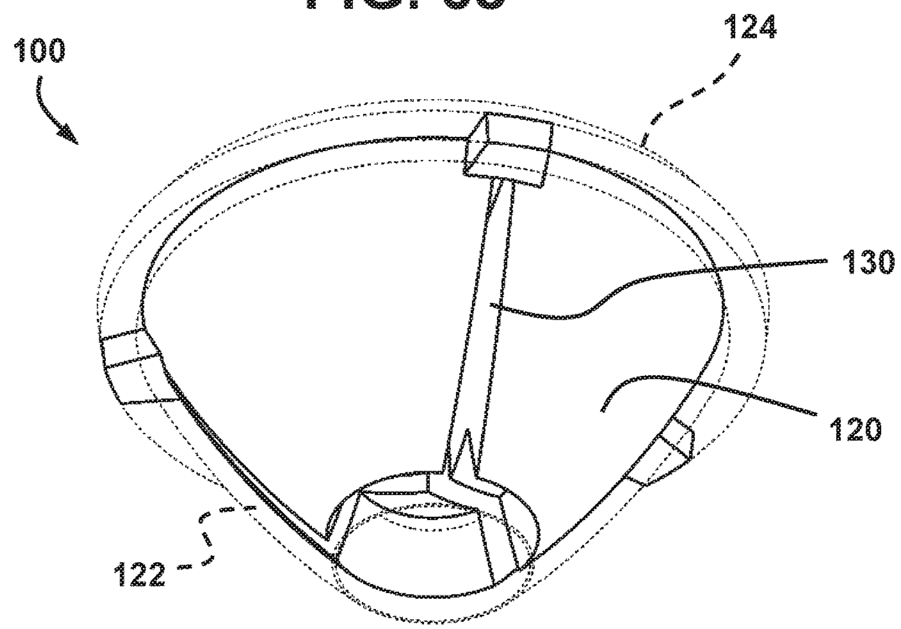
FIG. 69 is a semi-schematic isometric view of the lens of FIG. 68, as viewed from the bottom.

FIG. 69 is an isometric semi-schematic view of the lens 100 of FIG. 68, as viewed from the bottom.

Figure 70:
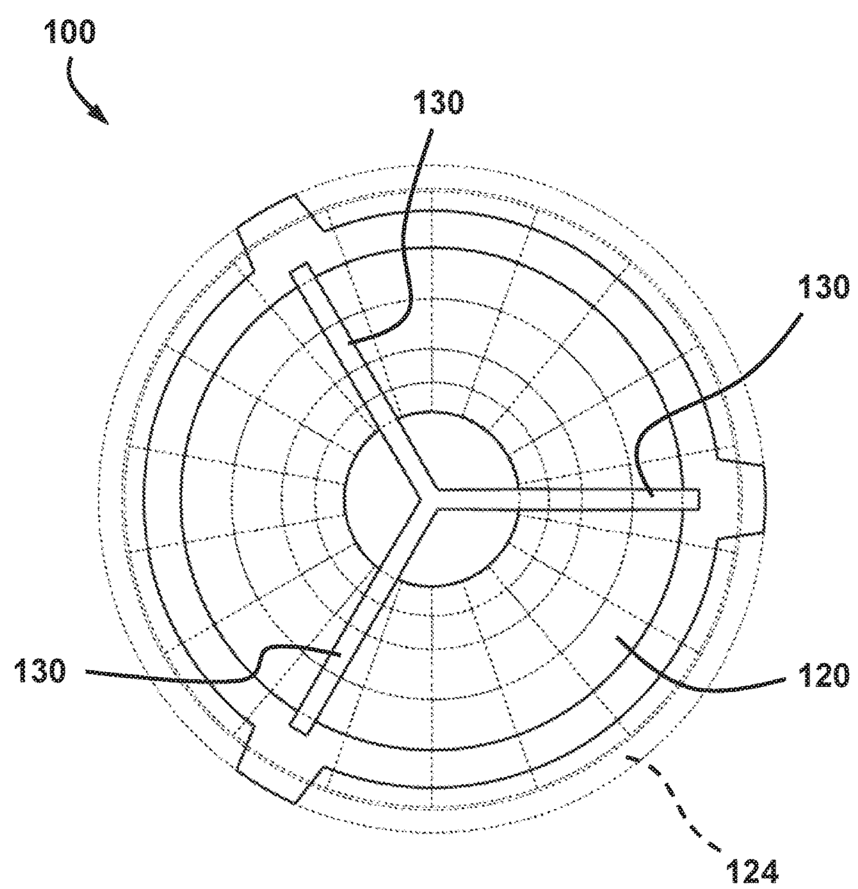
FIG. 70 is a semi-schematic top view of the lens of FIG. 68.
Figure 71:
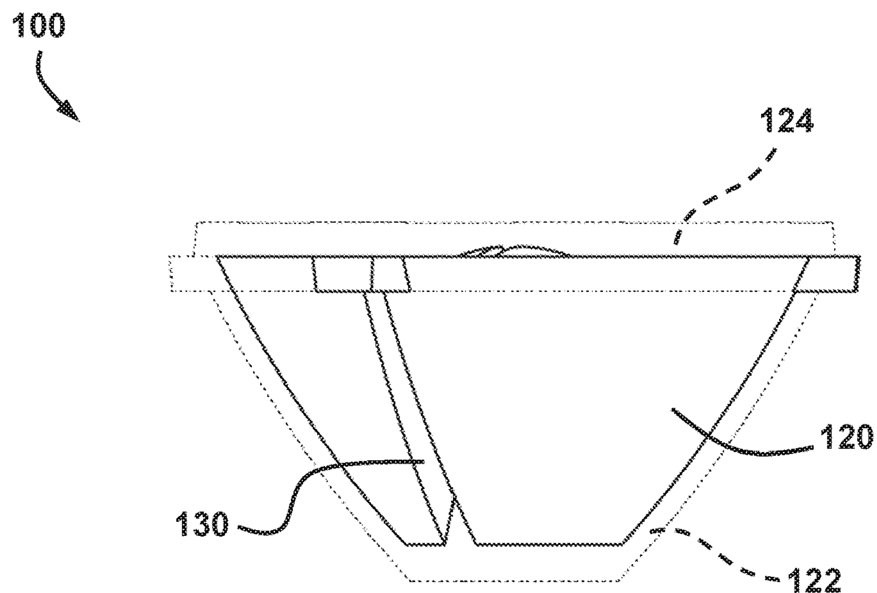
FIG. 71 is a first semi-schematic side view of the lens of FIG. 68.
Figure 72:
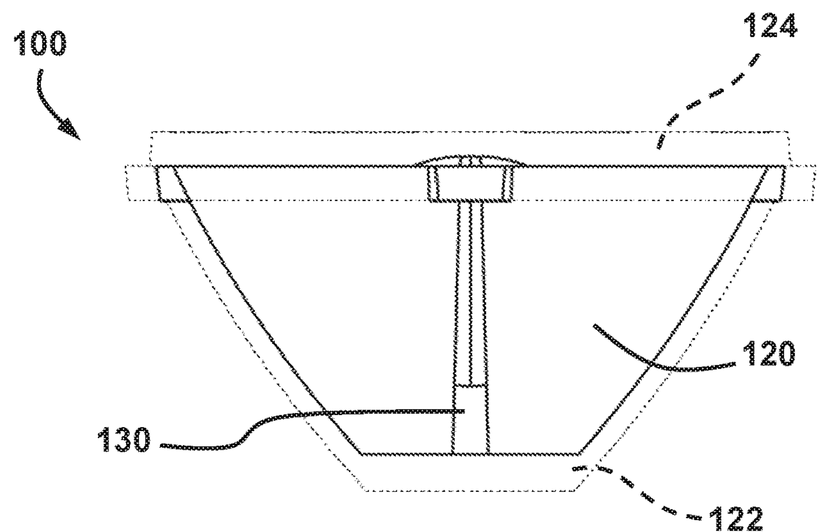
FIG. 72 is a second semi-schematic side view of the lens of FIG. 68.

FIG. 70 is a semi-schematic top view of the lens 100 of FIG. 68. FIG. 71 is a first semi-schematic side view of the lens 100 of FIG. 68. FIG. 72 is a second semi-schematic side view of the lens 100 of FIG. 68.

Figure 73:
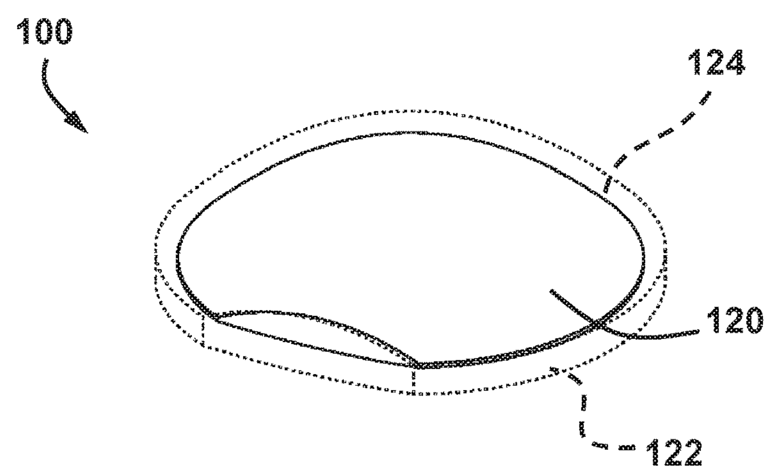
FIG. 73 is a semi-schematic isometric view illustrating another example of lens.

FIG. 73 is a semi-schematic isometric view illustrating another kind of lens 100. It is still made of a lens core part 120 around which two outer lens parts 122, 124 were formed.

Figure 74:
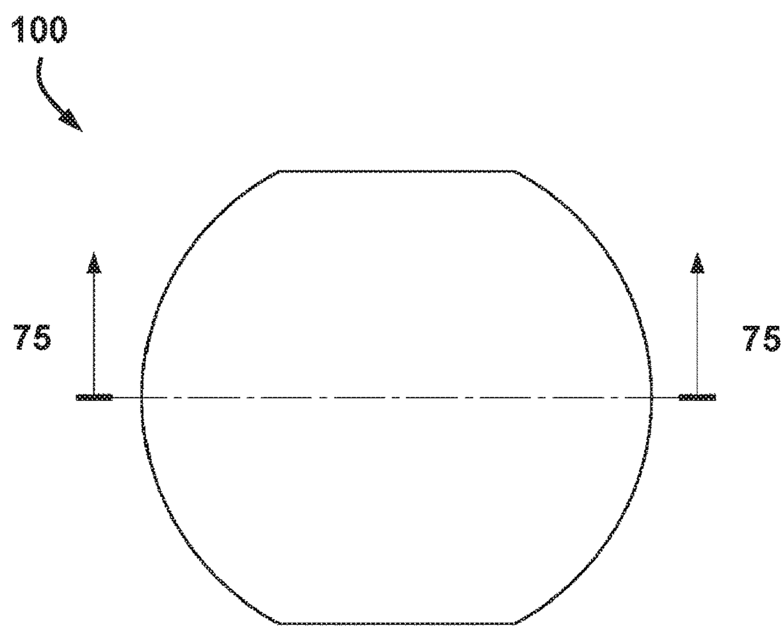
FIG. 74 is a semi-schematic top view of the lens of FIG. 73.
Figure 75:
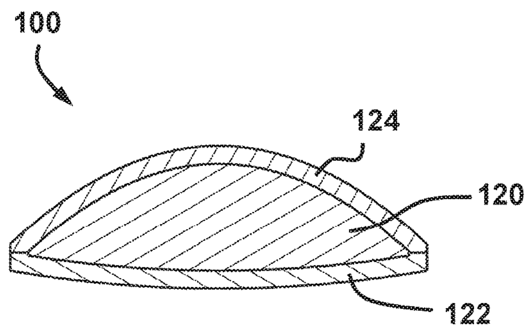
FIG. 75 is a cross-section view taken along line 75-75 in FIG. 74.
Figure 76:
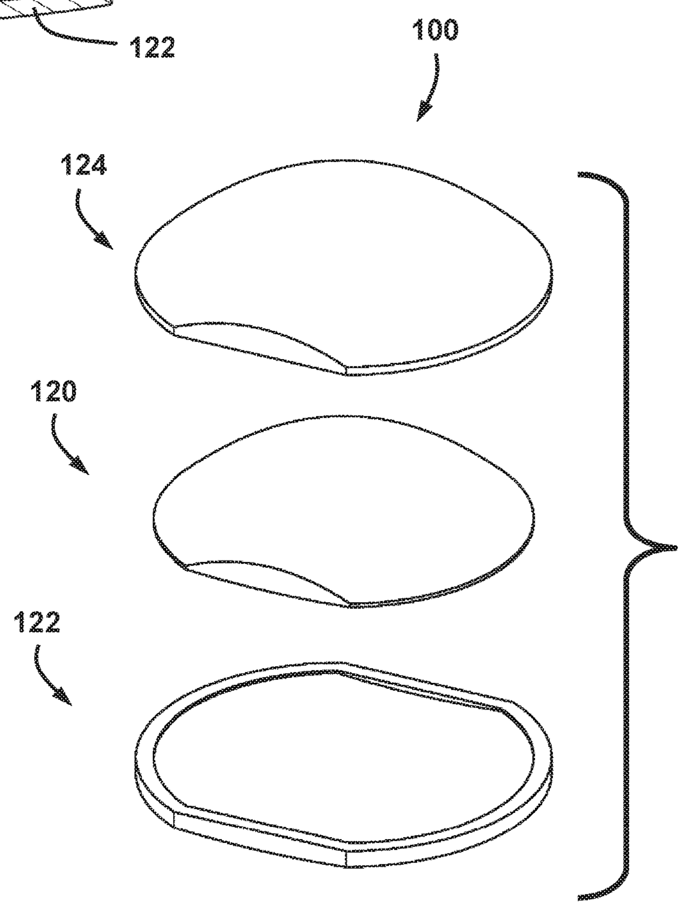
FIG. 76 is an exploded view depicting the various parts of the lens of FIG. 73.

FIG. 74 is a semi-schematic top view of the lens 100 of FIG. 73. FIG. 75 is a cross-section view taken along line 75-75 in FIG. 74. FIG. 76 is an exploded view depicting the various parts of the lens 100 of FIG. 73. The parts are shown as being distinct and/or detached from one another only for the sake of illustration. As aforesaid, once the lens 100 is formed, all parts inside the lens 100 are fused to one another and the boundaries between the parts are not visible to the naked eye.

Figure 77:
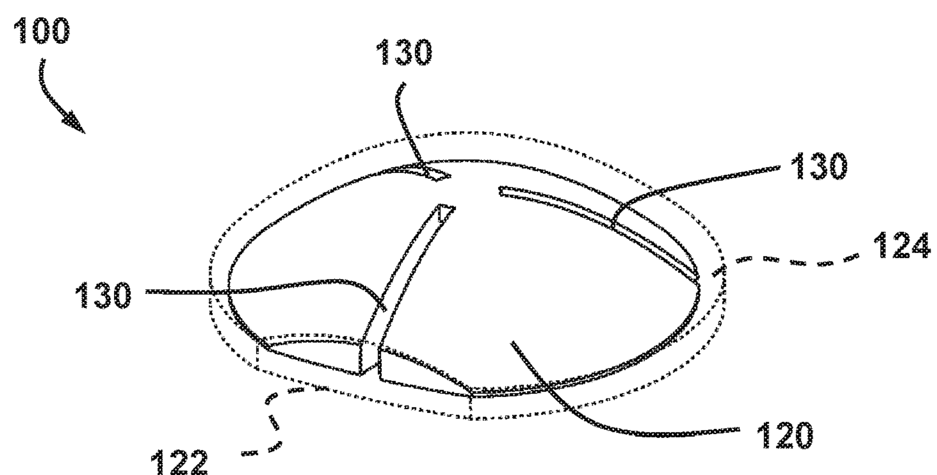
FIG. 77 is a semi-schematic isometric view illustrating another example of lens.

FIG. 77 is a semi-schematic isometric view illustrating another kind of lens 100. Unlike the lens 100 of FIG. 73, the lens core part 120 of this lens 100 includes three radially-disposed slots.

Figure 78:
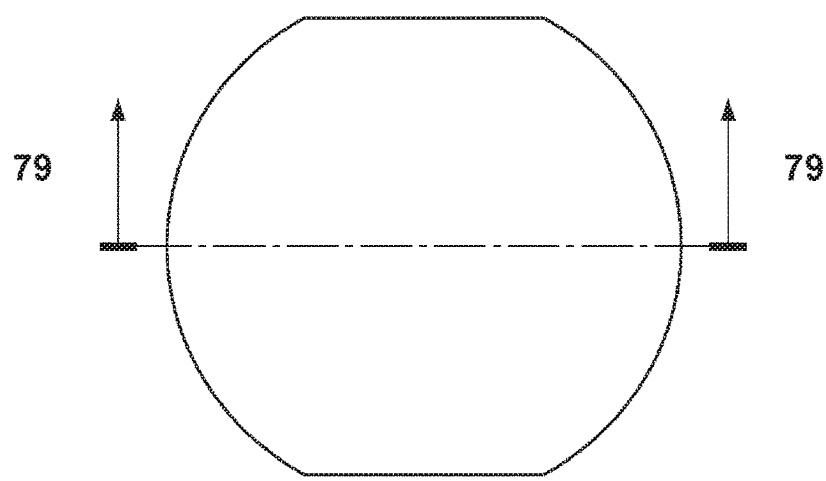
FIG. 78 is a semi-schematic top view of the lens of FIG. 77.
Figure 79:
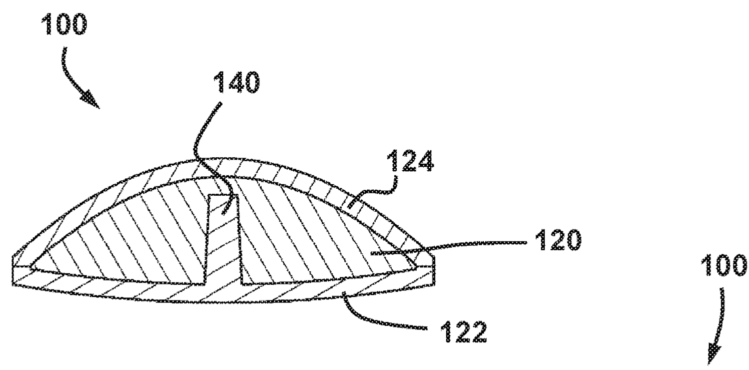
FIG. 79 is a cross-section view taken along line 79-79 in FIG. 78.
Figure 80:
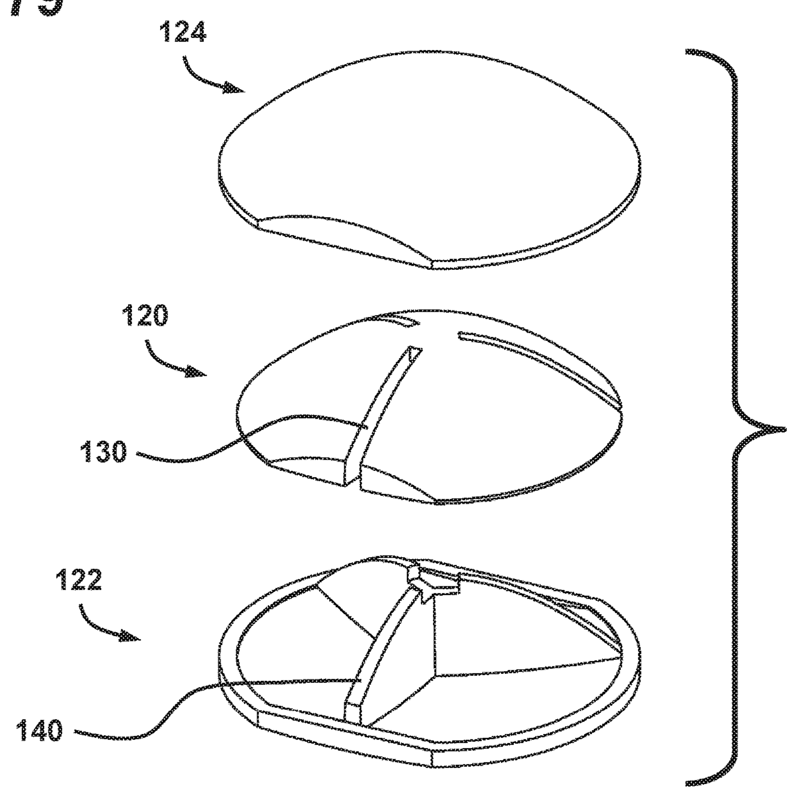
FIG. 80 is an exploded view depicting the various parts of the lens of FIG. 77.

FIG. 78 is a semi-schematic top view of the lens 100 of FIG. 77. FIG. 79 is a cross-section view taken along line 79-79 in FIG. 78. FIG. 80 is an exploded view depicting the various parts of the lens of FIG. 77.

The present detailed description and the appended figures are meant to be exemplary only, and a skilled person will recognize that variants can be made in light of a review of the present disclosure without departing from the proposed concept. For instance, it is possible to use an injection molding device and/or a lens manufacturing method using the concepts proposed herein for a lens having two layers and/or more than three layers.

What is claimed is:

1. A method of manufacturing a thick optical lens in an injection molding device that is reciprocately moveable with reference to a longitudinal axis between an opened position and a closed position, the lens including a lens core part, a first outer lens part and a second outer lens part, the method including:

providing at least four first mold core inserts, two of the first mold core inserts being located adjacent to one another on a stationary platen and the other first mold core inserts being located on a first rotatable carrier platen that is pivotable around a first pivot axis, the first pivot axis being parallel to the longitudinal axis;

providing at least four second mold core inserts that are located on at least one second rotatable carrier platen pivotable around a second pivot axis, the second mold core inserts sequentially cooperating with the first mold core inserts and forming at least four mold cavities when the injection molding device is in a closed position, the at least one second rotatable carrier platen being one in number when the second pivot axis is parallel to the longitudinal axis and being at least two in number when the second pivot axis is perpendicular to the longitudinal axis;

when the injection molding device is in the closed position, molding the lens core part during a first injection shot where a molten material is injected through one of the first mold core inserts located on the stationary platen and that is then forming a first one of the mold cavities with a corresponding one of the second mold core inserts;

opening the injection molding device with the molded lens core part being held by the second mold core insert forming one half of the first mold cavity;

pivoting the first rotatable carrier platen around the first pivot axis and the second rotatable carrier platen around the second pivot axis before moving the injection molding device back in the closed position;

when the injection molding device is back in the closed position, further cooling the molded lens core part inside a second one of the mold cavities in a post-molding cooling step, the second mold cavity being formed by the corresponding one of the second mold core inserts and one of the first mold core inserts located on the first rotatable carrier platen;

opening the injection molding device with the molded lens core part being held by the first mold core insert forming one half of the second mold cavity;

pivoting the first rotatable carrier platen around the first pivot axis and the second rotatable carrier platen around the second pivot axis before moving the injection molding device back in the closed position;

when the injection molding device is in the closed position, molding the first outer lens part over the lens core part during a second injection shot where the molten material is injected through one of the first mold core inserts located on the first rotatable carrier platen and that is then forming a third one of the mold cavities with another one of the second mold core inserts;

opening the injection molding device with the molded lens core part being held by the second mold core insert forming one half of the third mold cavity;

pivoting the first rotatable carrier platen around the first pivot axis and the second rotatable carrier platen around the second pivot axis before moving the injection molding device back in the closed position;

when the injection molding device is in the closed position, molding the second outer lens part over the lens core part during a third injection shot where the molten material is injected through the other one of the first mold core inserts located on the stationary platen and that is then forming a fourth one of the mold cavities with the second mold core insert forming one half of the third mold cavity; and then opening the injection molding device and removing the molded lens from the injection molding device, whereby the lens core part remains continuously inside the injection molding device from the first injection shot until an end of the third injection shot.

2. The method as defined in claim 1, further including at least one additional post-molding cooling step occurring between the post-molding cooling step and the second injection shot.

3. The method as defined in claim 1, further including two additional post-molding cooling steps occurring in succession between the post-molding cooling step and the second injection shot, each additional post-molding cooling step further cooling the molded lens core part, when the injection molding device is in the closed position, between the first mold core insert that formed one half of the second mold cavity and a corresponding cooling core insert located on a cooling jig attached on a side of the second rotatable carrier platen.

4. The method as defined in claim 1, wherein the second rotatable carrier platen pivots of 180 degrees between each step, the first rotatable carrier platen pivoting of one among 90 degrees and 180 degrees between each step.

5. The method as defined in claim 4, wherein the first rotatable carrier platen and the second rotatable carrier platen are pivoted at a same time.

6. A multistep injection molding device for manufacturing a thick lens for use with an illumination apparatus having a light source, the lens having a lens core part, a first outer lens part and a second outer lens part, the injection molding device including:

at least four first mold core inserts, two of the first mold core inserts being located adjacent to one another on a stationary platen and the other first mold core inserts being located on a first rotatable carrier platen that is pivotable around a first pivot axis, the first pivot axis being parallel to a longitudinal axis;

at least four second mold core inserts that are located on at least one second rotatable carrier platen pivotable around a second pivot axis, the second mold core inserts sequentially cooperating with the first mold core inserts and forming at least four mold cavities when the injection molding device is in a closed position, the at least one second rotatable carrier platen being one in number when the second pivot axis is parallel to the longitudinal axis and being at least two in number when the second pivot axis is perpendicular to the longitudinal axis;

a first injection shot station to mold the lens core part, the first station including a first molten plastic material path passing through a first one among the two first mold core inserts located on the stationary platen;

a post-molding cooling station in which the lens core part is further cooled inside a corresponding one of the mold cavities after the first injection shot station;

a second injection shot station to mold the first outer lens part, the second station including a second molten plastic material path passing sequentially through each of the first mold core inserts located on the first rotatable carrier platen; and a third injection shot station to mold the second outer lens part, the second station including a third molten plastic material path passaging through a second one among the two first mold core inserts located on the stationary platen.

7. The device as defined in claim 6, further including at least one additional post-molding cooling station in which the lens core part is further cooled inside a corresponding one of the mold cavities after the post-molding cooling station.

8. The device as defined in claim 6, wherein the second mold plate half includes transferring elements to transfer the lens core part from the second mold plate half to the first rotatable carrier platen.

9. The device as defined in claim 8, wherein the transferring elements includes gripping jaws provided on each first mold core insert of the first rotatable carrier platen to hold the lens core part after the post-molding cooling stage.

10. The device as defined in claim 6, wherein the first mold core inserts are six in number, four of the first mold core inserts being diagonally positioned on the first rotatable carrier platen.

11. The device as defined in claim 10, wherein the diagonally positioned first mold core inserts have inner molding surfaces of the same shape.

12. The device as defined in claim 6, wherein the stationary platen and the first rotatable carrier platen are coplanar.

13. The device as defined in claim 6, wherein the second mold core inserts having inner molding surfaces that are identical in shape are diagonally positioned with reference to one another on the second rotatable carrier platen.

14. The device as defined in claim 6, wherein the second rotatable carrier platen pivots by increments of 180 degrees to bring the second mold core inserts in sequential molding positions with reference to corresponding ones of the first mold core inserts.

15. The device as defined in claim 6, wherein all mold cavities in the device are used continuously during operation and the lenses exits the device only once all lens parts are formed.

16. The device as defined in claim 6, wherein more than one mold cavity is present at each station for molding simultaneously multiple lenses in parallel.

17. The method as defined in claim 1, wherein the stationary platen and the first rotatable carrier platen are located on a first mold plate half, and the second mold core inserts are located on a second mold plate half.

18. The device as defined in claim 6, wherein the stationary platen and the first rotatable carrier platen are located on a first mold plate half, and the second mold core inserts are located on a second mold plate half.

* * * * *